United States Patent
Huang et al.

(10) Patent No.: US 12,328,024 B2
(45) Date of Patent: Jun. 10, 2025

(54) OPTIONAL TERMINAL CHARGING METHOD, GRAPHICAL USER INTERFACE, AND ELECTRONIC DEVICE

(71) Applicant: Huawei Technologies Co., Ltd., Shenzhen (CN)

(72) Inventors: Yuxiang Huang, Shanghai (CN); Rui Cui, Shanghai (CN); Yuehai Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 987 days.

(21) Appl. No.: 17/287,733

(22) PCT Filed: Dec. 25, 2018

(86) PCT No.: PCT/CN2018/123613
§ 371 (c)(1),
(2) Date: Apr. 22, 2021

(87) PCT Pub. No.: WO2020/132891
PCT Pub. Date: Jul. 2, 2020

(65) Prior Publication Data
US 2021/0399568 A1 Dec. 23, 2021

(51) Int. Cl.
*H02J 7/00* (2006.01)
*H02J 50/10* (2016.01)

(52) U.S. Cl.
CPC ...... *H02J 7/0071* (2020.01); *H02J 7/007182* (2020.01); *H02J 50/10* (2016.02); *H02J 2207/30* (2020.01); *H02J 2310/22* (2020.01)

(58) Field of Classification Search
CPC .... H02J 7/0071; H02J 7/007182; H02J 50/10; H02J 2207/30; H02J 2310/22;
(Continued)

(56) References Cited

U.S. PATENT DOCUMENTS 9,774,203 B2 * 9/2017 Childress .............. H02J 7/0069
9,893,542 B2 * 2/2018 Hwang ................. H02J 7/0049
(Continued)

FOREIGN PATENT DOCUMENTS

| CN | 101222144 A | 7/2008 |
|---|---|---|
| CN | 103311974 A | 9/2013 |

(Continued)

OTHER PUBLICATIONS

ITU-T H.264, "Series H: Audiovisual and Multimedia Systems, Infrastructure of audiovisual services—Coding of moving video, Advanced video coding for generic audiovisual services," Apr. 2017, 812 pages.

*Primary Examiner* — Nha T Nguyen
(74) *Attorney, Agent, or Firm* — Conley Rose, P.C.

(57) ABSTRACT

An electronic device, where after the electronic device is coupled to a charging device, the electronic device is configured to obtain a current time, charge the battery in a first mode in response to the current time is in a first time period, in response to the current time is in a second time period and after the battery level is less than a preset threshold, charging the battery in the first mode; in response to the current time is in a second time period and after the battery level is greater than or equal to the preset threshold, charging the battery in a second mode, wherein the second time period is after the first time period is subtracted from a whole day time period, and the preset threshold is less than a battery level when the battery is fully charged.

20 Claims, 37 Drawing Sheets

(58) Field of Classification Search
CPC .. H02J 7/0047; H02J 7/00034; H02J 7/00712; H02J 7/007192; H02J 7/007; G06F 1/26; G06F 3/04847; G06F 3/0482; G06F 3/0488; G06F 3/04855; G06F 3/04883
See application file for complete search history.

(56) References Cited

U.S. PATENT DOCUMENTS

| | | | | |
|---|---|---|---|---|
| 10,135,271 | B2 * | 11/2018 | Miller | H02J 7/0031 |
| 10,326,291 | B2 * | 6/2019 | Zhang | G06F 1/26 |
| 10,424,954 | B2 * | 9/2019 | Zhang | H04B 3/54 |
| 10,664,102 | B2 * | 5/2020 | Zhang | G06F 3/0488 |
| 10,938,239 | B2 * | 3/2021 | Kim | H02J 50/80 |
| 11,075,536 | B2 * | 7/2021 | Jung | H02J 7/0071 |
| 11,233,416 | B2 * | 1/2022 | Tian | H02J 7/0045 |
| 2010/0270979 | A1 | 10/2010 | Bonkhoff et al. | |
| 2011/0018679 | A1 * | 1/2011 | Davis | H02J 50/12 320/155 |
| 2013/0102170 | A1 | 4/2013 | Yang et al. | |
| 2015/0123599 | A1 | 5/2015 | Yun et al. | |
| 2015/0256018 | A1 * | 9/2015 | Wei | H02J 3/14 455/573 |
| 2016/0141893 | A1 | 5/2016 | Lee et al. | |
| 2016/0359339 | A1 * | 12/2016 | Hwang | H02J 7/0049 |
| 2016/0359340 | A1 | 12/2016 | Zhao et al. | |
| 2017/0040821 | A1 * | 2/2017 | Li | H02J 7/00047 |
| 2017/0203667 | A1 | 7/2017 | He et al. | |
| 2017/0220189 | A1 * | 8/2017 | Guo | H02J 7/0045 |
| 2017/0279270 | A1 | 9/2017 | Motoki | |
| 2017/0366016 | A1 | 12/2017 | Zhao et al. | |
| 2019/0356137 | A1 * | 11/2019 | Balarajashetty | H02J 7/04 |
| 2022/0115893 | A1 * | 4/2022 | Ling | H02J 7/007192 |

FOREIGN PATENT DOCUMENTS

| | | |
|---|---|---|
| CN | 104600796 A | 5/2015 |
| CN | 104917246 A | 9/2015 |
| CN | 106067571 A | 11/2016 |
| CN | 106207289 A | 12/2016 |
| CN | 106340922 A | 1/2017 |
| CN | 107768755 A | 3/2018 |
| DE | 102016212762 A1 | 1/2018 |
| EP | 3021452 A1 | 5/2016 |
| JP | 2011155799 A | 8/2011 |
| WO | 2015081868 A1 | 6/2015 |
| WO | 2018033124 A1 | 2/2018 |

* cited by examiner

OPTIONAL TERMINAL CHARGING METHOD, GRAPHICAL USER INTERFACE, AND ELECTRONIC DEVICE

CROSS-REFERENCE TO RELATED APPLICATIONS

This application is a U.S. National Stage of International Patent Application No. PCT/CN2018/123613 filed on Dec. 25, 2018, which is hereby incorporated by reference in its entirety.

TECHNICAL FIELD

This application relates to the terminal field, and in particular, to an optional terminal charging method, a graphical user interface, and an electronic device.

BACKGROUND

A mobile phone plays an increasingly important role in daily life. In a process of using the mobile phone, battery power of the mobile phone is equivalent to a lifeline of the mobile phone, and charging of the mobile phone is a prerequisite for ensuring that the battery power of the mobile phone is sufficient.

In complex and changeable application scenarios of the mobile phone, a user may have different requirements for charging the mobile phone. In an existing charging mode, the mobile phone may be charged by using different types of chargers. One type of charger usually corresponds to one charging mode. However, a single charging mode cannot meet all requirements for charging the mobile phone in different application scenarios, and a user needs to charge the mobile phone by using an optimal charging mode that can meet a current use requirement. For example, when the battery power of the mobile phone is low or the user uses the mobile phone in daytime, the user may require a fast charging mode. When the user is asleep or does not use the phone at night, the user may require some charging modes that can prolong the battery life.

Therefore, a charging method is required to provide different charging modes for a current application scenario of the mobile phone, to meet charging requirements in a plurality of scenarios.

SUMMARY

This application provides an optional terminal charging method, a graphical user interface, and an electronic device, to provide different charging modes for a current application scenario of a mobile phone. Therefore, charging requirements in a plurality of scenarios are met.

According to a first aspect, a charging method is provided. The method is applied to an electronic device, where the electronic device is connected to a first charging device, and the method includes: obtaining a maximum charging capability of the first charging device; determining a first charging parameter and a second charging parameter based on the maximum charging capability of the first charging device; displaying a first interface, where the first interface includes a first window, the first window is used to display a first option and a second option, the first option is associated with the first charging parameter, and the second option is associated with the second charging parameter; detecting a first operation of a user in the first window, where the first operation is used to select the first option from the first option and the second option; determining the first option in response to the first operation; obtaining the first charging parameter associated with the first option; and performing charging based on the first charging parameter.

According to the foregoing optional mobile phone charging method for a user, the user may manually select different charging modes and charging policies based on different application scenarios, to implement different charging effects. After the mobile phone is connected to a charger, the mobile phone may present, in an active charging adaptation interface, a charging mode that matches the connected charger. The user may autonomously select a currently required charging mode, or the user may autonomously change a charging performance and a charging effect of the charger based on a current application scenario. In this way, the user can select a desired charging policy as required to achieve an expected result by fully using battery performance and charger performance. This meets various requirements of the user and improves user experience. For example, when the user goes out or uses the mobile phone in an emergency, the user may select a fast charging policy; before the user goes to bed, the user may select a charging policy supporting a long battery life, to improve a battery health status, extend the battery life, reduce battery charging heat, and the like.

With reference to the first aspect, in some implementations of the first aspect, the first window is a window that is automatically popped up when the electronic device is connected to the first charging device.

With reference to the first aspect and the foregoing implementation, in some implementations of the first aspect, the method further includes: displaying a second interface before the displaying a first interface, where the second interface includes a second window used to access the first window; detecting a second operation of the user in the second window; and displaying the first interface in response to the second operation.

With reference to the first aspect and the implementations, in some implementations of the first aspect, the obtaining a maximum charging capability of the first charging device includes: automatically obtaining the maximum charging capability of the first charging device.

Optionally, after the electronic device is connected to a charging device, the mobile phone may identify a type of the charger by using a charging detection module, to obtain a maximum charging capability of the charger.

With reference to the first aspect and the implementations, in some implementations of the first aspect, the obtaining a maximum charging capability of the first charging device includes: displaying a third interface, where the third interface includes a third window, and the third window is used to display a plurality of parameter groups that are used to indicate maximum charging capabilities of a plurality of charging devices; detecting a third operation of the user in the third window, where the third operation is used to select a first parameter group from the plurality of parameter groups, and the first parameter group corresponds to the first charging device; in response to the first operation, determining a charging parameter corresponding to the first parameter group; and determining that the charging parameter corresponding to the first parameter group is the maximum charging capability of the first charging device.

For example, the user may tap, in a charging mode selection window, a charger selection widget (for example, "charger type X") shown by a black inverted triangle to select a charger type, and then select "charger type 1 (12 V-4 A)". The electronic device may obtain a maximum charging capability of the charger. To be specific, a maximum charging voltage that can be supported by the charger of type 1 is 12 V, and a maximum charging current that can be supported by the charger is 4 A.

Optionally, the charger selection widget may alternatively be set to another widget that supports user input. For example, the user may manually enter the maximum charging capability of the connected charger. After the user enters the maximum charging capability of the charger, the mobile phone may determine, based on a parameter corresponding to the obtained maximum charging capability, charging parameters corresponding to different charging modes. This is not limited in this application.

According to the foregoing solution, after the mobile phone is connected to the charger, when the mobile phone cannot identify a charging mode supported by the charger, the user may manually select a charger type, and then a charging mode that can be selected and that matches the charger is presented to the user. It should be understood that each charger type corresponds to different types and quantities of charging modes. When the user selects a different type of charger, the charging mode selection window may display, to the user, a list of charging modes supported by the charger.

With reference to the first aspect and the foregoing implementations, in some implementation of the first aspect, the first option is a charging option automatically selected through matching, and the method further includes: displaying a fourth interface before the displaying a first interface, where the fourth interface includes a fourth window, and the fourth window is used to display the first option; detecting a fourth operation of the user in the fourth window; and displaying the first interface in response to the fourth operation.

With reference to the first aspect and the foregoing implementations, in some implementations of the first aspect, the first option is determined based on a preset condition; or the first option is determined based on a current time period.

With reference to the first aspect and the foregoing implementations, in some implementation of the first aspect, the first option includes any one of a fast charging mode option, a sleep mode option, or a thermal optimization mode option.

With reference to the first aspect and the foregoing implementations, in some implementations of the first aspect, the first option is a user-defined option determined by the user by setting a charging parameter.

With reference to the first aspect and the foregoing implementations, in some implementations of the first aspect, the charging parameter includes a maximum charging voltage, a maximum charging current, charging duration, and a maximum temperature in a battery charging process.

According to a second aspect, an electronic device is provided, where the electronic device is connected to a first charging device, and the electronic device includes one or more processors, a memory, a plurality of applications, and one or more programs, the one or more programs are stored in the memory, and when the one or more programs are executed by the processors, the electronic device is enabled to perform the following steps: obtaining a maximum charging capability of the first charging device; determining a first charging parameter and a second charging parameter based on the maximum charging capability of the first charging device; displaying a first interface, where the first interface includes a first window, the first window is used to display a first option and a second option, the first option is associated with the first charging parameter, and the second option is associated with the second charging parameter; detecting a first operation of a user in the first window, where the first operation is used to select the first option from the first option and the second option; determining the first option in response to the first operation; obtaining the first charging parameter associated with the first option; and performing charging based on the first charging parameter.

With reference to the second aspect, in some implementations of the second aspect, the first window is a window that is automatically popped up when the electronic device is connected to the first charging device.

With reference to the second aspect and the foregoing implementation, in some implementations of the second aspect, when the one or more programs are executed by the processors, the electronic device is enabled to perform the following steps: displaying a second interface before the displaying a first interface, where the second interface includes a second window used to access the first window; detecting a second operation of the user in the second window; and displaying the first interface in response to the second operation.

With reference to the second aspect and the foregoing implementations, in some implementations of the second aspect, when the one or more programs are executed by the processors, the electronic device is enabled to perform the following step: automatically obtaining the maximum charging capability of the first charging device.

With reference to the second aspect and the foregoing implementations, in some implementations of the second aspect, when the one or more programs are executed by the processors, the electronic device is enabled to perform the following steps: displaying a third interface, where the third interface includes a third window, and the third window is used to display a plurality of parameter groups that are used to indicate maximum charging capabilities of a plurality of charging devices; detecting a third operation of the user in the third window, where the third operation is used to select a first parameter group from the plurality of parameter groups, and the first parameter group corresponds to the first charging device; in response to the first operation, determining a charging parameter corresponding to the first parameter group; and determining that the charging parameter corresponding to the first parameter group is the maximum charging capability of the first charging device.

With reference to the second aspect and the foregoing implementations, in some implementation of the second aspect, the first option is a charging option automatically selected through matching, and when the one or more programs are executed by the processors, the electronic device is enabled to perform the following steps: displaying a fourth interface before the displaying a first interface, where the fourth interface includes a fourth window, and the fourth window is used to display the first option; detecting a fourth operation of the user in the fourth window; and displaying the first interface in response to the fourth operation.

With reference to the second aspect and the foregoing implementations, in some implementations of the second aspect, the first option is determined based on a preset condition; or the first option is determined based on a current time period.

With reference to the second aspect and the foregoing implementations, in some implementation of the second aspect, the first option includes any one of a fast charging mode option, a sleep mode option, or a thermal optimization mode option.

With reference to the second aspect and the foregoing implementations, in some implementations of the second aspect, the first option is a user-defined option determined by the user by setting a charging parameter.

With reference to the second aspect and the foregoing implementations, in some implementations of the second aspect, the charging parameter includes a maximum charging voltage, a maximum charging current, charging duration, and a maximum temperature in a battery charging process.

According to a third aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by hardware executing corresponding software. The hardware or the software includes one or more modules or units corresponding to the foregoing function, for example, a display module or unit, a detection module or unit, or a processing module or unit.

According to a fourth aspect, this application provides an electronic device, including a touchscreen, where the touchscreen includes a touch-sensitive surface, a display, a camera, one or more processors, a memory, a plurality of applications, and one or more computer programs. The one or more computer programs are stored in the memory, and the one or more computer programs include an instruction. When the instruction is executed by the electronic device, the electronic device is enabled to perform the charging method according to any possible implementation of any one of the foregoing aspects.

According to a fifth aspect, this application provides an electronic device, including one or more processors and one or more memories. The one or more memories are coupled to the one or more processors. The one or more memories are configured to store computer program code, and the computer program code includes a computer instruction. When the one or more processors execute the computer instruction, the electronic device is enabled to perform the charging method according to any possible implementation of any one of the foregoing aspects.

According to a sixth aspect, this application provides a computer storage medium, including a computer instruction. When the computer instruction is run on an electronic device, the electronic device is enabled to perform the charging method according to any possible implementation of any one of the foregoing aspects.

According to a seventh aspect, this application provides a computer program product. When the computer program product is run on an electronic device, the electronic device is enabled to perform the charging method according to any possible implementation of any one of the foregoing aspects.

DESCRIPTION OF EMBODIMENTS

The following clearly describes the technical solutions in the embodiments of this application with reference to the accompanying drawings in the embodiments of this application. In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

The following terms "first" and "second" are merely intended for a purpose of description, and shall not be understood as an indication or implication of relative importance or implicit indication of the quantity of indicated technical features. Therefore, a feature limited by "first" or "second" may explicitly or implicitly include one or more features. In the descriptions of this application, unless otherwise stated, "a plurality of" means two or more than two.

An embodiment of this application provides an optional charging method for a user. The method may be applied to an electronic device, or may be an independent application. The application may be used to pop up a charging mode selection window for a user in this application, so that the user autonomously selects a charging mode and different charging effects are implemented based on different application scenarios.

The optional charging method for a user provided in the embodiments of this application may be applied to an electronic device such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in the embodiments of this application.

Figure 1:
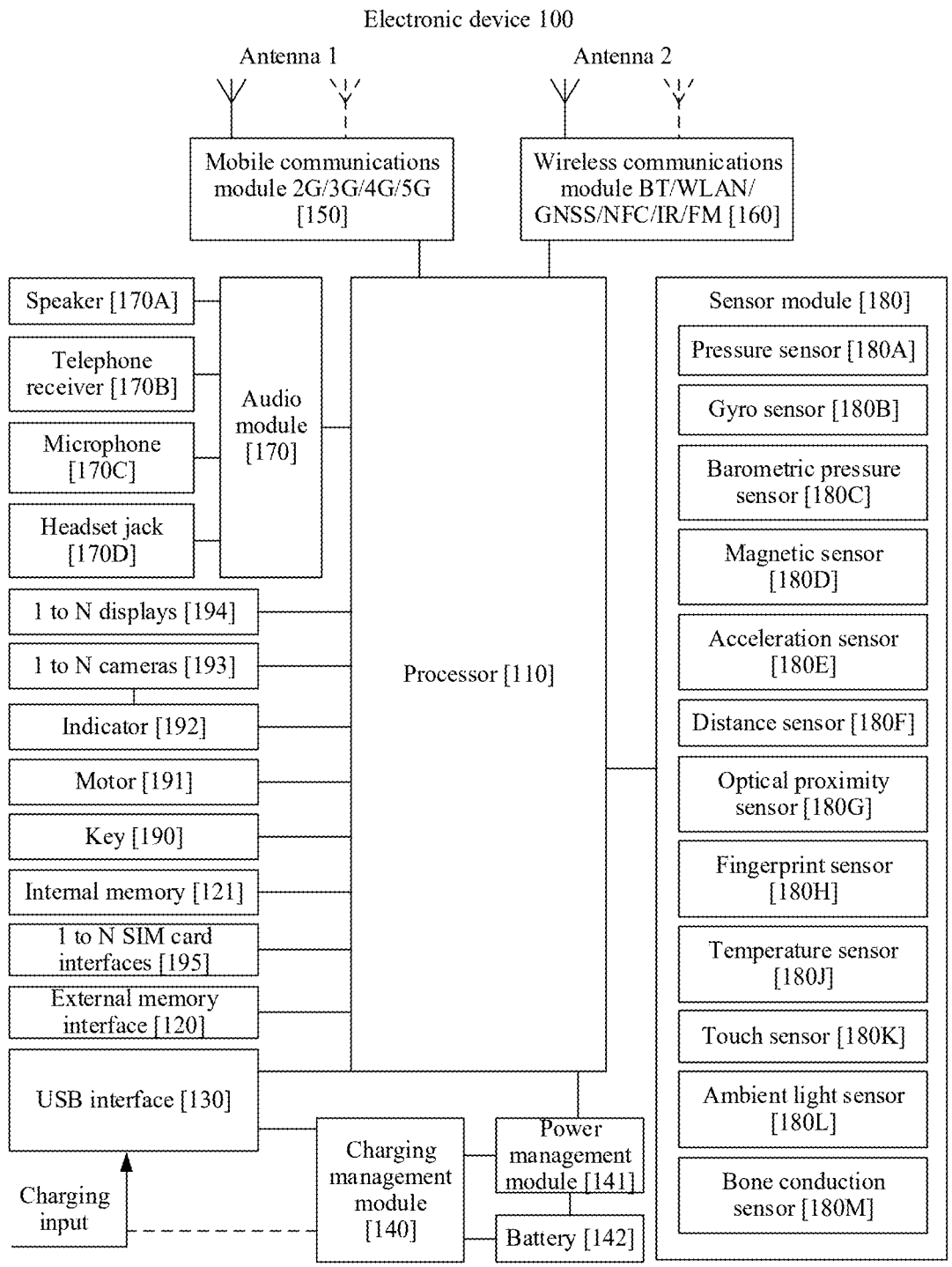
FIG. 1 is a schematic structural diagram of a terminal device according to an embodiment of this application.

For example, FIG. 1 is a schematic structural diagram of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may further be disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured for audio communication, and samples, quantizes, and codes an analog signal. In some embodiments, the audio module 170 may be coupled to the wireless communications module 160 by using the PCM bus interface. In some embodiments, the audio module 170 may also transfer an audio signal to the wireless communications module 160 through the PCM interface, to implement a function of answering a call by using a Bluetooth headset. Both the I2S interface and the PCM interface may be configured for audio communication.

The UART interface is a universal serial data bus, and is configured for asynchronous communication. The bus may be a two-way communications bus. The bus performs a conversion between serial communication and parallel communication on to-be-transmitted data. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like.

In some embodiments, the processor 110 communicates with the camera 193 by using the CSI interface, to implement a photographing function of the electronic device 100. The processor 110 communicates with the display 194 by using the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be configured for data transmission between the electronic device 100 and a peripheral device. The USB interface 130 may alternatively be configured to connect to a headset, to play audio by using the headset. The interface may alternatively be configured to connect to another electronic device such as an AR device.

It may be understood that an interface connection relationship between the modules illustrated in this embodiment of this application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger by using the USB interface 130. In some embodiments of wireless charging, the charging management module 140 may receive a wireless charging input by using a wireless charging coil of the electronic device 100. The charging management module 140 supplies power for the electronic device by using the power management module 141 while charging the battery 142.

The power management module 141 is connected to the battery 142, the charging management module 140, and the processor 110. The power management module 141 receives an input of the battery 142 and/or the charging management module 140, and supplies power for the processor 110, the internal memory 121, an external memory, the display 194, the camera 193, the wireless communications module 160, and the like. The power management module 141 may further be configured to monitor parameters such as a battery capacity, battery cycles, a battery health status (electric leakage or impedance). In some other embodiments, the power management module 141 may alternatively be disposed in the processor 110. In some other embodiments, the power management module 141 and the charging management module 140 may alternatively be disposed in a same component.

In a specific implementation process of the charging method provided in this application, a mobile phone may select different charging modes through matching based on different charger types and a capability of a mainboard of the mobile phone. A part including the charging management module 140, the power management module 141, the battery 142, and the processor 110 shown in FIG. 1 may correspond to a charging system of the mobile phone. For example, the part may include elements such as a system on chip (system on chip, SOC), a wired charging protocol chip, a wireless charging protocol chip, an either-or switch, a charging IC, a direct charging path chip, a coulomb-meter, and a battery, and the chips or components cooperate with each other to control a charging process of the mobile phone. Specifically, the collaborative cooperation process is described in detail below with reference to FIG. 9, FIG. 10, and flowcharts of implementation processes.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover a single communications frequency band or a plurality of communications frequency bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution that is for wireless communication including 2G/3G/4G/5G and the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave signal by using the antenna 1, perform processing such as filtering or amplification on the received electromagnetic wave signal, and transfer the electromagnetic wave signal to the modem processor for demodulation. The mobile communications module 150 may further amplify a signal modulated by the modem processor, and convert the signal into an electromagnetic wave signal for radiation by using the antenna 1. In some embodiments, at least some function modules in the mobile communications module 150 may be disposed in the processor 110. In some embodiments, at least some function modules in the mobile communications module 150 and at least some modules in the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to the application processor. The application processor outputs a sound signal by using an audio device (which is not limited to the speaker 170A, the telephone receiver 170B, or the like), or displays an image or a video by using the display 194. In some embodiments, the modem processor may be an independent component. In some other embodiments, the modem processor may be independent of the processor 110, and is disposed in a same component with the mobile communications module 150 or another function module.

The wireless communications module 160 may provide a solution for wireless communication such as a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, or an infrared (infrared, IR) technology applied to the electronic device 100. The wireless communications module 160 may be one or more components integrating at least one communications processor module. The wireless communications module 160 receives an electromagnetic wave signal by using the antenna 2, performs frequency modulation and filtering processing on the electromagnetic wave signal, and sends a processed signal to the processor 110. The wireless communications module 160 may further receive a to-be-sent signal from the processor 110, perform frequency modulation on and amplify the signal, and convert the signal into an electromagnetic wave signal for radiation by using the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a technology such as global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is configured to render an image. The processor 110 may include one or more GPUs that execute a program instruction to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, quantum dot light emitting diodes (quantum dot light emitting diode, QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is turned on, light is transferred to a photosensitive element of the camera through a lens, an optical signal is converted into an electrical signal, and the photosensitive element of the camera transmits the electrical signal to the ISP for processing, to convert the electrical signal into an image that can be seen. The ISP may further optimize an algorithm for noise, brightness, and complexion of an image. The ISP may further optimize parameters such as exposure and a color temperature of a photographing scene. In some embodiments, the ISP may be disposed in the camera 193.

The camera 193 is configured to capture a static image or a video. An optical image of an object is generated by using the lens, and is projected to a photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to: perform Fourier transform on frequency energy, or the like.

The video codec is configured to compress or decompress a digital video. The electronic device 100 can support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by using a biological neural network structure such as a mode of transmission between human-brain nerve cells, and may further constantly perform self-learning. Applications such as intelligent cognition of the electronic device 100, such as image recognition, facial recognition, speech recognition, and text understanding, can be implemented by using the NPU.

The external memory interface 120 may be configured to connect to an external storage card such as a micro SD card, to extend a storage capability of the electronic device 100. The external storage card communicates with the processor 110 by using the external memory interface 120, to implement a data storage function, for example, store files such as music and a video into the external storage card.

The internal memory 121 may be configured to store computer-executable program code, and the executable program code includes an instruction. The processor 110 runs the instruction stored in the internal memory 121, to implement various function applications and data processing of the electronic device 100. The internal memory 121 may include a program storage area and a data storage area. The program storage area may store an operating system, an application required by at least one function (for example, a voice play function or an image play function), and the like. The data storage area may store data (such as audio data and an address book) created during use of the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing and recording, by using the audio module 170, the speaker 170A, the telephone receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may further be configured to encode and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be configured to listen to music or answer a call in a hands-free mode over the speaker 170A.

The telephone receiver 170B, also referred to as an "earpiece", is configured to convert an audio electrical signal into a sound signal. When a call is answered or a voice message is listened to by using the electronic device 100, the telephone receiver 170B may be put close to a human ear to listen to a voice.

The microphone 170C, also referred to as a "mike" or a "voice transmitter", is configured to convert a sound signal into an electrical signal. When making a call or sending a voice message, a user may make a sound near the microphone 170C by using the mouth of the user to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, alternatively, three, four, or more microphones 170C may be disposed in the electronic device 100, to collect a sound signal, reduce noise, and further identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of a conductive material. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch position based on a detection signal of the pressure sensor 180A. In some embodiments, touch operations that are applied to a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyro sensor 180B may be configured to determine a moving posture of the electronic device 100. In some embodiments, an angular velocity of the electronic device 100 around three axes (namely, x, y, and z axes) may be determined by using the gyro sensor 180B. The gyro sensor 180B may be configured to provide image stabilization during photographing. For example, when the shutter is pressed, the gyro sensor 180B detects an angle at which the electronic device 100 shakes, calculates, based on the angle, a distance for which a lens module needs to compensate, and allows the lens to cancel the shake of the electronic device 100 through reverse motion, to implement image stabilization. The gyro sensor 180B may also be used for navigation and a motion sensing game scene.

The barometric pressure sensor 180C is configured to measure barometric pressure. In some embodiments, the electronic device 100 calculates an altitude by using an atmospheric pressure value measured by the barometric pressure sensor 180C, to assist positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations in various directions (usually on three axes) of the electronic device 100, may detect magnitude and a direction of gravity when the electronic device 100 is static, and may further be configured to recognize a posture of the electronic device, and applied to an application such as switching between a landscape mode and a portrait mode or a pedometer.

The distance sensor 180F is configured to measure a distance. The electronic device 100 may measure the distance by using an infrared ray or a laser. In some embodiments, in a photographing scene, the electronic device 100 may use the distance sensor 180F to measure a distance to implement fast focusing.

The optical proximity sensor 180G may include, for example, a light emitting diode (LED) and an optical detector such as a photodiode. The light emitting diode may be an infrared light emitting diode. The electronic device 100 emits infrared light by using the light emitting diode. The electronic device 100 uses the photodiode to detect infrared reflected light from an object nearby. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, so that the electronic device 100 automatically turns off the screen to save power. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket to prevent a false touch.

The fingerprint sensor 180H is configured to collect a fingerprint. The electronic device 100 may use a feature of the collected fingerprint to implement fingerprint unlocking, accessing an application lock, fingerprint photographing, fingerprint call answering, and the like.

The temperature sensor 180J is configured to detect a temperature. In some embodiments, the electronic device 100 executes a temperature processing policy by using the temperature detected by the temperature sensor 180J. For example, when a temperature reported by the temperature sensor 180J exceeds a threshold, the electronic device 100 lowers performance of a processor located near the temperature sensor 180J, to reduce power consumption to implement thermal protection. In some other embodiments, when the temperature is below another threshold, the electronic device 100 heats the battery 142 to prevent the electronic device 100 from abnormally shutting down due to the low temperature. In some other embodiments, when the temperature is below still another threshold, the electronic device 100 boosts an output voltage of the battery 142 to prevent abnormal shutdown caused by the low temperature.

The touch sensor 180K is also referred to as a "touch panel". The touch sensor 180K may be disposed on the display 194, and the touch sensor 180K and the display 194 constitute a touchscreen. The touch sensor 180K is configured to detect a touch operation on or near the touch sensor 180K. The touch sensor may transfer the detected touch operation to the application processor to determine a type of a touch event. Visual output related to the touch operation may be provided by using the display 194. In some other embodiments, the touch sensor 180K may also be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may alternatively be disposed in the headset, to obtain a bone conduction headset. The audio module 170 may parse out a voice signal based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to detect a heart rate.

The key 190 includes a power key, a volume key, and the like. The key 190 may be a mechanical key, or may be a touch key. The electronic device 100 may receive a key input, and generate a key signal input related to a user setting and function control of the electronic device 100.

The motor 191 may generate a vibration prompt. The motor 191 may be configured to provide an incoming call vibration prompt, and may further be configured to feed back a touch vibration. For example, touch operations performed on different applications (for example, photographing and audio playing) may correspond to different vibration feedback effects. The motor 191 may also correspond to different vibration feedback effects for touch operations applied to different areas of the display 194. Different application scenarios (for example, a time reminder, information receiving, an alarm clock, and a game) may also correspond to different vibration feedback effects. Customization of the touch vibration feedback effect may further be supported.

The indicator 192 may be an indicator light that may be configured to indicate a charging state and a battery power change, and may further be configured to indicate a message, a missed call, a notification, and the like.

The SIM card interface 195 is configured to connect to a SIM card. The SIM card may be inserted into the SIM card interface 195 or plugged out from the SIM card interface 195 to come into contact with or be separated from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may all be inserted into a same SIM card interface 195. The plurality of cards may be of a same type or different types. The SIM card interface 195 may also be compatible with different types of SIM cards. The SIM card interface 195 may also be compatible with an external storage card. The electronic device 100 interacts with a network by using the SIM card, to implement a call function, a data communication function, and the like. In some embodiments, the electronic device 100 uses an eSIM, namely, an embedded SIM card. The eSIM card may be embedded in the electronic device 100 and cannot be separated from the electronic device 100.

A software system of the electronic device 100 may use a layered architecture, an event-driven architecture, a micro-kernel architecture, a micro service architecture, or a cloud architecture. In the embodiments of this application, an Android system using a layered architecture is used as an example to illustrate a software structure of the electronic device 100.

Figure 2:
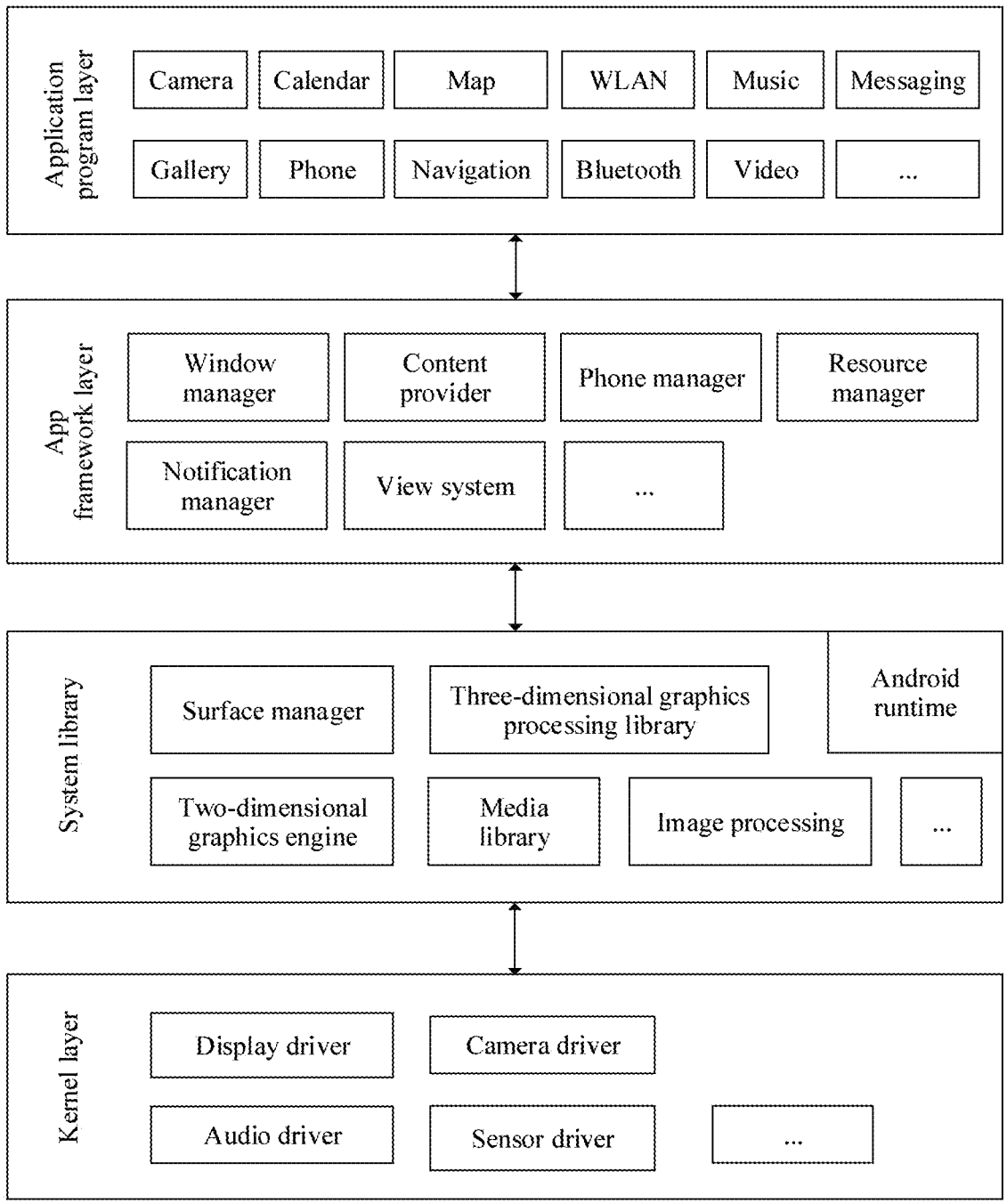
FIG. 2 is a block diagram of a software structure of an electronic device.

FIG. 2 is a block diagram of a software structure of the electronic device 100 according to an embodiment of this application. In a layered architecture, software is divided into several layers, and each layer has a clear role and task. The layers communicate with each other by using a software interface. In some embodiments, an Android system is divided into four layers, namely, an application program layer, an application program framework layer, Android runtime (Android runtime) and a system library, and a kernel layer from top to bottom. The application program layer may include a series of application program packages.

As shown in FIG. 2, the application program packages may include applications such as Camera, Gallery, Calendar, Phone, Map, Navigation, WLAN, Bluetooth, Music, Video, and Messaging.

The application program framework layer provides an application programming interface (application programming interface, API) and a programming framework for an application at the application program layer. The application program framework layer includes some predefined functions.

As shown in FIG. 2, the application program framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and make the data accessible to an application. The data may include a video, an image, an audio, made and answered calls, a browse history, a bookmark, an address book, and the like.

The view system includes visual controls such as a control for displaying a text and a control for display a picture. The view system may be configured to construct an application. The display interface may include one or more views. For example, a display interface including an SMS message notification icon may include a view for displaying a text and a view for displaying a picture.

The phone manager is configured to provide a communication function of the electronic device 100, for example, management of a call status (including connected and disconnected).

The resource manager provides various resources such as a localized character string, an icon, a picture, a layout file, and a video file for an application.

The notification manager enables an application to display notification information in the status bar, and may be configured to convey a notification-type message. The notification-type message may automatically disappear after the message is displayed for a short period of time without user interaction. For example, the notification manager is configured to provide a notification of complete download, a message notification, and the like. The notification manager may alternatively be a notification that appears on a top status bar of the system in a form of a graph or a scroll bar text, for example, a notification of an application running in the background, or may be a notification that appears on the screen in a form of a dialog window. For example, text information is prompted in the status bar, an alert sound is produced, the electronic device vibrates, or the indicator light blinks.

The Android runtime includes a kernel library and a virtual machine. The Android runtime is responsible for scheduling and management of the Android system.

The kernel library includes two parts: a function that needs to be invoked by the Java language and a kernel library of the Android system.

The application program layer and the application program framework layer run on the virtual machine. The virtual machine executes Java files at the application program layer and the application program framework layer as binary files. The virtual machine is configured to perform functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording in a plurality of commonly used audio and video formats, static image files, and the like. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, an electronic device having the structures shown in FIG. 1 and FIG. 2 is used as an example to describe in detail, with reference to the accompanying drawings and application scenarios, the optional charging method for a user provided in the embodiments of this application.

It should be noted that the mobile phone shown in FIG. 1 is merely an example of the electronic device, and this is not particularly limited in this application. This application may be applied to an intelligent device such as a mobile phone or a tablet computer. This is not limited in this application. In descriptions of the embodiments of this application, a mobile phone is used as an example for description.

In a process of using the mobile phone, an application scenario is complex and changeable. For different application scenarios, different charging processes are required to meet a current requirement of the user. For example, when the user works in daytime and the mobile phone has low battery power, a fast charging solution may be required. When the user is asleep or does not use the mobile phone at night, some charging solutions that can improve a current battery status may be required. When the user uses the mobile phone for a longer period of time, some charging solutions for reducing battery life attenuation may be required. When the user uses the mobile phone to play a game, some charging solutions with relatively low heat may be required. When the mobile phone is used as a demo sample of a merchant, a charging solution that can improve a battery life of the sample may be required.

Therefore, this application provides an optional mobile phone charging method for a user, so that the user can autonomously change a charging curve, and different charging effects are implemented based on different application scenarios.

For ease of understanding of this application, some human-computer interaction embodiments in this application are first described.

In some embodiments of this application, the mobile phone may determine, based on a current application scenario, whether to open a charging mode selection window after the mobile phone is connected to a charger. After the mobile phone determines to open the charging mode selection window, the user may select a charging mode for the mobile phone in the charging mode selection window. This meets different charging requirements in different application scenarios.

Figure 3A:
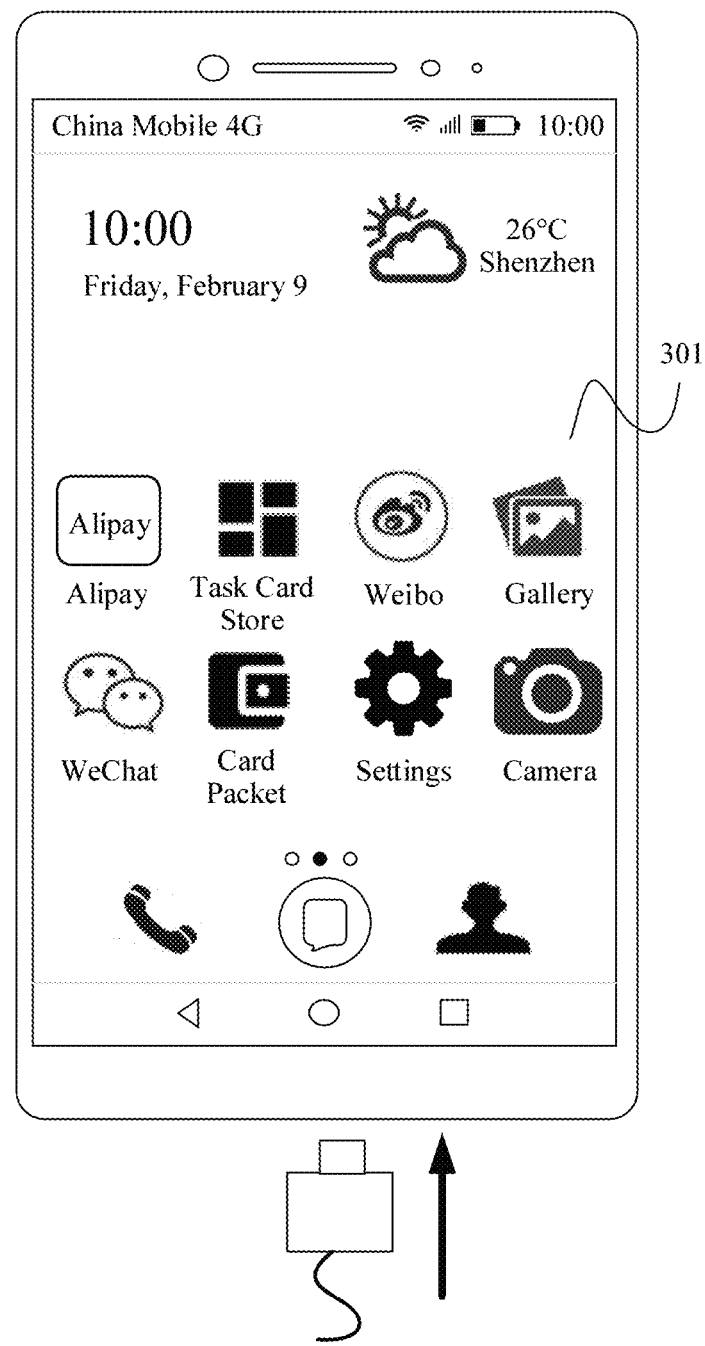
FIG. 3(a) to FIG. 3(e) are schematic diagrams of an example of an optional charging method for a user according to an embodiment of this application.

FIG. 3(a) to FIG. 3(e) are a schematic diagram of an optional charging method for a user according to this application. For example, FIG. 3(a) to FIG. 3(e) are a schematic diagram showing that after a user connects a charger to a mobile phone in a possible application scenario, the mobile phone opens a charging mode selection window and the user selects different charging modes. As shown in FIG. 3(a), a screen display system of the mobile phone displays current possible interface content, and the interface content is a home screen 301 of the mobile phone. The home screen 301 may display a plurality of third-party applications (application, App), for example, Alipay, Task Card Store, Album, Weibo, WeChat, Card Packet, Settings, and Camera. It should be understood that the interface content 301 may further include more applications. This is not limited in this application.

In some embodiments, not limited to the home screen 301 of the mobile phone, the interface content displayed by the mobile phone may be interface content displayed by the mobile phone in response to an input user operation. The user operation may include a tap operation performed by the user on icons of some applications on a desktop displayed by the mobile phone. For example, after the user taps an application, such as WeChat, Alipay, Task Card Store, Weibo, Album, Card Packet, or Settings, displayed on the home screen 301 of the mobile phone, the user accesses a display interface corresponding to the application.

Figure 3B:
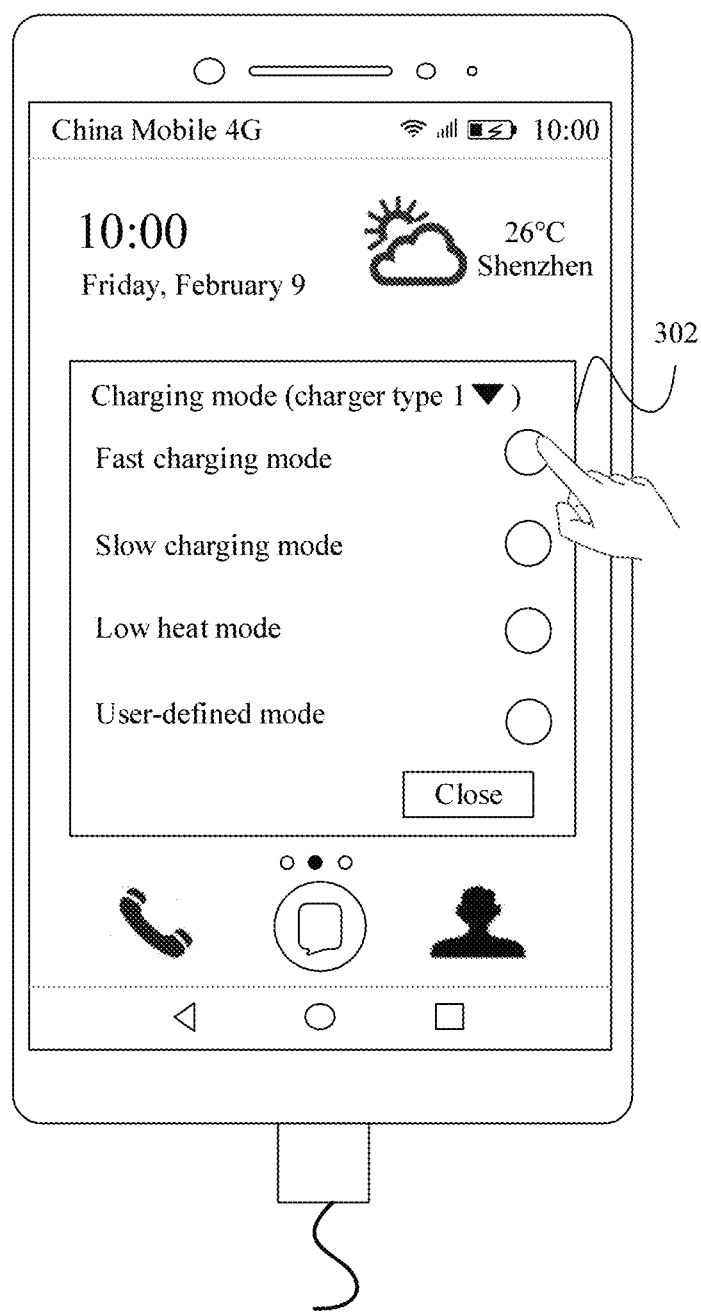
Figure 3C:
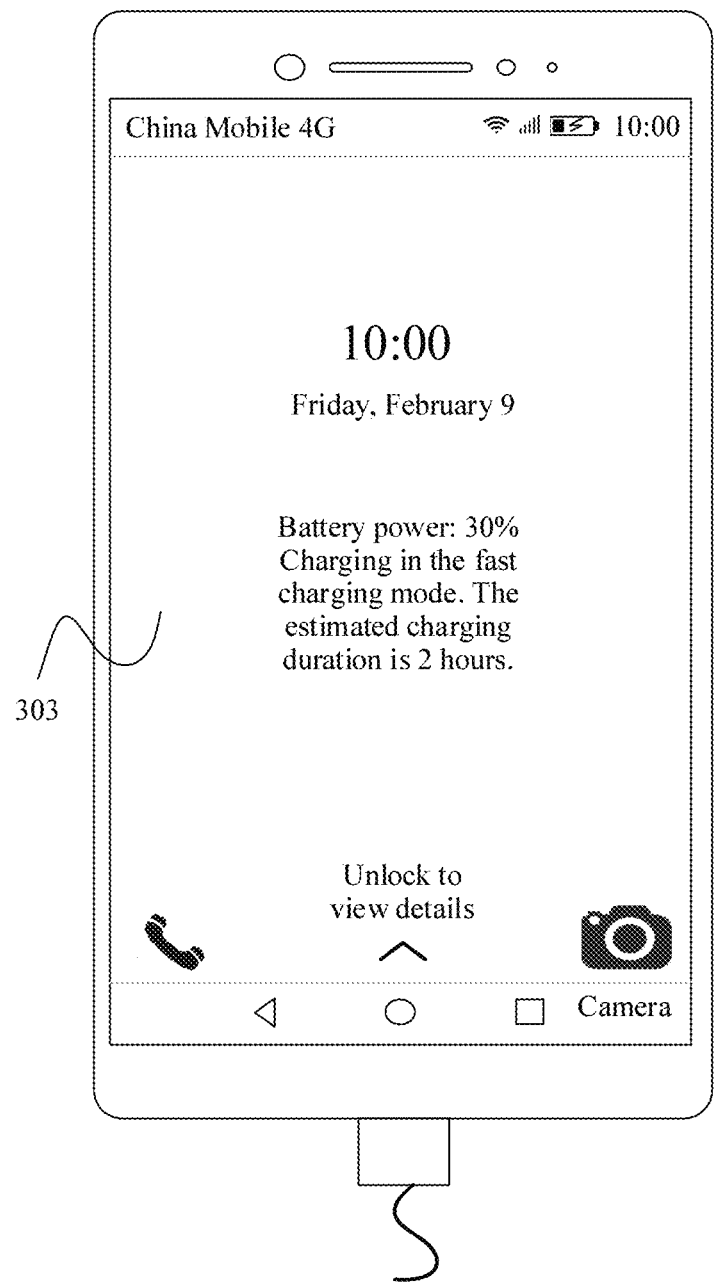

As shown in FIG. 3(b), after the mobile phone is connected to the charger, the mobile phone opens and pops up a charging mode selection window 302. The charging mode selection window 302 may present a plurality of optional charging modes for the user, for example, a fast charging mode, a slow charging mode, and a low heat mode that are listed in FIG. 3(b), and may further present a user-defined mode that can be selected and set by the user. Content presented in the charging mode selection window 302, and a quantity and types of charging modes are not limited in this application. Specifically, for example, charging parameters are a maximum charging voltage and a maximum charging current. A possible correspondence between a charging mode and the charging parameters is shown in Table 1. The maximum charging voltage may include a maximum charging voltage of a battery side (which is subject to a single battery) and a maximum charging voltage of the charger side. A charging system of the mobile phone controls output mainly based on a voltage and current of the battery side. Regardless of whether the voltage of the charger side is 20 V, 10 V, 9 V, 5 V, or another value, a voltage and current to the battery side of the mobile phone are an actual charging voltage and current. Therefore, in this application, examples and descriptions of the maximum charging voltage are all subject to the battery side.

TABLE 1

| Charging mode | Maximum charging voltage (unit: volt) | Maximum charging current (unit: ampere) |
| --- | --- | --- |
| Fast charging mode | 5.5 (battery side) 11 (charger side) | 8 (battery side) 5 (charger side) |
| Slow charging mode | 4.4 (battery side) 5 (charger side) | 2 (battery side) 2.5 (charger side) |
| Low heat mode | 4.4 (battery side) | 1 (battery side) |

It should be understood that, in the examples of the charging mode in this application, names such as the fast charging mode, the slow charging mode, the low heat mode, and the user-defined mode only represent that the charging mode is associated with different charging parameters, and the names may be randomly modified. This is not limited in this application.

It should be further understood that, in a process in which the user modifies the charging mode, the user changes the charging mode by modifying values of the charging parameters.

It should be understood that, a manner in which the mobile phone is connected to the charger is not limited in this application. For example, the mobile phone may be connected to the charger in a wired connection manner or a wireless connection manner. A charging method is not limited to direct wired charging, normal wired charging, direct wireless charging, normal wireless charging, or the like.

Optionally, the charger may further be provided with more security measures. For example, in a charging process, if a battery temperature exceeds a preset temperature range, which may be usually set to 0° C. to 45° C., charging is suspended. If a battery voltage is lower than 3.89 V after the charging ends, the battery will be charged again.

It should be further understood that the charging modes displayed in the charging mode selection window depend on a degree of matching between the mobile phone and the charger, for example, depend on a main board capability and software support of the mobile phone, and a type and a capability of the charger. In this application, a charging mode supported by the mobile phone matches a charging mode supported by the charger. For example, a possible correspondence between charger types and the charging modes is shown in Table 2. When the mobile phone supports the fast charging mode, for example, the connected charger of type 1 supports the fast charging mode, the charging modes displayed in the charging mode selection window may include the fast charging mode, the slow charging mode, the low heat mode, the user-defined mode, and the like. When the mobile phone supports the slow charging mode, for example, the connected charger of type 2 supports the fast charging mode, the charging modes displayed in the charging mode selection window may include the slow charging mode, the low heat mode, the user-defined mode, and the like. When the mobile phone supports the slow charging mode, for example, the connected charger of type 3 supports the slow charging mode, the charging modes displayed in the charging mode selection window may include the slow charging mode, the user-defined mode, and the like.

TABLE 2

| Charger type | Maximum charging voltage (unit: volt) | Maximum charging current (unit: ampere) | Charging mode |
|---|---|---|---|
| Charger type 1 (12 V-4 A) | 6 (battery side) | 8 (battery side) | Fast charging mode |
| | 12 (charger side) | 4 (charger side) | |
| | 4.4 V (battery side) | 2 (battery side) | Slow charging mode |
| | 5 V (charger side) | 2 (charger side) | |
| | 4.4 V (battery side) | 1 (battery side) | Low heat mode |
| Charger type 2 (9 V-2 A) | 4.4 V (battery side) | 2 (battery side) | Slow charging mode |
| | 9 V (charger side) | 2 (charger side) | |
| | 4.4 V (battery side) | 1 (battery side) | Low heat mode |
| | 9 V (charger side) | 2 (charger side) | |
| Charger type 3 (5 V-2 A) | 4.4 V (battery side) | 1 (battery side) | Slow charging mode |
| | 5 V (charger side) | 1.5 (charger side) | |
| Charger type 4 (5 V-2 A) | 4.4 V (battery side) | 1 (battery side) | Low heat mode |
| | 5 V (charger side) | 2 (charger side) | |
| Charger type 5 (12 V-4.5A) | 6 (battery side) | 8 (battery side) | Fast charging mode |
| | 12 (charger side) | 4.5 (charger side) | |

When the mobile phone is connected to the charger, the mobile phone may identify a type of the charger by using a charging detection module, to obtain a maximum charging capability of the charger. When the charging mode supported by the mobile phone matches the charging mode supported by the charger, for example, a Huawei mobile phone is connected to a Huawei charger, a charging mode supported by the charger may be detected and displayed. When the charging mode supported by the mobile phone does not match the charging mode supported by the charger, or the mobile phone cannot identify the charging mode supported by the charger, the mobile phone may be charged by using the non-standard charger. For example, a Huawei phone is connected to a Meizu charger, and the Meizu charger supports a charging mode in which a charging voltage is 5 V and a charging current is 2 A (ampere, A). After the mobile phone is connected to the charger, the mobile phone may not identify the charging mode supported by the charger, and is charged by using a charging voltage of 5 V and a charging current of 500 mA, to ensure that the mobile phone is charged in a secure charging mode.

The user may select any charging mode listed in the charging mode selection window 302. For example, an operation shown in FIG. 3(b) is performed. The user may select the fast charging mode based on a current application scenario of the mobile phone, and tap a selection widget of the fast charging mode, so that the mobile phone enters the fast charging mode. In a possible implementation, after the user taps and selects any charging mode, in response to the tap operation, the mobile phone may directly close the charging mode selection window 302. Alternatively, the user may close the charging mode selection window 302 by using a "cancel" widget configured in the charging mode selection window 302. This is not limited in this application.

The mobile phone enters the charging mode selected by the user, and performs charging according to a charging policy corresponding to the charging mode. Optionally, in a charging process, a lock screen mode of the mobile phone may present a display interface 303 shown in FIG. 3(c). For example, the display interface 303 in the lock screen mode may display a current date, a current time, current battery power of the mobile phone, a charging mode in which the mobile phone is being charged, estimated charging duration required for full charging, and the like. This is not limited in this application. It should be understood that the mobile phone enters a charging state from a moment at which the mobile phone is connected to the charger. From the moment at which the mobile phone is connected to the charger to a moment at which the user selects a desired charging mode by using the pop-up charging mode selection window, the mobile phone may be charged in a specified charging mode.

In a possible implementation, the specified charging mode may be a charging mode supported by the charger to which the mobile phone is connected for charging. For example, when the mobile phone is connected to the charger, the mobile phone may identify a type of the charger by using a charging detection module, to obtain information about the charger. When the charging mode supported by the mobile phone matches the charging mode supported by the charger, for example, a Huawei mobile phone is connected to a Huawei charger, a charging mode supported by the charger may be detected and displayed. When the charging mode supported by the mobile phone does not match the charging mode supported by the charger, or the mobile phone cannot identify the charging mode supported by the charger, for example, a Huawei mobile phone is connected to a Meizu charger, and the Meizu charger supports a charging mode with a charging voltage of 9 V and a charging current of 2 A and a low heat mode with a charging voltage of 5 V and a charging current of 1 A, after the mobile phone is connected to the charger, the mobile phone may not identify whether the charger supports the low heat mode, and is charged in the charging mode in which the charging voltage is 9 V and the charging current is 2 A.

Alternatively, the mobile phone is charged according to a charging mode that was set by the user for previous charging. For example, the user previously set the fast charging mode for charging, and the mobile phone is also charged in the fast charging mode after the mobile phone is connected to the charger this time.

Alternatively, the mobile phone detects a current application scenario of the mobile phone, and intelligently selects a charging mode through matching based on the current application scenario. From a moment at which the mobile phone is connected to the charger, the mobile phone is charged in the charging mode automatically selected through matching. For example, when the battery power of the mobile phone is low in a working time of the user in daytime, the mobile phone automatically selects the fast charging mode through matching, to shorten a charging time. After the mobile phone is connected to the charger, the mobile phone is charged in the fast charging mode. How the charging mode is automatically selected through matching will be described in detail later.

After the mobile phone is connected to the charger, the mobile phone is first charged in any specified charging mode listed above. After the user selects the charging mode in the charging mode selection window, charging is performed in the selected charging mode.

In a possible implementation, as shown in FIG. 3(b), the charging mode selection window 302 popped up by the mobile phone may further include a charger selection widget, for example, "charger type X". The user may select a charger type by tapping the black inverted small triangle widget, for example, a tap operation shown in FIG. 3(d), and different charger types may be displayed in the charging mode selection window 302. The user performs a tap operation shown in FIG. 3(e), and selects a type from a plurality of charger types. For example, the user may tap "Charger type 1" to access the interface shown in FIG. 3(b). The charging mode selection window 302 displays a plurality of charging modes that can be supported by the charger of type 1.

According to the foregoing solution, after the mobile phone is connected to the charger, when the mobile phone cannot identify a charging mode supported by the charger, the user may manually select a charger type, and then a charging mode that can be selected and that matches the charger is presented to the user. It should be understood that each charger type corresponds to different types and quantities of charging modes. When the user selects a different type of charger, the charging mode selection window may display, to the user, a list of charging modes supported by the charger. For example, in FIG. 3(b), when the charger type 1 is used, after the mobile phone is connected to the charger, the mobile phone automatically identifies type 1 of the connected charger, and the charger type 1 may correspond to the fast charging mode, the slow charging mode, the low heat mode, and the user-defined mode.

In a possible implementation, each charging mode is determined based on a maximum charging capability of the charger. Specifically, the user performs the tap operation shown in FIG. 3(d). In response to the tap operation, the charging mode selection window 302 may display different charger types, for example, a type 1 (12 V-4 A), a type 2 (9 V-2 A), a type 3 (5 V-2 A), and a type 4 (5 V-1 A) that are of the charger shown in FIG. 3(d). "12 V-4 A", "9 V-2 A", or the like is used to represent a maximum charging capability of the charger. "12 V-4 A" represents that a maximum charging voltage supported by the charger is 12 V, and a maximum charging current supported by the charger is 4 A. Similarly, "9 V-2 A" represents that a maximum charging voltage supported by the charger is 9 V, and a maximum charge current supported by the charger is 2 A. When the mobile phone cannot identify the maximum charging capability of the connected charger, the user may select a charger type by using the charger selection widget. In other words, the mobile phone may obtain the maximum charging capability of the charger based on selection of the user. In a possible implementation, charging parameters associated with a charging mode displayed in the charging mode selection window 302 are determined based on charging parameters corresponding to the obtained maximum charging capability. For example, based on FIG. 3(b), the mobile phone determines, based on the charger of type 1, that the maximum charging capability is "12 V-4 A". In various supported modes, associated charging parameters may be those shown in Table 3.

TABLE 3

| Charging mode | Maximum charging voltage (unit: volt) | Maximum charging current (unit: ampere) |
| --- | --- | --- |
| Fast charging mode | 12 | 4 |
| Slow charging mode | 6 | 2 |
| Low heat mode | 8 | 1 |
| User-defined mode | — | — |

For example, based on that the maximum charging capability of the charger of type 1 is "12 V-4 A", the maximum charging voltage is 12 V, and the maximum charging current is 4 A. A charging parameter associated with the fast charging mode may be a parameter corresponding to the maximum charging capability, a charging parameter associated with the slow charging mode may be 50%, 80%, or the like of a value of the parameter corresponding to the maximum charging capability, and a charging current associated with the low heat mode may be 25% or the like of the maximum charging current. The foregoing lists possible manners of determining the charging parameters associated with the charging modes. This is not limited in this application.

In a possible implementation, types and quantities of various charging modes displayed in the charging mode selection window 302 may be fixed, or the displayed charging modes may include only several modes supported by the charger.

For example, the charging mode selection window 302 shown in FIG. 3(b) includes the fast charging mode, the slow charging mode, the low heat mode, and the user-defined mode. For different charger types, the charging mode selection window 302 may present the listed charging modes. However, in a selection process of the user, if the charger type 1 does not support the fast charging mode, the fast charging mode in the charging mode selection window 302 may be in an invalid state. For example, the user taps the fast charging mode but the fast charging mode does not take effect, or the fast charging mode is gray and cannot be selected after a tap of the user. Alternatively, the charging mode selection window 302 shown in FIG. 3(b) includes the fast charging mode, the slow charging mode, the low heat mode, and the user-defined mode. All these charging modes are modes supported by the charger of type 1. When the charger of type 1 does not support the low heat mode, the charging mode selection window 302 does not display the low heat mode, but displays only the supported fast charging mode, slow charging mode, and user-defined mode. This is not limited in this application.

According to the optional mobile phone charging method for a user that is provided in this application, the user can autonomously select a charging mode, and different charging effects are implemented based on different application scenarios. After the mobile phone is connected to the charger, the mobile phone may automatically adapt to a charging mode that matches the connected charger, and pop up the charging mode selection window 302 in a suitable scenario. The user may select different charging modes in the charging mode selection window 302, to autonomously change a charging performance and a charging effect when the charger is used.

In a possible implementation, each charging mode may further include different charging policies, and the user may select different charging policies in each charging mode.

Figure 4A:
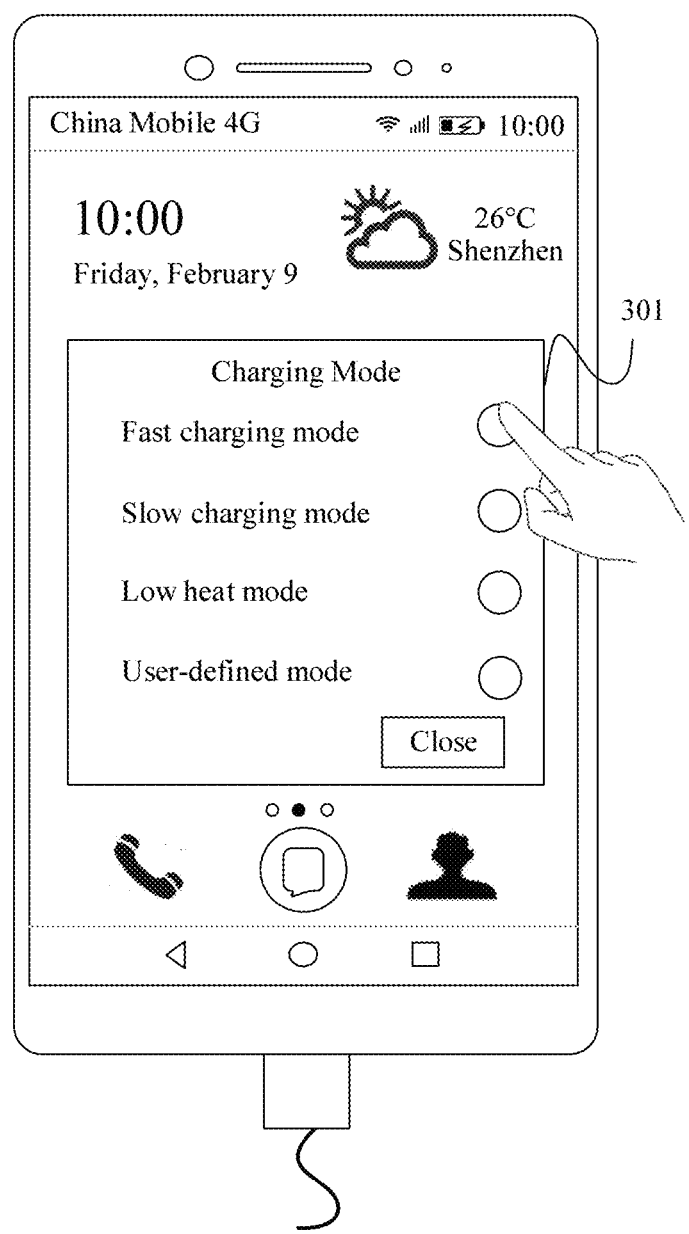
FIG. 4(a) to FIG. 4(c) are schematic diagrams of another example of an optional charging method for a user according to an embodiment of this application.
Figure 4B:
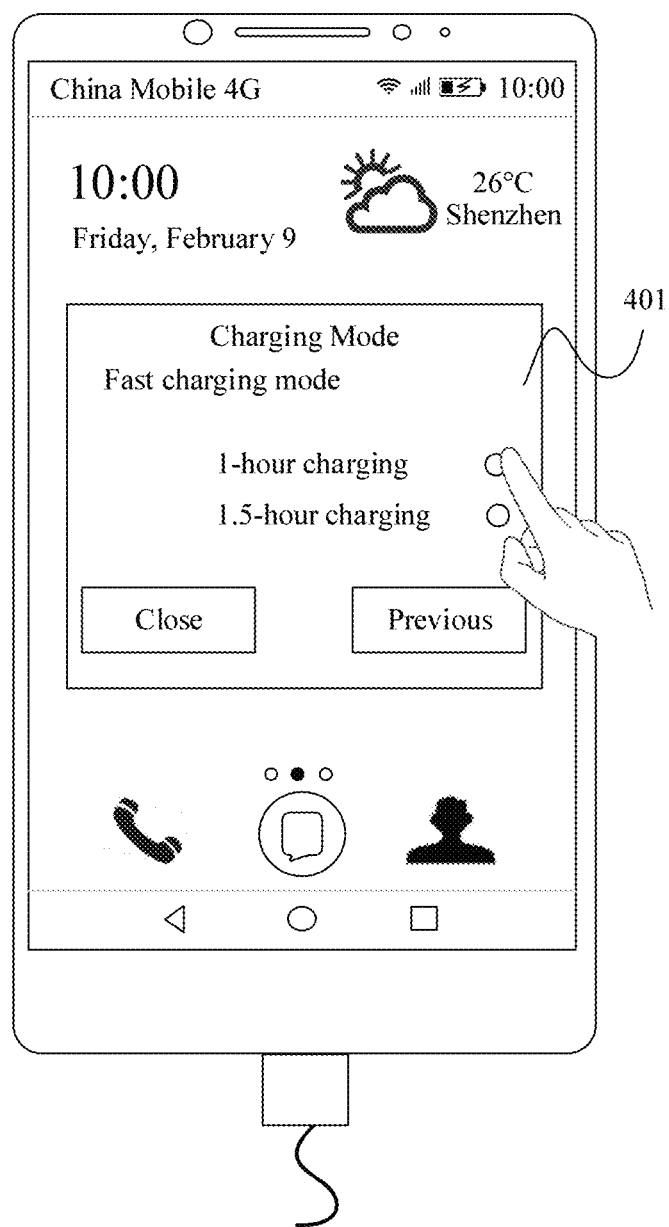
Figure 4C:
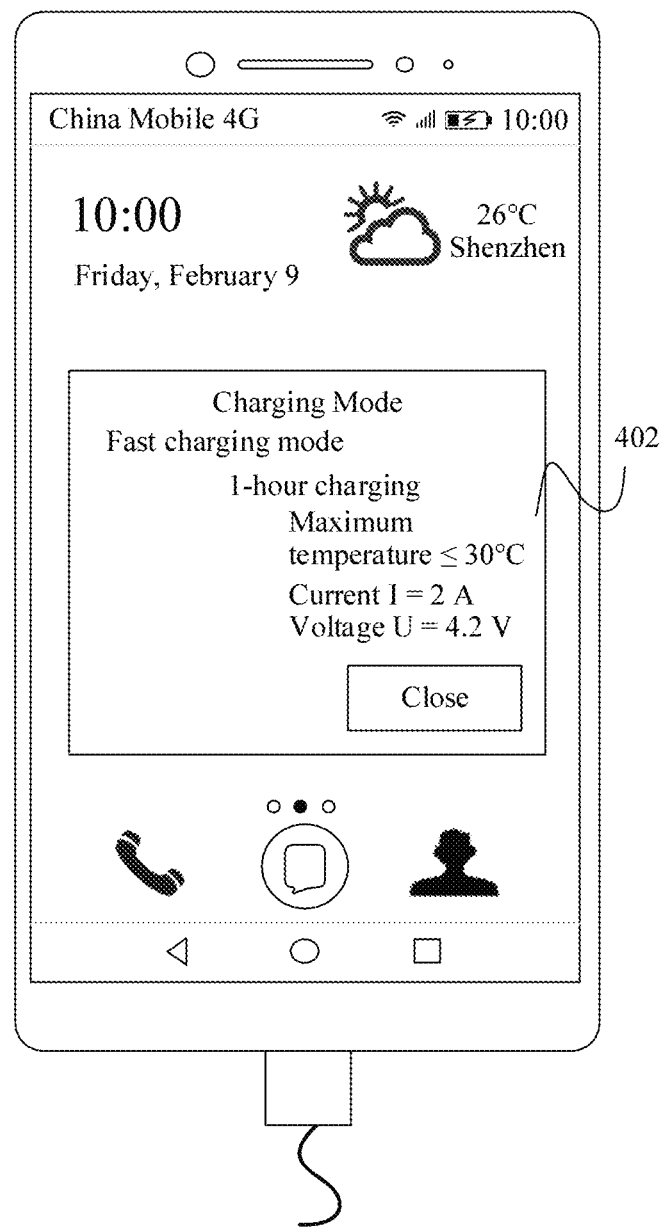

For example, FIG. 4(a) to FIG. 4(c) are schematic diagrams of another example of an optional charging method for a user according to an embodiment of this application. After the user connects a mobile phone to a charger, the mobile phone determines to open a charging mode selection window 302, and pops up the charging mode selection window 302. The user taps any charging mode in the charging mode selection window 302. Each charging mode may further include different charging policies, and charging policies in different charging modes correspond to different charging parameters. In response to the tap operation of the user, the mobile phone expands different charging policy selection controls corresponding to the charging mode. For example, as shown in FIG. 4(a), when the user taps a selection widget of a fast charging mode, the user accesses a display interface 401 shown in FIG. 4(b). The display interface displays different charging policies corresponding to the fast charging mode.

Optionally, based on charging duration, the charging policies in the fast charging mode may be classified into a 1-hour charging policy and a 1.5-hour charging policy. The user may select different charging policies in the fast charging mode. The different charging policies correspond to different parameters such as charging duration, a maximum temperature in a battery charging process, a charging current, and a charging voltage.

In an operation shown in FIG. 4(b), the user taps a 1-hour charging selection widget, and the charging mode selection window automatically displays a charging parameter details interface 402 shown in FIG. 4(c), for example, displays parameters such as charging duration, a maximum temperature in a battery charging process, a charging current, and a charging voltage.

It should be understood that the charging mode selection window is not limited to the widgets shown in the figure, and may include more widgets or include fewer widgets. For example, "Close" widgets shown in FIG. 4(a), FIG. 4(b), and FIG. 4(c) are used by the user to close the charging mode selection window when the user does not want to autonomously select a charging mode. Alternatively, a "Previous" widget shown in FIG. 4(b) is used by the user to return to the previous step to reselect a charging mode. Alternatively, another widget such as "Details", "Next", "OK", or "Cancel" may further be included. This is not limited in this application.

In a possible implementation, after the user taps and selects the charging mode or the charging policy included in the charging mode, for example, after the user taps and selects 1-hour charging shown in FIG. 4(b), the charging mode selection window may not display a corresponding parameter in the charging mode. The mobile phone is directly charged in the charging mode, and may automatically close the charging mode selection window. Alternatively, the user may tap the "Close" widget to close the charging mode selection window. Alternatively, the user may tap an area outside the charging mode selection window on the display interface of the mobile phone. In response to the tap operation, the mobile phone may directly close the charging mode selection window.

In a possible implementation, the user may not want to perform excessive complex selection operations, or the user is in a plurality of cases in which it is inconvenient for the user to select a charging mode. For example, as shown in FIG. 4(a), after the charging mode selection window 302 is popped up, the user taps only the fast charging mode, and then taps the "Close" widget to close the charging mode selection window. The fast charging mode further corresponds to different charging policies. In this case, when the user does not make a selection, a system may directly use a charging policy with shortest charging duration as a current charging policy. For example, when the user does not tap the 1-hour charging widget or the 1.5-hour charging widget shown in FIG. 4(b), and closes the charging mode selection window, the system may directly use the 1-hour charging policy. Similarly, in a slow charging mode, the system may use a charging policy with a longest charging time as a current charging policy. This is not limited in this application. In the foregoing descriptions, the user may select a desired charging mode from existing charging modes, such as the fast charging mode, the slow charge mode, or a low heat mode. In addition to the charging modes listed above, this application further provides a user-defined mode. To be specific, the user may autonomously set charging parameters to determine a charging mode. For example, when battery power of the mobile phone of the user is less than 20% within a working time of a day, but the user may not need to use the fast charging mode to quickly charge the mobile phone, the user may set the charging mode to a desired charging mode in the user-defined mode.

FIG. 5(a) to FIG. 5(h) are schematic diagrams of an example of a user-defined charging mode according to an embodiment of this application. After a charger is connected, a charging mode selection window 302 is popped up. A user may perform an operation shown in FIG. 5(a). The user taps a user-defined mode widget in the charging mode selection window 302 to access a user-defined mode setting interface 501 shown in FIG. 5(b), and selects different charging parameters in the user-defined mode.

Figure 5A:
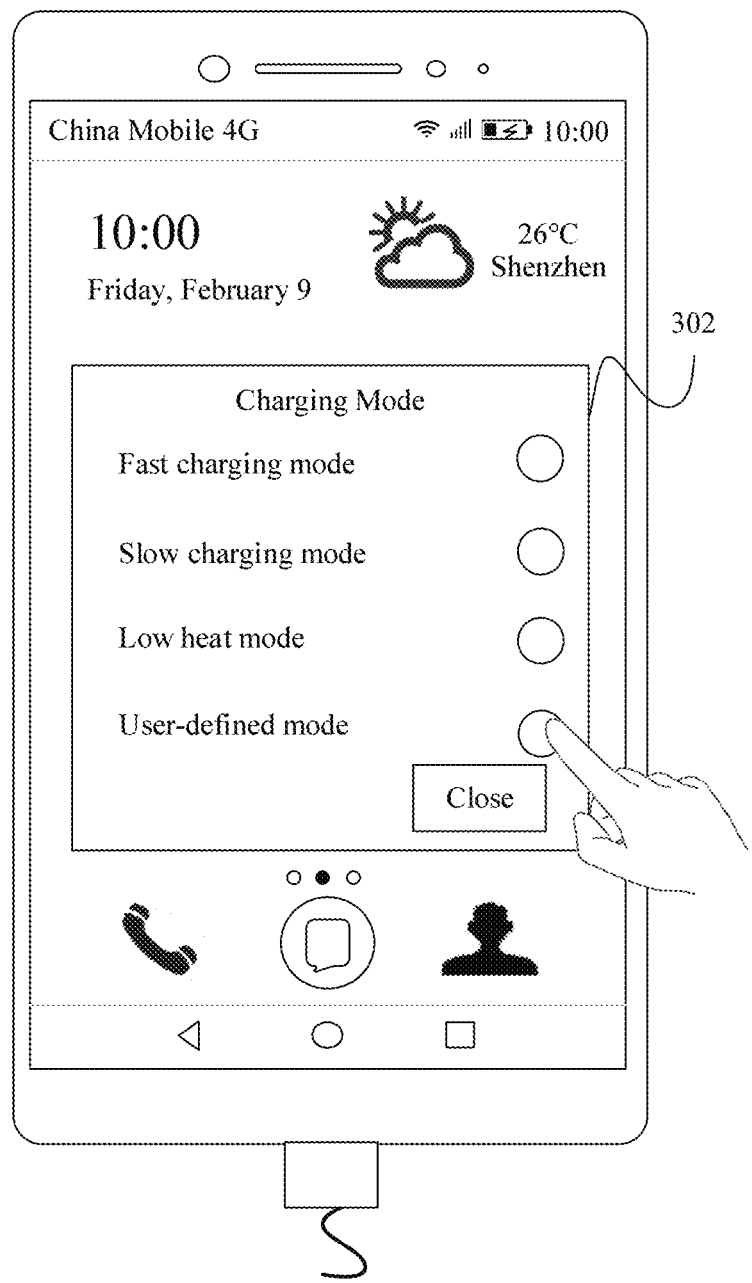
FIG. 5(a) to FIG. 5(i) are schematic diagrams of still another example of an optional charging method for a user according to an embodiment of this application.
Figure 5B:
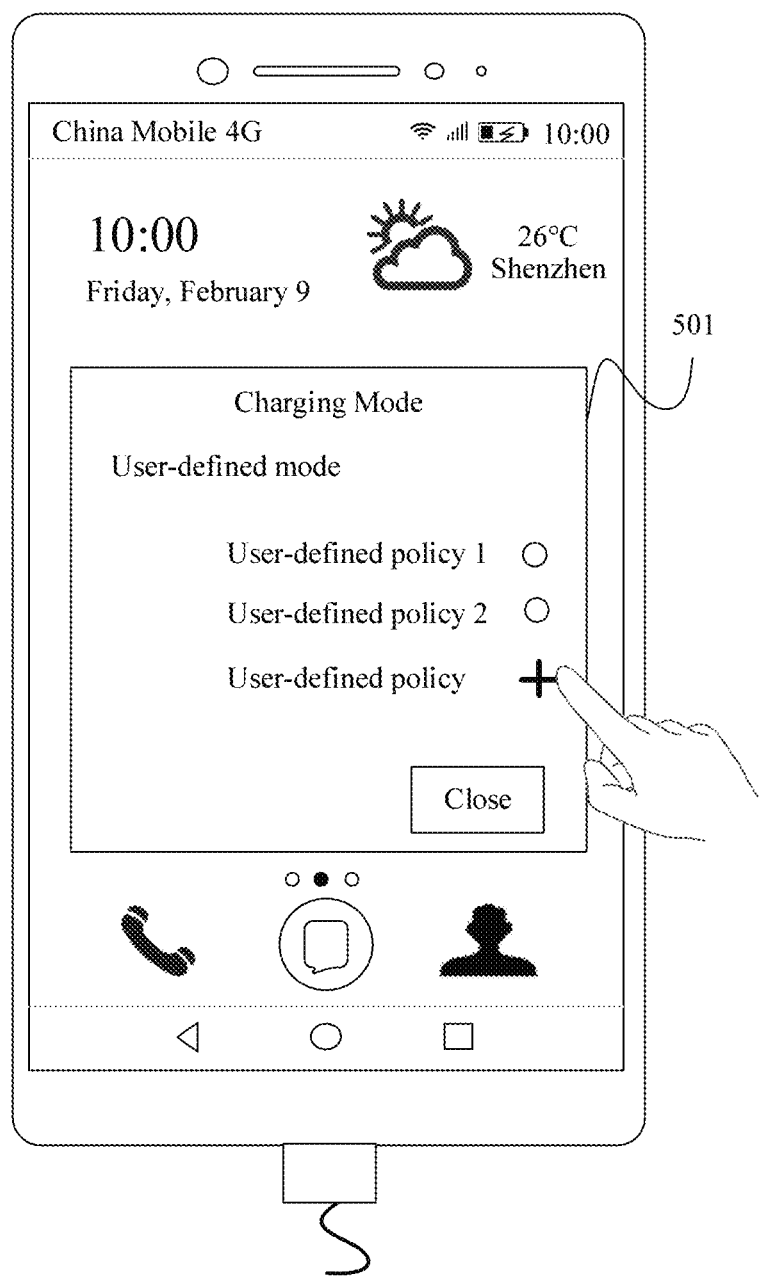

Optionally, the user-defined mode may further include a plurality of charging policies. For example, as shown in FIG. 5(b), the user-defined mode includes user-defined policies that were previously set by the user, for example, a user-defined policy 1 and a user-defined policy 2 in a list. It should be understood that a system may save the charging policies previously set by the user, and display the charging policies in the list, so that the user can directly and quickly select a previously used charging policy next time, which simplifies an operation. The user may touch any user-defined charging policy to enter a corresponding charging mode. Each charging policy corresponds to different charging parameters such as a charging voltage, a charging time, a charging current, and an average battery temperature in a charging process.

Optionally, the user performs an operation shown in FIG. 5(b). The user taps a user-defined policy widget "+", to access a parameter setting interface 502 shown in FIG. 5(c), and sets a new charging policy by adjusting values of the charging duration, the charging voltage U, and the charging current I. The user may drag a slider on a slider bar corresponding to each parameter, to change the values of the parameters. In an example of FIG. 5(c), the user drags the sliders within ranges shown in the figure. The charging duration is 2.5 hours, the charging voltage is 4.0 V, and the charging current is 0.75 A. The user may tap a "Save" widget to save the added charging policy. After tapping "Save", the preceding charging parameters are saved as charging parameters corresponding to a user-defined policy 3.

Figure 5C:
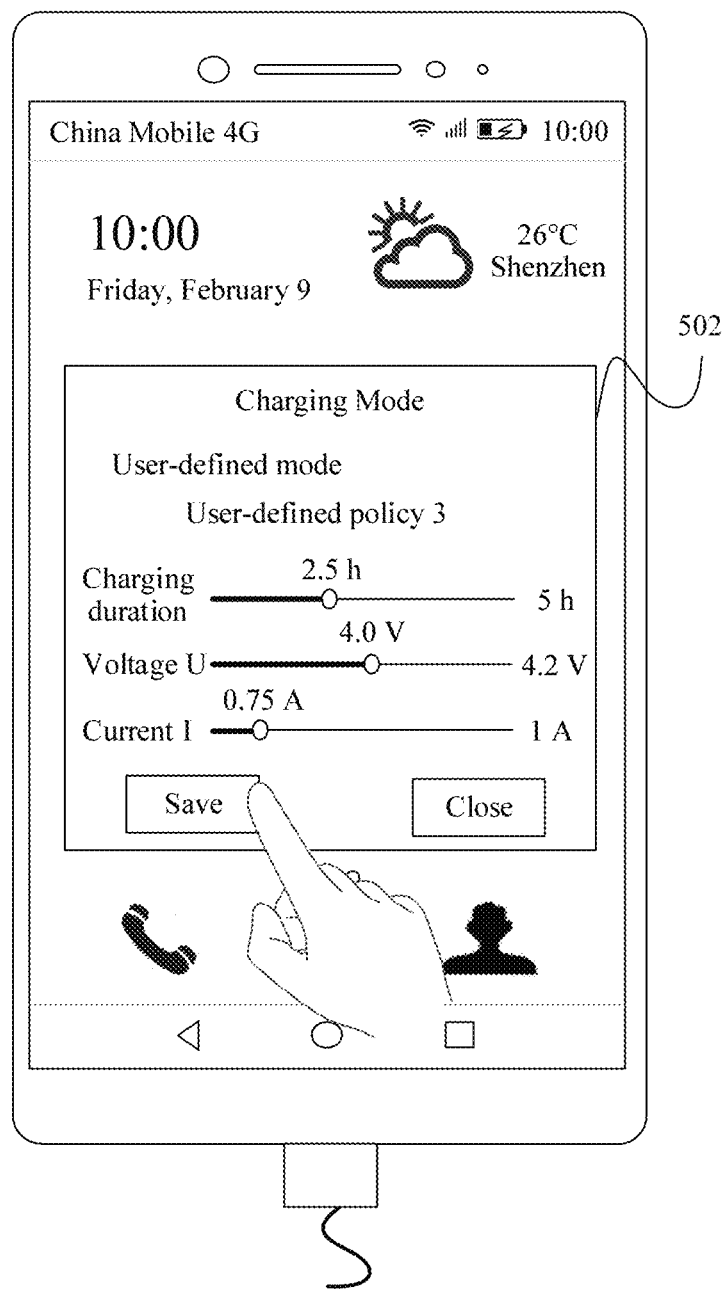
Figure 5D:
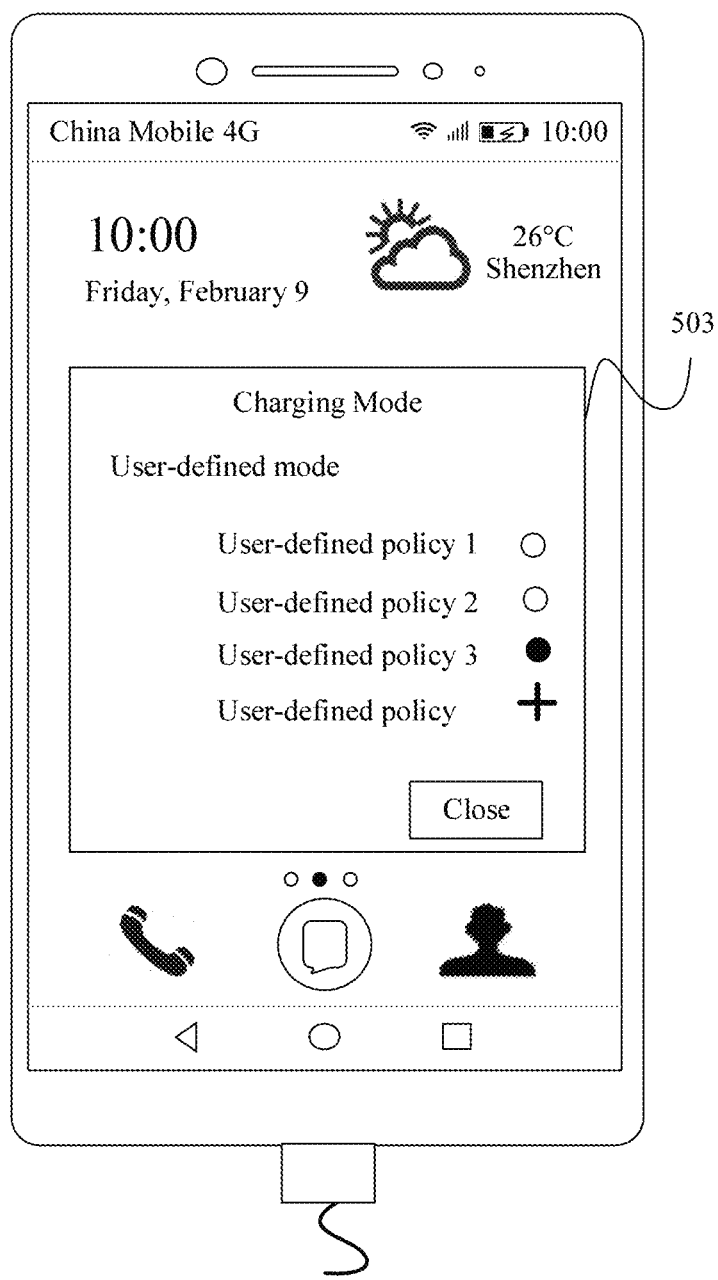
Figure 5E:
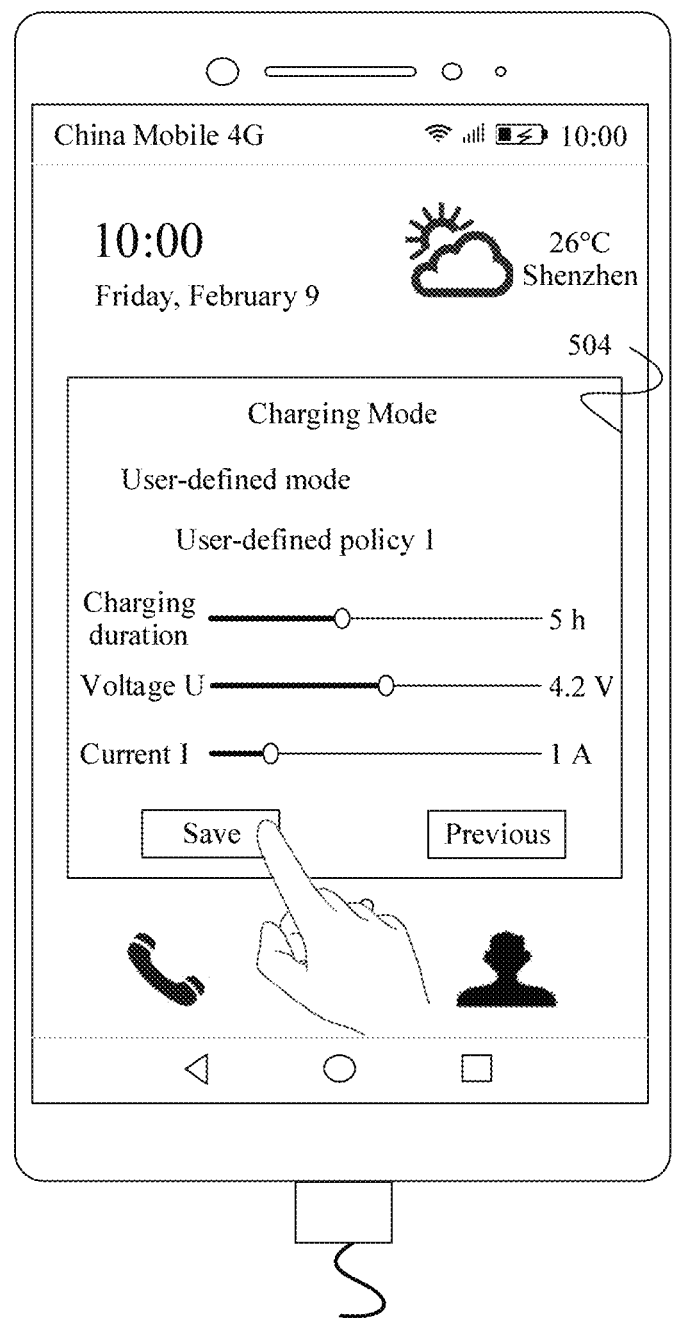
Figure 5F:
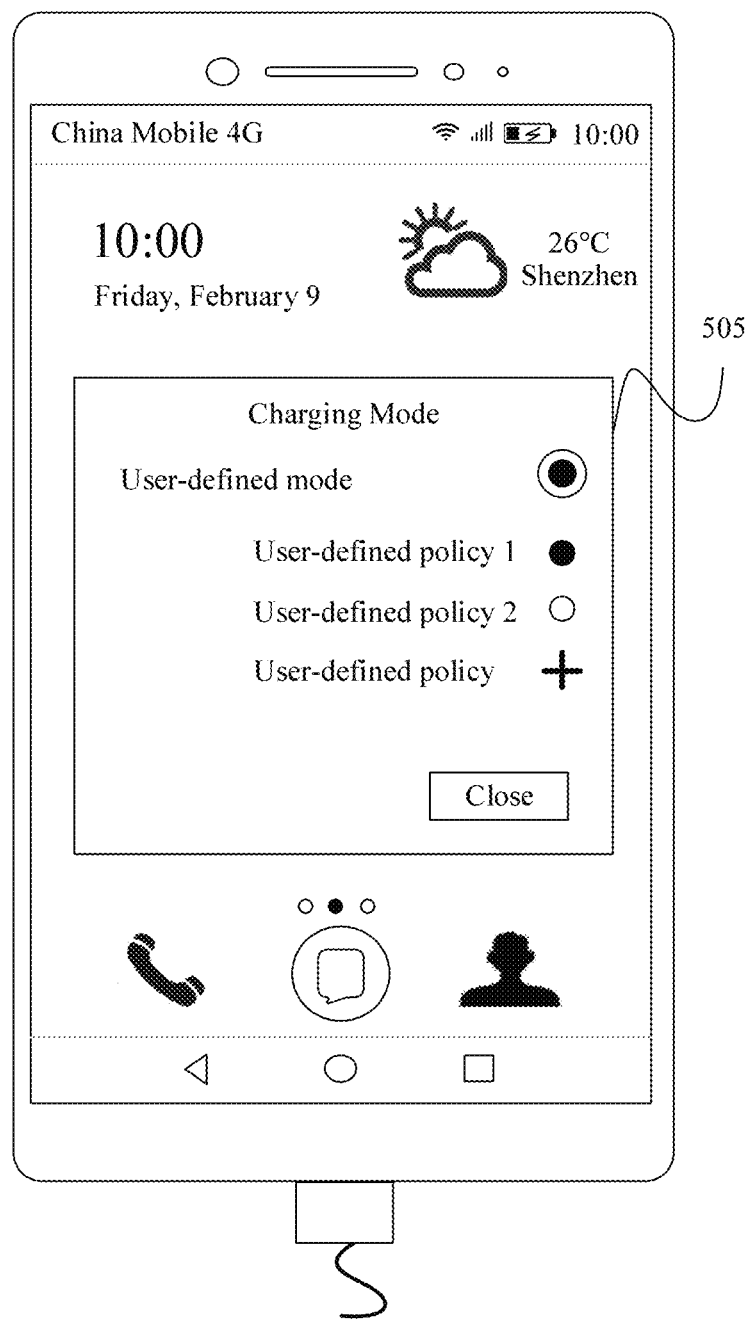

After the user performs the operation shown in FIG. 5(c), a display interface 503 in FIG. 5(d) may be displayed. In the charging mode selection window on the display interface, in addition to the original user-defined policy 1 and user-defined policy 2, the user-defined policy 3 that is newly set by the user is added, and an original user-defined charging policy addition option is moved down to a next row. In this case, the mobile phone is charged by using the user-defined policy 3.

Optionally, the user may further modify stored charging parameters of the user-defined policy 1 and the user-defined policy 2. For example, after the user taps a widget of the user-defined policy 1 in FIG. 5(i), the user accesses a parameter setting interface 504 shown in FIG. 5(e), and adjusts values of the charging duration, the charging voltage U, and the charging current I by dragging a progress bar corresponding to each parameter, to adjust originally saved charging parameters. Then, the user taps a "Save" widget to save the adjusted charging parameters. After tapping "Save", the preceding charging parameters are saved as charging parameters corresponding to the user-defined policy 1. After performing the operation shown in FIG. 5(e), a display interface 505 in FIG. 5(f) may be displayed. In this case, the mobile phone is charged by using the adjusted user-defined policy 1.

It should be understood that a quantity, types, and values of charging parameters that may be adjusted in the user-defined mode are not limited in this application. It should be further understood that, in the user-defined mode, each parameter is adjusted within a specific configuration range.

When the user taps any charging policy in the user-defined mode, the mobile phone may automatically close the charging mode selection window. Alternatively, the user may tap the "Close" widget to close the charging mode selection window. Alternatively, the user may tap an area outside the charging mode selection window on the display interface of the mobile phone. In response to the tap operation, the mobile phone may directly close the charging mode selection window. This is not limited in this application.

Figure 5G:
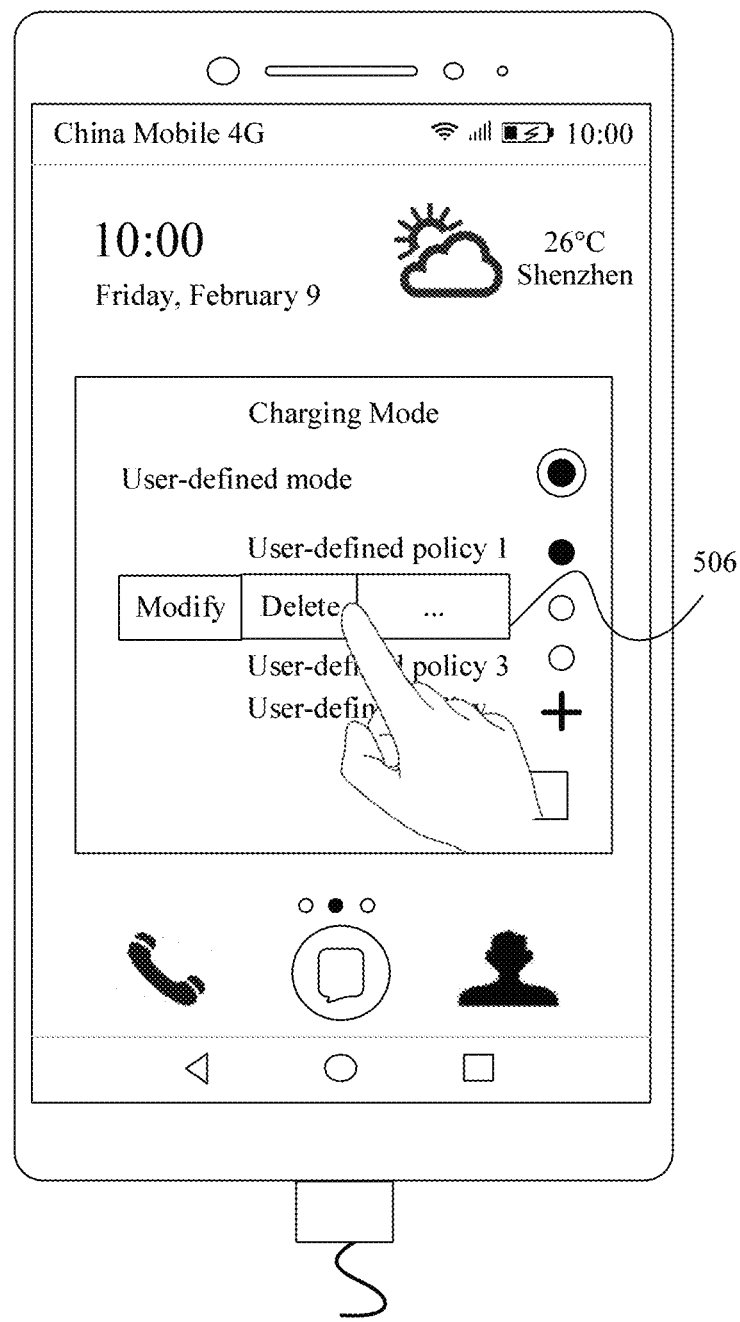
Figure 5H:
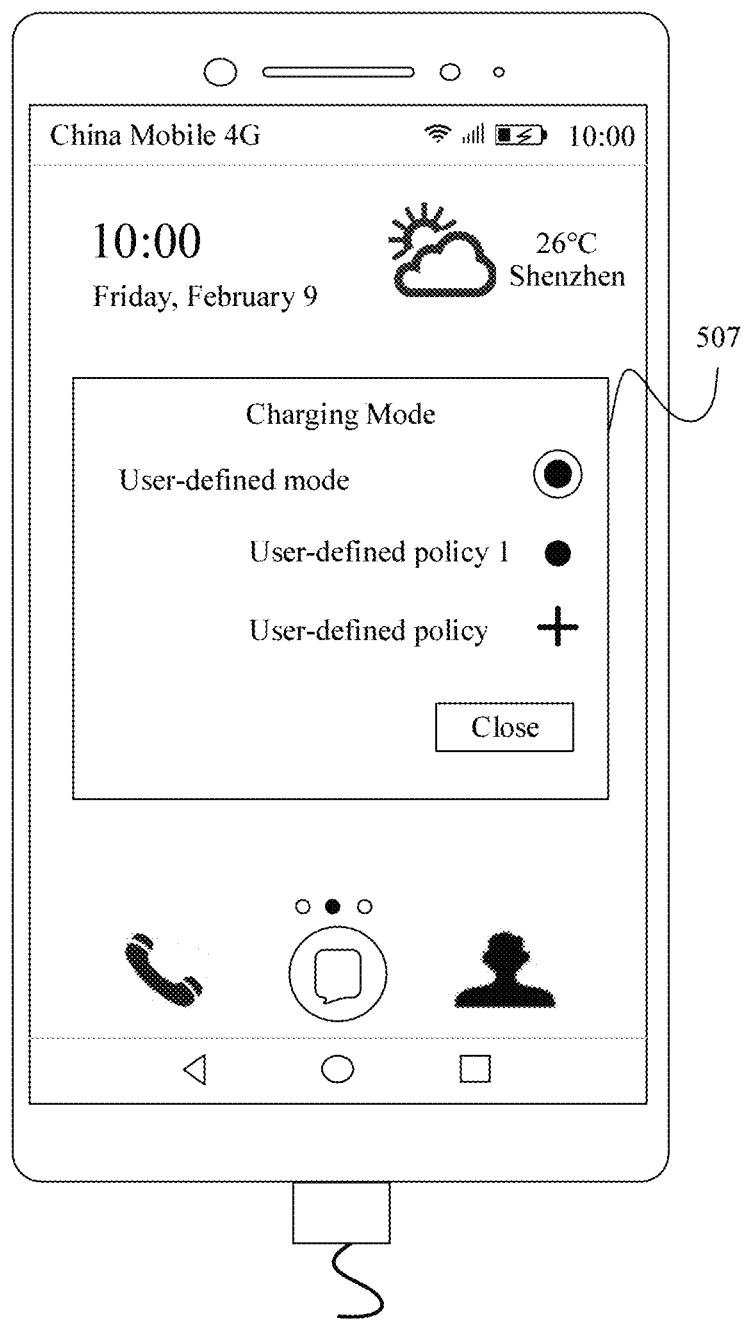
Figure 5I:
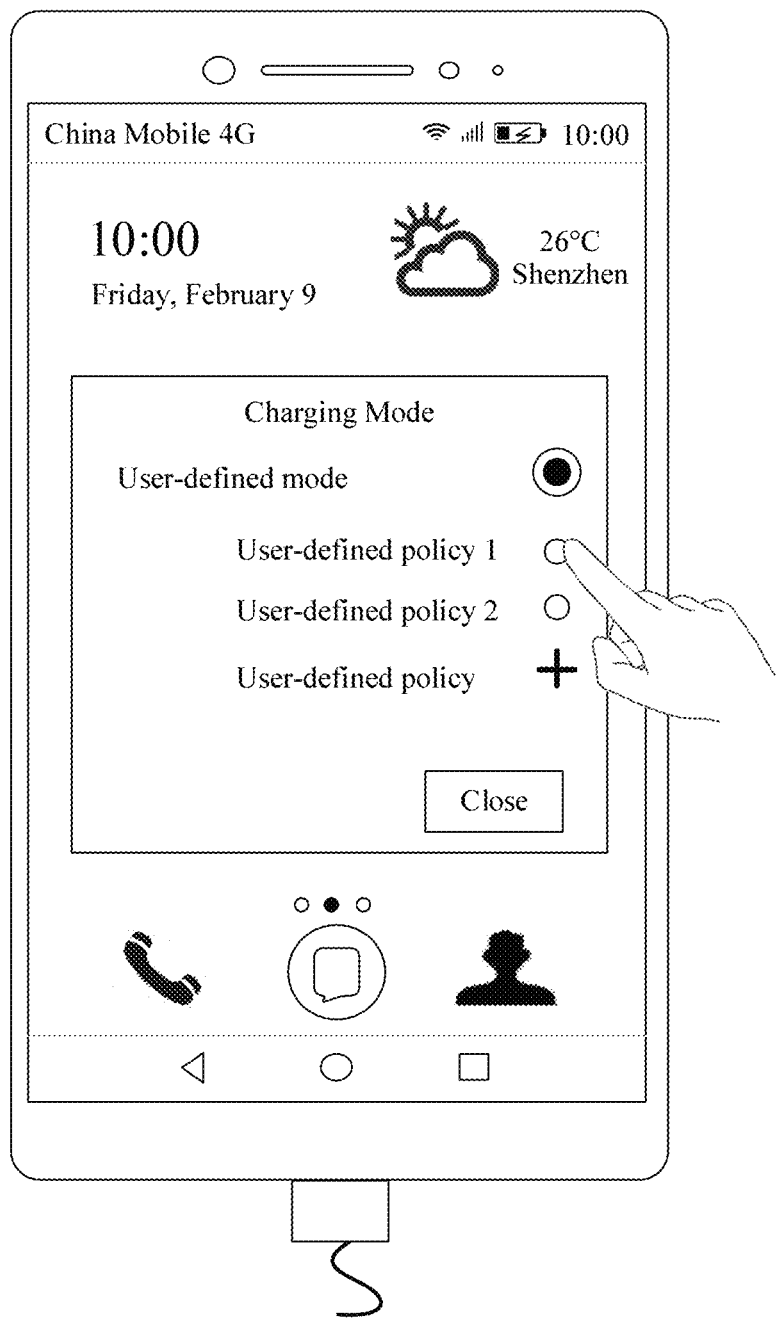

Optionally, when the user defines a plurality of user-defined charging policies, the user may further delete a previously set user-defined policy. For example, if a navigation bar of the user-defined policy 1 is pressed and held, an operation box 506 shown in FIG. 5(g) is popped up, and the operation box 506 includes widgets such as "Modify" and "Delete". The user performs an operation shown in FIG. 5(g). The user taps the Delete widget to delete the user-defined policy 1. After the user-defined policy 1 is deleted, the original user-defined policy 2 is renamed as the user-defined policy 1, and is retained in the charging policy corresponding to the user-defined mode, and a display interface 507 shown in FIG. 5(h) is displayed. This is not limited in this application.

According to the foregoing optional mobile phone charging method for a user, the user may manually select different charging modes and charging policies based on different application scenarios, to implement different charging effects. After the mobile phone is connected to a charger, the mobile phone may present, in an active charging adaptation interface, a charging mode that matches the connected charger. The user may autonomously select a currently required charging mode, or the user may autonomously change a charging performance and a charging effect of the charger based on a current application scenario. In this way, the user can select a desired charging policy as required to achieve an expected result by fully using battery performance and charger performance. This meets various requirements of the user and improves user experience. For example, when the user goes out or uses the mobile phone in an emergency, the user may select a fast charging policy; before the user goes to bed, the user may select a charging policy supporting a long battery life, to improve a battery health status, extend the battery life, reduce battery charging heat, and the like.

In the foregoing solution, the user may tap each charging mode or a charging policy in each charging mode to select a suitable charging mode for the mobile phone. In a possible implementation, the mobile phone may detect a current application scenario, and automatically select a charging policy through matching based on the current application scenario. For example, when the mobile phone detects that popup of the charging mode selection window is not allowed in a current application mode of the user, or the user may not want to perform excessive complex selection operations, or the user is in a plurality of cases in which it is inconvenient for the user to select a charging mode, the method may be used to automatically select a charging mode for the user through matching.

Optionally, when the mobile phone runs some applications, a graphics processing unit (Graphics Processing Unit, GPU) of the mobile phone is heavily loaded. For example, when the mobile phone runs a game application, a video application, a navigation application, or a camera application, popup of a charging mode selection window may affect the current application. For example, when the user plays a game, the user may not expect popup of a window, which affects an operation. In this case, after the user connects the mobile phone to the charger, the mobile phone may automatically select a charging mode through matching based on a current application scenario, without popping up the charging mode selection window. FIG. 6(a) to FIG. 6(d) are a schematic diagram of some possible charging modes that are automatically selected through matching according to an embodiment of this application. The following describes different application scenarios with reference to the accompanying drawings.

Figure 6A:
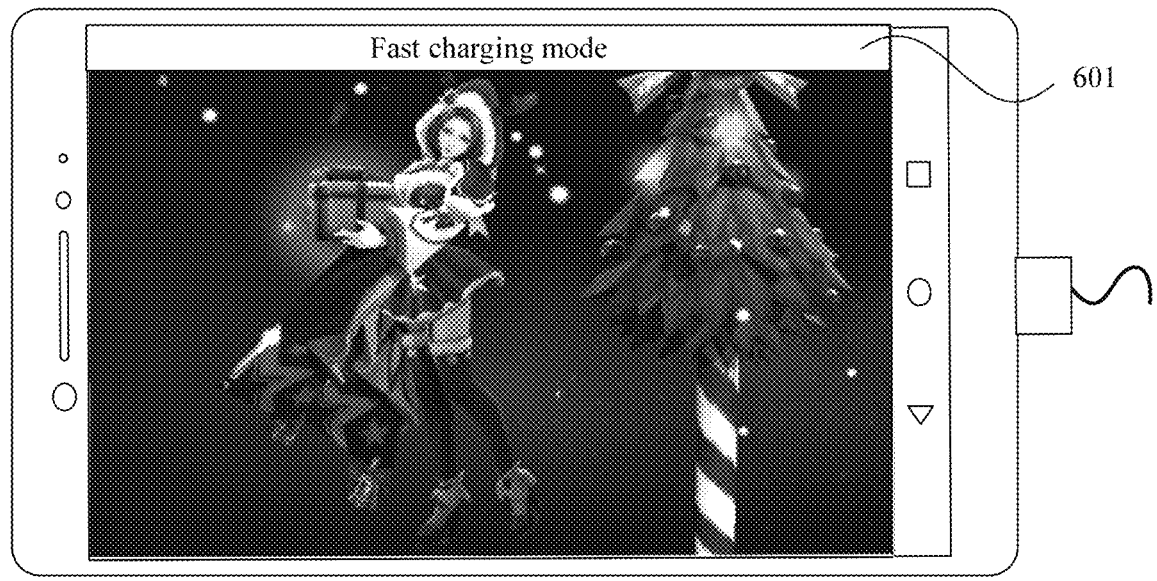
FIG. 6(a) to FIG. 6(d) are schematic diagrams of automatically selecting a charging mode through matching according to an embodiment of this application.

Application Scenario 1:

When the mobile phone detects that the mobile phone runs a game application, as shown in FIG. 6(a), after the mobile phone is connected to the charger, the mobile phone may automatically select a fast charging mode through matching, to quickly charge the mobile phone with sufficient power for the user, so that game played by the user is not affected, and user experience is improved.

Optionally, in a process of automatically selecting the charging mode through matching, the mobile phone does not actively pop up a charging mode selection window. For example, the mobile phone may automatically enter the fast charging mode to perform charging, and no prompt box is displayed on a display interface of the mobile phone. Alternatively, the mobile phone may display, in a status bar, a prompt box 601 shown in FIG. 6(a), and displayed content may be "Fast charging mode is currently used", or the like. This is not limited in this application.

Figure 6B:
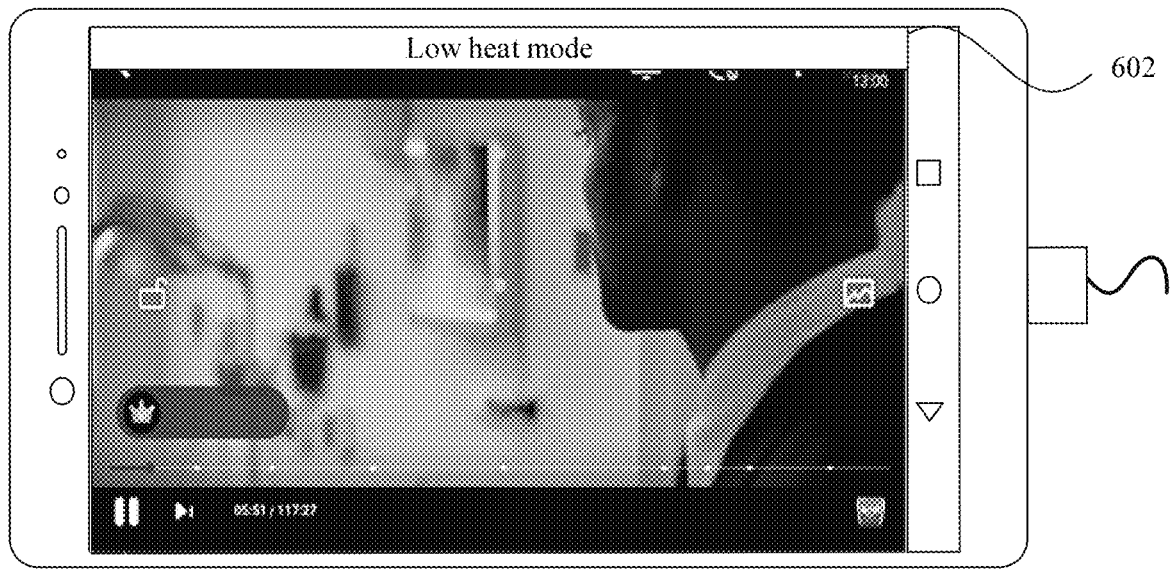
Figure 6C:
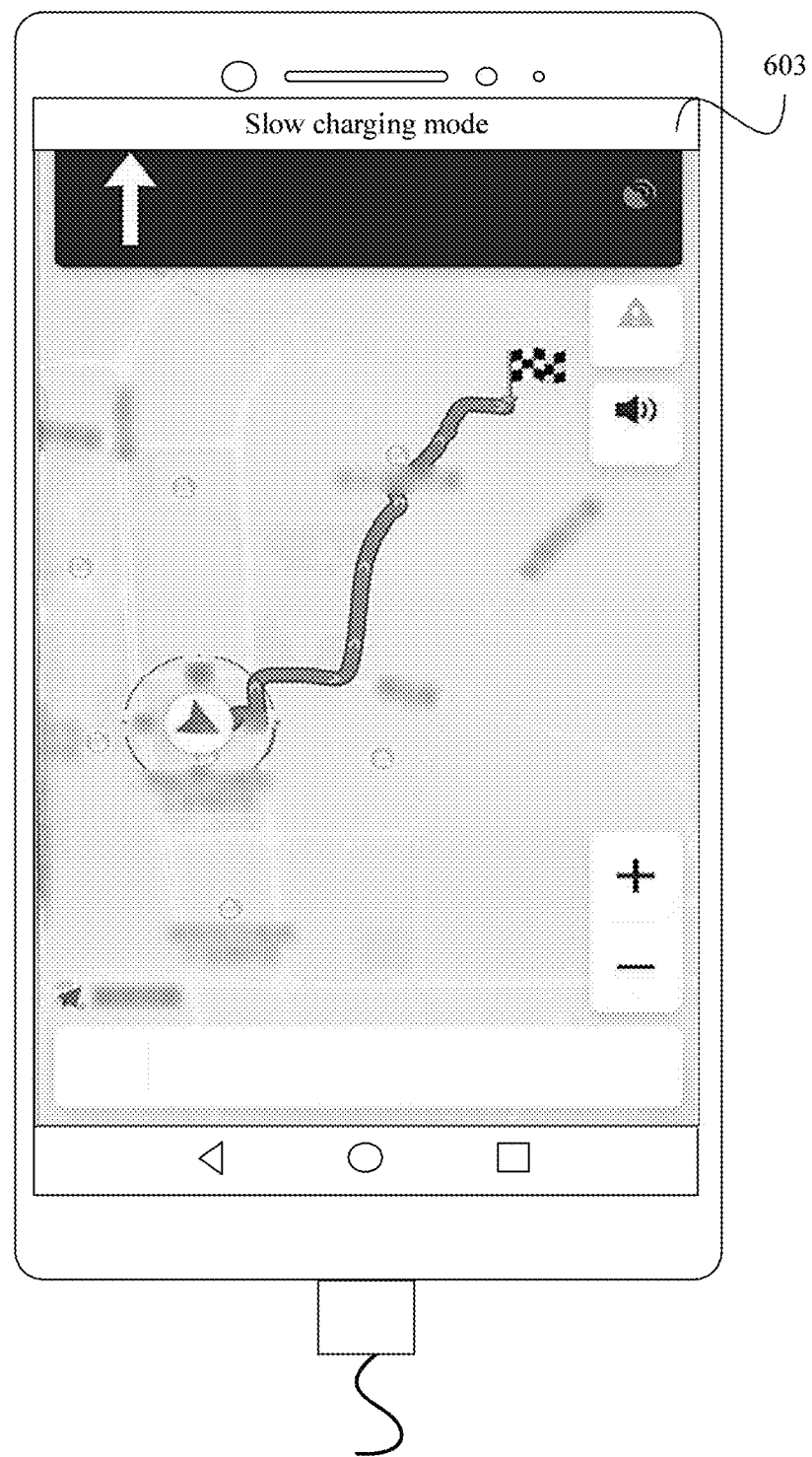
Figure 6D:
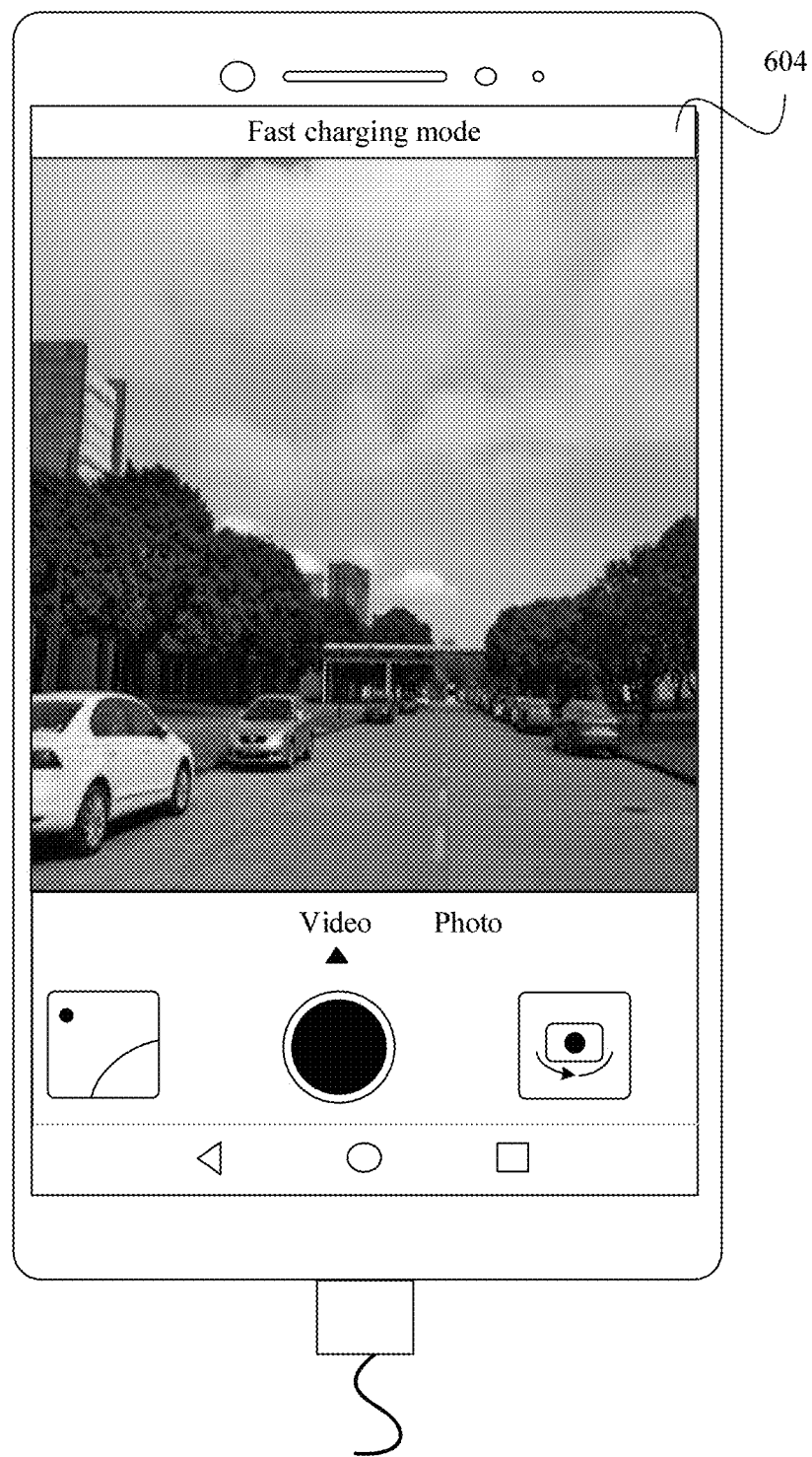

Application Scenario 2:

When the mobile phone detects that the current mobile phone runs a video playback application, as shown in FIG. 6(b), after the mobile phone is connected to the charger, the mobile phone may preferably automatically select a low heat mode through matching. Therefore, when the user plays a video, lower heat is generated, to protect a battery of the mobile phone and improve user experience.

Optionally, in an application scenario of the video playback, in a process of automatically selecting the charging mode through matching, the mobile phone does not actively pop up the charging mode selection window. For example, the mobile phone may automatically enter the low heat mode to perform charging, and no prompt box is displayed on a display interface of the mobile phone. Alternatively, the mobile phone may display, in a status bar, a prompt box 602 shown in FIG. 6(*b*), and displayed content may be "Low heat mode is currently used", or the like. This is not limited in this application.

Application Scenario 3:

When the mobile phone detects that the current mobile phone runs an in-vehicle navigation application, as shown in FIG. 6(*c*), after the mobile phone is connected to the charger, the mobile phone may preferably automatically select a slow charging mode through matching. Therefore, when the user can continuously connect the mobile phone to a power supply during driving, the slow charging mode is used to protect the battery of the mobile phone, and user experience is not affected.

Optionally, when the mobile phone runs the navigation application, the mobile phone does not actively pop up the charging mode selection window, and may directly automatically select the charging mode through matching. For example, the mobile phone may automatically enter the slow charging mode to perform charging, and no prompt box is displayed on a display interface of the mobile phone. Alternatively, the mobile phone may display, in a status bar, a prompt box 603 shown in FIG. 6(*c*), and displayed content may be "Slow charging mode is currently used", or the like. This is not limited in this application.

Application Scenario 4:

When the mobile phone detects that the current mobile phone runs a camera application, as shown in FIG. 6(*d*), after the mobile phone is connected to the charger, the mobile phone may preferably automatically select the fast charging mode through matching, so that a battery power requirement can be ensured in a shooting or photographing process of the user, and user's shooting or photographing is not affected.

Optionally, after the mobile phone is connected to the charger, the mobile phone does not actively pop up the charging mode selection window, and directly automatically selects the charging mode through matching. For example, the mobile phone may automatically enter the fast charging mode to perform charging, and no prompt box is displayed on a display interface of the mobile phone. Alternatively, the mobile phone may display, in a status bar, a prompt box 604 shown in FIG. 6(*d*), and displayed content may be "Fast charging mode is currently used", or the like. This is not limited in this application.

When running the camera application shown in FIG. 6(*d*), that the mobile phone is connected to a power supply may mean that the mobile phone is connected to a mobile power supply device such as a power bank. It should be understood that when the mobile phone is connected to a mobile power supply device such as a power bank by using a charging cable, the mobile phone may also use the method provided in this application. For example, the mobile phone may identify a charging capability of the connected mobile power supply by using a charging detection module, to obtain information about the mobile power supply. When a charging mode supported by the mobile phone matches a charging mode that can be provided by the mobile power supply, the charging mode selection window displays a charging mode that can be selected by the user, and the like. This is not limited in this application.

Application Scenario 5:

In some possible implementations, the mobile phone may automatically select a charging mode through matching based on a current time. For example, in a time period from 08:00 to 22:00 in a day, after the mobile phone is connected to the charger, the mobile phone preferably automatically selects the fast charging mode through matching. In a time period from 22:00 to 08:00, after the mobile phone is connected to the charger, the mobile phone preferably automatically selects a sleep mode or the slow charging mode through matching.

Optionally, the mobile phone may automatically select a charging mode through matching based on the foregoing listed different application scenarios and a current time period. For example, when the mobile phone is in a game mode and current time is 23:00 at night, after the mobile phone is connected to the charger, the mobile phone automatically selects the slow charging mode through matching.

It should be understood that the foregoing lists several possible application scenarios of the mobile phone. Moreover, when not popping up the charging mode selection window, the mobile phone may automatically select a charging mode through matching based on a current application scenario of the mobile phone, to meet a current charging requirement. For each scenario, the mobile phone may further select, based on another factor such as the current time, a charging mode that best matches the scenario.

It should be understood that the foregoing lists possible charging modes in different cases in the embodiments of this application. In various cases, the embodiments of this application may alternatively correspond to other charging modes. This is not limited in this application.

It should be understood that in a process of using the mobile phone, if battery power is continuously excessively low or the mobile phone is in a high energy consumption state for a long period of time, a battery loss of the mobile phone is caused. Therefore, when the battery power is low, the mobile phone can pop up a prompt window to warn the user of the low battery power and prompt the user to connect the mobile phone to a power supply in a timely manner. However, in some application modes, a pop-up prompt window may affect a current operation of the user. For example, when the user plays a game, a pop-up window may affect a current operation of the user, or an operation of closing the pop-up window may cause a game failure. For another example, when the user watches a live video, each frame of a current image cannot be adjusted by using a progress bar of the video, and a pop-up window may affect watching experience of the user, or an operation of closing the pop-up window may cause the user to miss an image. For another example, when the mobile phone is in a navigation mode during driving, a pop-up window or an operation of closing the pop-up window may reduce driving safety of the user.

In a possible implementation, the mobile phone may determine, based on the identified current application scenario of the mobile phone, whether to open the charging mode selection window after the mobile phone is connected to the charger, or provide different prompts based on types of different applications that are currently run.

FIG. 7(*a*) to FIG. 7(*f*) are schematic diagrams of a plurality of types of mobile phone pop-up windows according to an embodiment of this application. Specifically, based on types of different applications that are currently run, a current application scenario is determined, and different pop-up window modes are selected to warn low battery power.

Figure 7A:
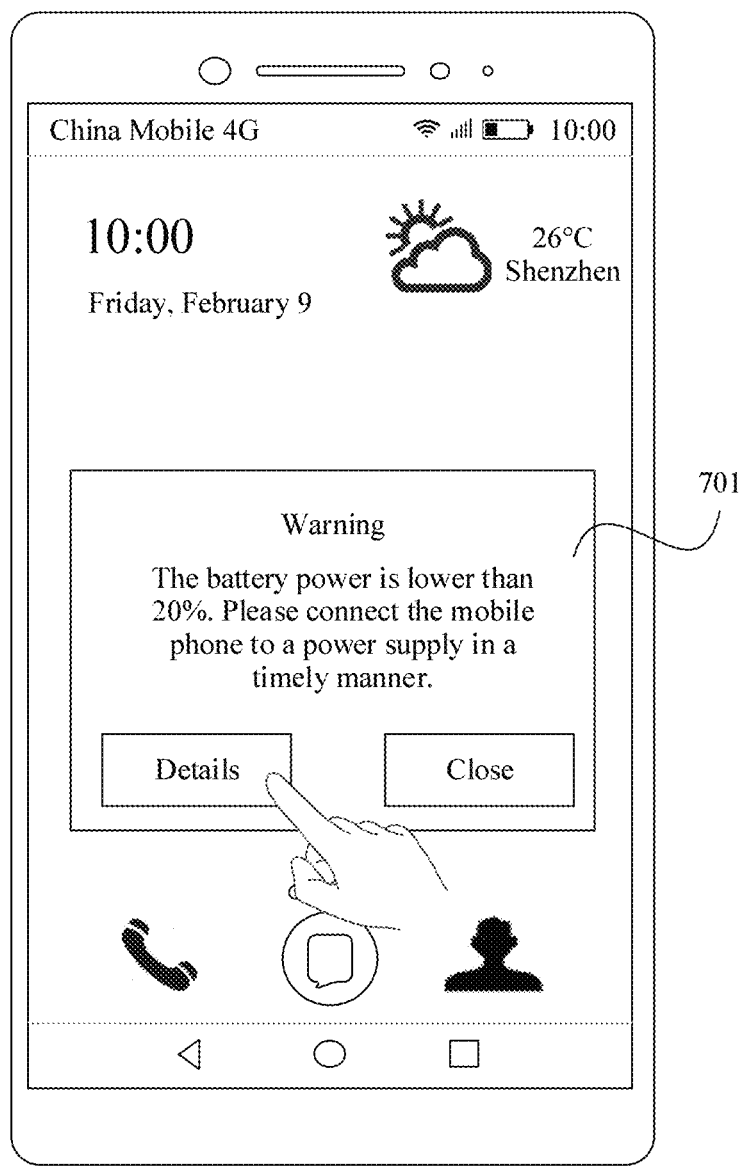
FIG. 7(a) to FIG. 7(f) are schematic diagrams of yet another example of an optional charging method for a user according to an embodiment of this application.

For example, when a mobile phone does not run a game application, a video playback application, a navigation application, a camera application, or the like, or runs another application that causes heavy load of a GPU of the mobile phone, if battery power of the mobile phone is lower than a specific threshold (where for example, the battery power is less than 20%), a pop-up window shown in FIG. 7(a) may be used to prompt a user to connect the mobile phone to a power supply in a timely manner. For example, the mobile phone displays a home screen, an e-book interface, a news interface, or the like, or enters an interface after any application is tapped. The listed interfaces on which no window is popped up may be interfaces corresponding to applications that do not cause heavy load of the GPU of the mobile phone.

In FIG. 7(a), a window 701 is a possible schematic diagram for displaying prompt content. The content displayed in the window may be used to inform the user of current remaining battery power, and prompt the user to connect the mobile phone to a power supply in a timely manner. It should be understood that, not limited to the content included in the pop-up window 701 in FIG. 7(a), during specific implementation, the pop-up window displayed by the mobile phone may further include more detailed information, for example, a battery temperature, a battery voltage, and an optimal charging mode required by the battery. This is not limited in this application.

It should be further understood that the pop-up window 701 may include a plurality of widgets, for example, "Details" and "Close" widgets shown in FIG. 7(a), where the "Details" is used by the user to quickly access a battery power details interface. Moreover, the pop-up window 701 may receive an input user operation. For example, the user performs a tap operation in FIG. 7(a), to access an interface shown in FIG. 7(b). The interface includes a battery power details box 702, which displays conditions such as remaining power of the battery, a battery temperature, a battery voltage, and an optimal charging mode required by the battery. This is not limited in this application.

Optionally, the user may tap the "Close" widget to close the window 701, or tap any place outside the pop-up window 701 on the screen to close the window 701. This is not limited in this application.

Figure 7B:
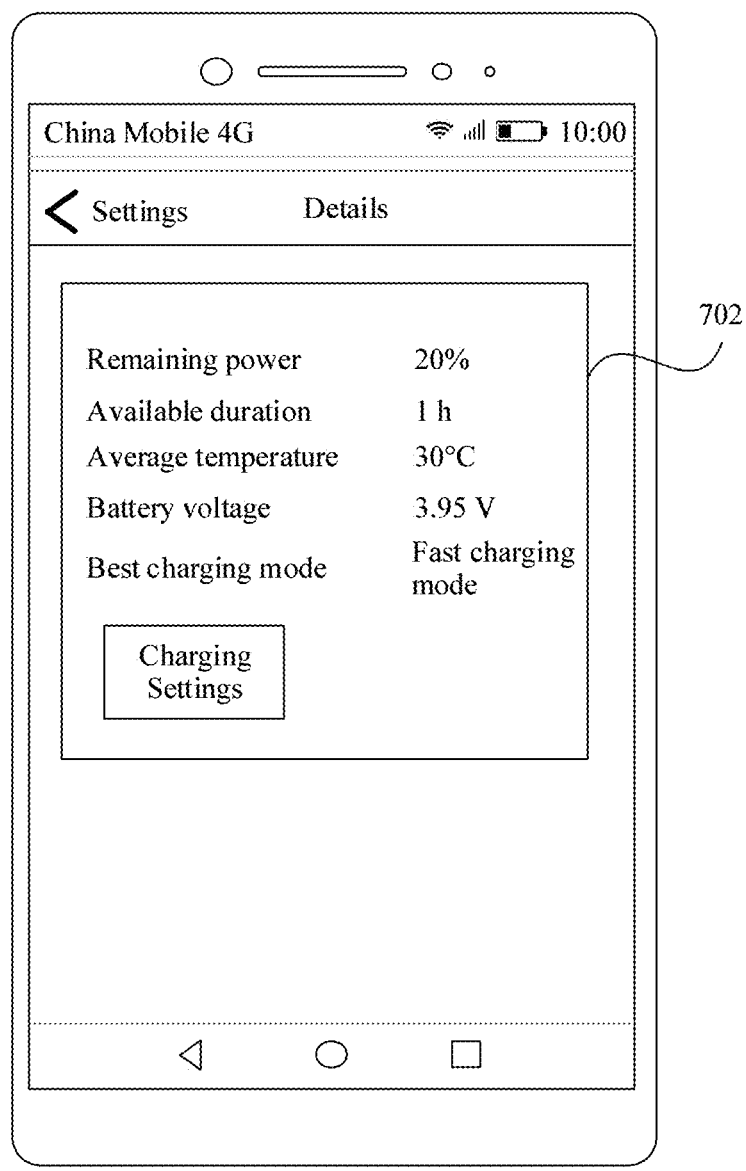
Figure 7C:
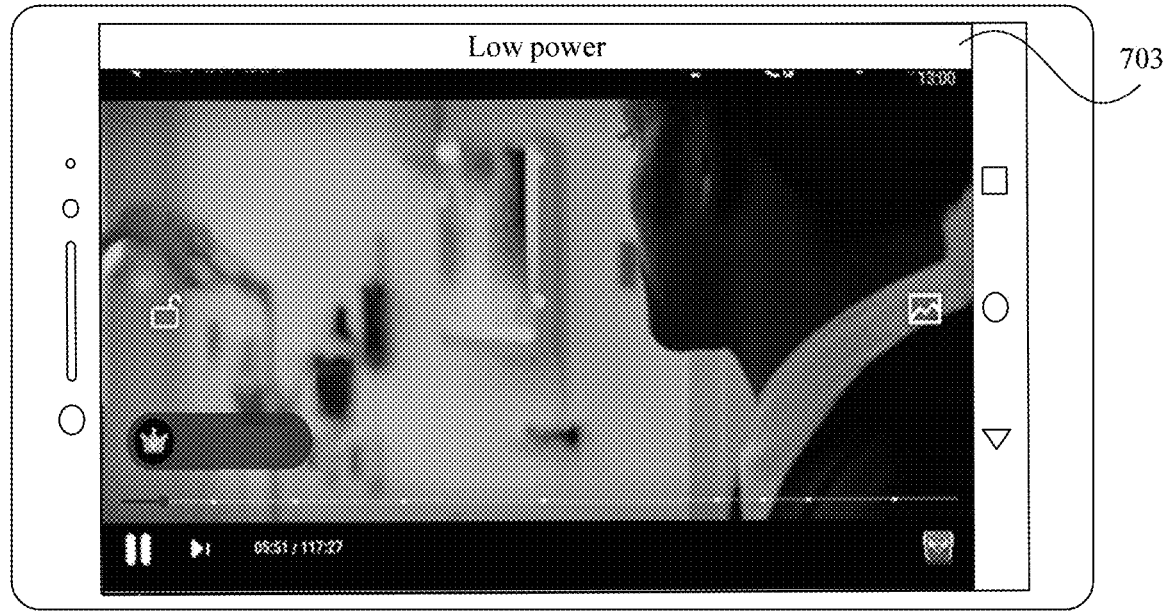
Figure 7D:
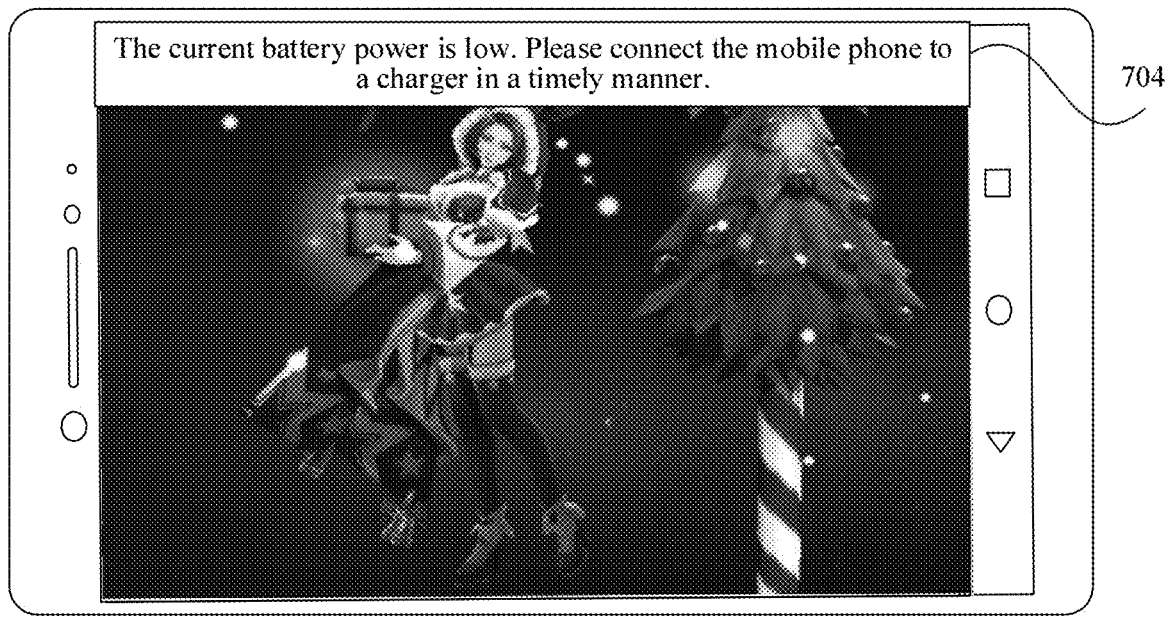

For example, when it is detected that the mobile phone is currently in a game interface, a video playback interface, or a navigation interface, or the mobile phone starts a camera, if battery power of the mobile phone is lower than a specific threshold (where for example, the battery power is less than 20%), a pop-up window 703 in FIG. 7(c) or a pop-up window 704 in FIG. 7(d) may be used to prompt the user to connect the mobile phone to a power supply in a timely manner. The pop-up windows 703 and 704 are displayed in a hover box above interface content currently output by the mobile phone, for example, above a video playback interface shown in FIG. 7(c) and above a game interface shown in FIG. 7(d). Herein, not limited to content included in the pop-up window 703 in FIG. 7(c) and the pop-up window 704 in FIG. 7(d), during specific implementation, a pop-up window displayed by the mobile phone may further include more detailed information, such as a battery temperature and a battery voltage. This is not limited in this application.

Optionally, the pop-up window 703 (or the pop-up window 704) displayed on the top of the screen of the mobile phone may receive an input user operation. The following describes in detail a user operation that may be received by the pop-up window 703.

In a possible implementation, the user operation received by the pop-up window 703 may be a sliding gesture of a finger of the user from the pop-up window 703 to an upper part of the screen. In response to the sliding gesture, the pop-up window 703 is no longer displayed on the top of the screen of the terminal.

Figure 7E:
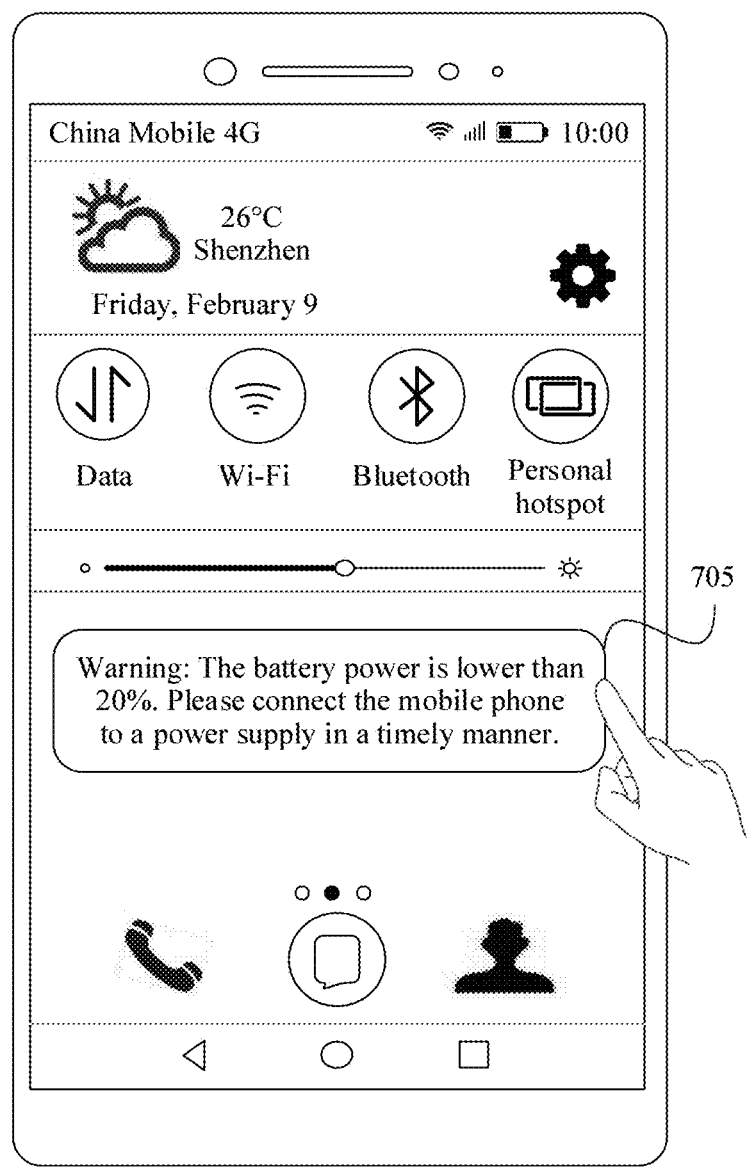

Optionally, after the pop-up window 703 is no longer displayed on the top of the screen of the terminal, prompt information in the pop-up window 703 may be displayed in a notification bar. When the user opens the notification bar, the user may see the prompt information. For example, when the user performs a downward sliding operation from the top of the mobile phone, a notification bar interface shown in FIG. 7(e) may be displayed. As shown in FIG. 7(e), the notification bar includes a prompt box 705, used to: inform the user of current battery power of the mobile phone, prompt the user to connect the mobile phone to a power supply in a timely manner, and the like. The notification bar interface may further include a date, weather, a place, a setting icon, a shortcut start/close icon of each setting option (for example, Wi-Fi, Bluetooth, or a personal hotspot), a screen brightness bar, other prompt information, and the like. This is not limited in this application.

Optionally, the prompt information 705 displayed in the notification bar may also receive an input user operation (for example, a tap operation). In response to the user operation, the mobile phone may jump to the battery power details interface shown in FIG. 7(b), to be specific, display, in the battery power details box 702, conditions such as details of current battery power, a battery temperature, and a battery voltage.

Figure 7F:
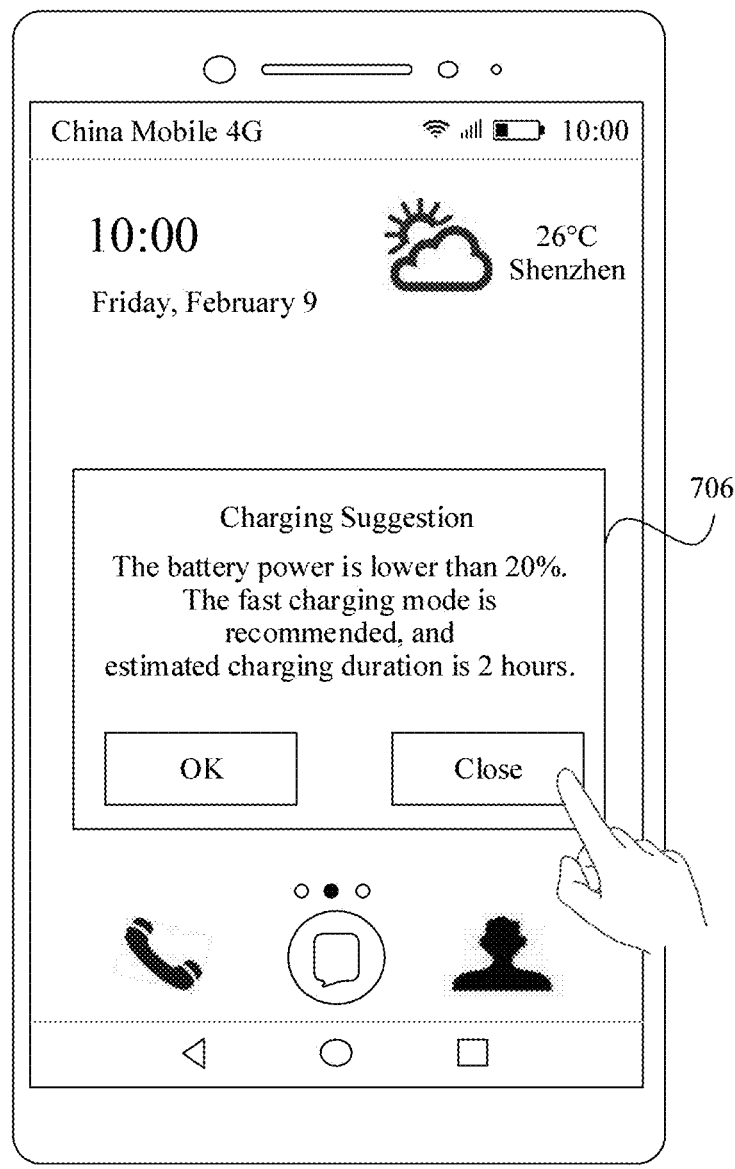

In a possible implementation, after the mobile phone pops up the low-battery prompt box 701 shown in FIG. 7(a), if the "Details" widget is tapped, the mobile phone may access an interface shown in FIG. 7(f); or if the "Details" widget is tapped, the mobile phone may access the interface shown in FIG. 7(b), and the mobile phone jumps to the interface shown in FIG. 7(f) after a "Charging Settings" widget in the window 702 shown in FIG. 7(b) is tapped. This is not limited in this application. A charging setting box 706 shown in FIG. 7(f) is used to display a charging suggestion, for example, display current battery power of the mobile phone, and a suggested charging mode that is determined by the mobile phone based on factors such as a current application scenario and time. For example, the current time of the mobile phone is 10:00, and the mobile phone determines that the current time within a working time of the user. The mobile phone may suggest that the mobile phone be charged in a fast charging mode. In the fast charging mode, it is estimated that full charging requires 2 hours.

In a possible implementation, the charging setting box 706 popped up by the mobile phone may further include a charger selection widget, for example, "Charger type X". The user may select a charger type by tapping the black inverted small triangle widget, to set the charger type to select a charging mode through matching before the mobile phone is connected to the charger. It should be understood that the charger type herein is used to determine a charging capability of the charger, for example, determine a maximum charging capability of the charger. Specifically, when a "12 V-4 A" charger is tapped, it indicates that a maximum charging voltage that can be supported by the charger is 12 V, and a maximum charging current is 4 A; when a "9 V-2 A" charger is tapped, it indicates that a maximum charging voltage of the charger is 9 V, and a maximum charge current is 2 A.

In a possible implementation, the charger selection widget may alternatively be set to another widget that supports user input. For example, the user may manually enter the maximum charging capability of the connected charger. After the user enters the maximum charging capability of the charger, the mobile phone may determine, based on a parameter corresponding to the obtained maximum charging capability, charging parameters corresponding to different charging modes. This is not limited in this application.

According to the foregoing solution, the user may select a charger type, and the mobile phone determines a maximum charging capability of the charger based on the charger type selected by the user. When the mobile phone cannot identify a charging capability of the connected charger, the mobile phone may obtain, based on the charger type selected by the user, the maximum charging capability corresponding to the charger, to select a corresponding charging mode through matching based on the maximum charging capability of the charger, and then display the charging mode to the user, so that the user accurately selects a charging mode within a charging capability range of the charger. Optionally, the suggested charging mode in the charging setting box 706 is a charging mode supported by the charger after the charger type is selected by the user. For example, referring to the examples in Table 2, the user selects the charger of type 2 by using the charger selection widget, and the charger supports the slow charging mode and the low heat mode of thermally optimized charging. In this case, the suggested charging mode in the charging setting box 706 may include the slow charging mode, the low heat mode, and the like, and does not include the fast charging mode.

Optionally, in the foregoing implementations of FIG. 3(*a*) to FIG. 5(*h*), the charging mode selection box may also include the charger selection widget. Similarly, before the mobile phone is connected to the charger, the user may set the charger type by using the charger selection widget, to set the charging mode.

Alternatively, after the mobile phone is connected to the charger, the mobile phone has identified a type of the connected charger and a supported charging mode, and the charger selection widget may be dimmed and cannot be tapped or changed. This is not limited in this application.

Alternatively, after the mobile phone is connected to the charger, the mobile phone cannot identify a type of the connected charger and a supported charging mode. The user may manually select the charger type by using the charger selection widget included in the charging setting box, so that the mobile phone can select, through matching, the charging mode supported by the charger, and display the charging mode in the charging mode selection box.

The user can tap an "OK" widget to accept the charging suggestion. When the mobile phone is connected to the charger, the mobile phone is charged in the charging mode corresponding to the charging suggestion. Alternatively, the user may tap a "Close" widget to reject the charging suggestion suggested by the system. After the mobile phone is connected to the charger, the charging mode selection box 302 described above is used for setting, and details are not described herein again.

In addition, it should be further understood that the user may open the notification bar by using a downward sliding gesture from the top of the screen on any interface content output by the screen of the mobile phone, or may open the notification bar by using a navigation key. This is not limited in this application.

According to the foregoing solution, the mobile phone may detect a current application scenario, determine, based on the current application scenario, whether to pop up the battery power prompt box, and automatically select charging policies through matching in different scenarios. According to the method, an operation can be simplified, and a charging mode can be automatically selected through matching for a user, to meet various requirements of the user and improve user experience.

The foregoing describes in detail man-machine interaction embodiments of this application with reference to FIG. 3(*a*) to FIG. 7(*f*). To better understand the charging management method provided in this application, the following describes a control principle and an implementation policy of a mobile phone in a charging process.

For different application scenarios, a single charging policy cannot meet all requirements on charging of the mobile phone in different application scenarios. A terminal charging method provided in this application is an optional charging method for a user. Different charging effects can be implemented for different application scenarios. In addition, the user can autonomously change charging parameters and charging performances of the mobile phone when the mobile phone is connected to some chargers.

The mobile phone is charged according to a charging policy in the charging process. The charging policy of the mobile phone means that, in the charging process of the mobile phone, after the charger is connected to the mobile phone, the mobile phone may correspondingly select different charging types and charging parameters through matching based on a type of the connected charger. Herein, that the charger is connected to the mobile phone may include that the charger is connected to the mobile phone in a wired connection manner or a wireless connection manner. The charging type may include normal wired charging, direct wired charging, normal wireless charging, direct wireless charging, and the like. The charging parameters may include a configured maximum charging current, a charging cut-off voltage, duration required for fully charging the battery, a maximum temperature in the charging process, a charging current and voltage of a charging IC, and the like.

It should be understood that, in the charging process of the mobile phone, a basic requirement on a specific charging current and voltage needs to be met, to ensure secure charging of the battery. To improve a battery life and simplify an operation on the charger, another auxiliary charging function may also be added. For example, a series of auxiliary charging functions, such as trickle charging, battery voltage detection, input current limitation, disconnecting the charger after charging is completed, and automatically starting charging after partial charging and discharging of the battery, are used for an over-discharged battery, to improve the battery life to some extent.

Figure 8:
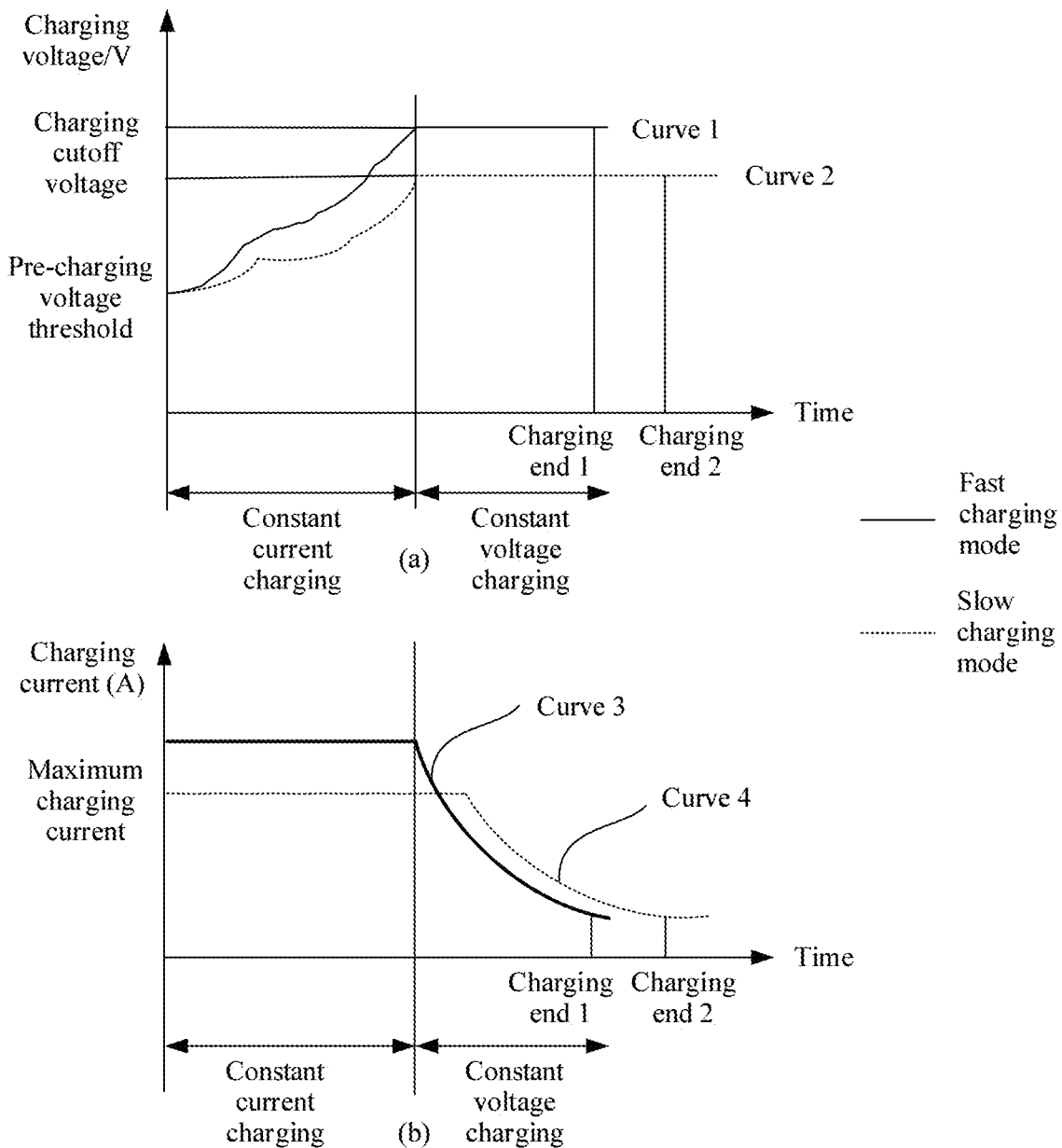
FIG. 8 includes diagrams of curves showing changes of a current and a voltage in a charging process of a mobile phone.

The following describes a possible charging process of a mobile phone. In FIG. 8, FIG. (a) is a diagram of a curve showing possible changes of a current in the charging process of the mobile phone, and FIG. (b) is a diagram of a curve showing possible changes of a voltage in the charging process of the mobile phone. As shown in FIG. 8, the charging process of the mobile phone may be divided into a plurality of phases, for example, may include a constant current charging phase, a constant voltage charging phase, and a charging end phase.

In the constant current charging phase, when a battery voltage increases to a value higher than a trickle charging threshold, a charging current is increased to perform constant current charging. A current for constant current charging ranges from 0.2 c to 1.0 c (where c is used to represent a current relative to a nominal capacity of a battery. For example, if the capacity of the battery is 1000 mAh, 1 c is the charging current of 1000 mA, and 0.2 c to 1.0 c is 200 mA to 1 A). In the constant current charging phase, the battery voltage gradually increases with a constant current charging process. Generally, the voltage of a single battery is set to 3.0 V to 4.2 V. The constant voltage charging phase starts when the battery voltage increases to 4.2 V and the constant current charging ends. In the constant voltage charging phase, the charging current may gradually decrease from a maximum value to 0.01 c (10 mA) as the charging process continues and based on a saturation degree of an electrochemical cell. When the charging current decreases to 0.01 c (10 mA), it is considered that the charging ends.

The charging end phase may be determined by using a minimum charging current, a timer, or a combination thereof. A minimum charging current method is used to monitor the charging current in the constant voltage charging phase, and charging ends when the charging current decreases to a range from 0.02c to 0.07c (20 mA to 70 mA). When the timer is used for determining the charging end phase, timing may start from the constant voltage charging phase, and the charging process ends after the charging is continuously performed for 2 hours.

Optionally, before the constant current charging phase, a trickle charging (which is also referred to as low-voltage pre-charging) phase may further be included. In the trickle charging phase, pre-charging, namely, recovery charging, is performed on a battery unit that is over-discharged or fully discharged. When the battery voltage is less than about 3 V, trickle charging may be used. A trickle charging current is $1/10$ of the constant current charging current, namely, 0.1 c. For example, if the constant current is 1 A, the trickle charging current may be 100 milliamperes (milliampere, mA).

It should be understood that, in the charging process, charging may be performed according to a curve rule of some or all phases of the curves. For example, in a direct charging mode, there is no low-voltage pre-charging phase, and the mobile phone is directly charged by using a maximum charging current close to 3 A. When battery power reaches about 80%, the charging current is gradually reduced from 3 A to 2.5 A to charge the mobile phone.

In this application, changing a charging mode by adjusting a charging parameter may be understood as changing a value of the charging cut-off voltage shown in FIG. (a) in FIG. 8 or changing a value of the maximum charging current shown in FIG. (b) in FIG. 8, to change the charging mode of the mobile phone, so as to achieve different charging effects. For example, a curve 1 in FIG. (a) in FIG. 8 may be a voltage change curve in a fast charging mode. When the fast charging mode is changed to a slow charging mode, the charging cut-off voltage may be reduced, and the voltage change curve is changed to a voltage change curve shown by a curve 2, and a charging time is correspondingly prolonged.

Alternatively, a curve 3 in FIG. (b) in FIG. 8 may be a current change curve in a fast charging mode. The fast charging mode may be changed to a slow charging mode by reducing the maximum charging current for constant current charging, and the current change curve is changed to a current change curve shown by a curve 4, and a charging time is correspondingly prolonged. It should be understood that in an actual charging process, charging curves are complex and changeable for different chargers and different mobile phone types and in different charging modes. This is not limited in this application.

According to the charging method including the plurality of phases, full charging of the fully discharged battery requires 2.5 hours to 3 hours.

A lithium battery is used as an example. The lithium battery is usually charged with a limited voltage and a constant current, and the limited voltage and the constant current are controlled by an integrated circuit (integrated circuit, IC) chip. In a specific charging process, a voltage of a to-be-charged battery is first detected. If the voltage is lower than 3 V, the battery needs to be pre-charged. A charging current is $1/10$ of a specified current. After the voltage increases to 3 V, a standard constant current charging process starts. In the standard charging process, constant current charging is performed with the specified current. When the battery voltage increases to 4.2 V, the constant current charging is changed to constant voltage charging, and the charging current gradually decreases. When the charging current decreases to $1/10$ of the specified charging current, charging ends.

In the mobile phone charging process described above, the voltage and the current may be adjusted by a voltage-current adjustment module of the mobile phone based on current battery power of the mobile phone. It may be understood that after the mobile phone is connected to the charger, the mobile phone identifies an output capability of the charger, and charges the battery by using a preset charging curve until the battery is fully charged.

In a specific implementation process, the mobile phone may select different charging modes through matching based on different charger types and a capability of a mainboard of the mobile phone.

Specifically, after the charger is connected to the mobile phone, the mobile phone identifies a charging capability of the charger, to select, through matching, a charging mode supported by the charger. For example, the mobile phone is connected to a universal serial bus (universal serial bus, USB) charger. After the mobile phone is connected to the USB charger, a vbus voltage of the USB is detected, and therefore detection specified in the battery charging specification version 1.2 (battery charging specification revision 1.2, BC1.2) is performed. Finally, it is determined that the USB charger is a dedicated charging port (dedicated charging port, DCP). In this case, the mobile phone uses a message command that is for obtaining a charging device type and that is specified in the smart fast charge protocol (smart charge protocol, SCP), and finds that the USB charger is a type-B high-voltage charger. According to the SCP, a voltage of the type-B high-voltage charger ranges from 5.5 V to 11 V. Further, the mobile phone obtains an index specification message command according to the SCP protocol, and further obtains a maximum rated output power (for example, 40 W), to determine a charging parameter associated with the USB charger.

For example, when the maximum rated output power is 40 W, an output voltage ranges from 5.5 V to 11 V, and an output current ranges from 0.5 A to 3 A. Moreover, a voltage adjustment step is set to 20 mV, a current adjustment step is set to 50 mA, a maximum voltage error is set to 100 mV, a maximum current error is set to 100 mA, a maximum restart time is set to 50 ms, and a dynamic response time for achieving maximum load is set to 20 ms. After obtaining the charging parameter, the mobile phone finally displays, in a charging mode selection window based on hardware configuration information of the mobile phone and a charging algorithm supported by software, a charging mode supported by the USB charger for selection by the user. It should be understood that a charging protocol followed in a process in which different types of mobile phones identify different types of chargers and a process in which the mobile phones identify charging capabilities of the chargers are not limited in this application.

Figure 9:
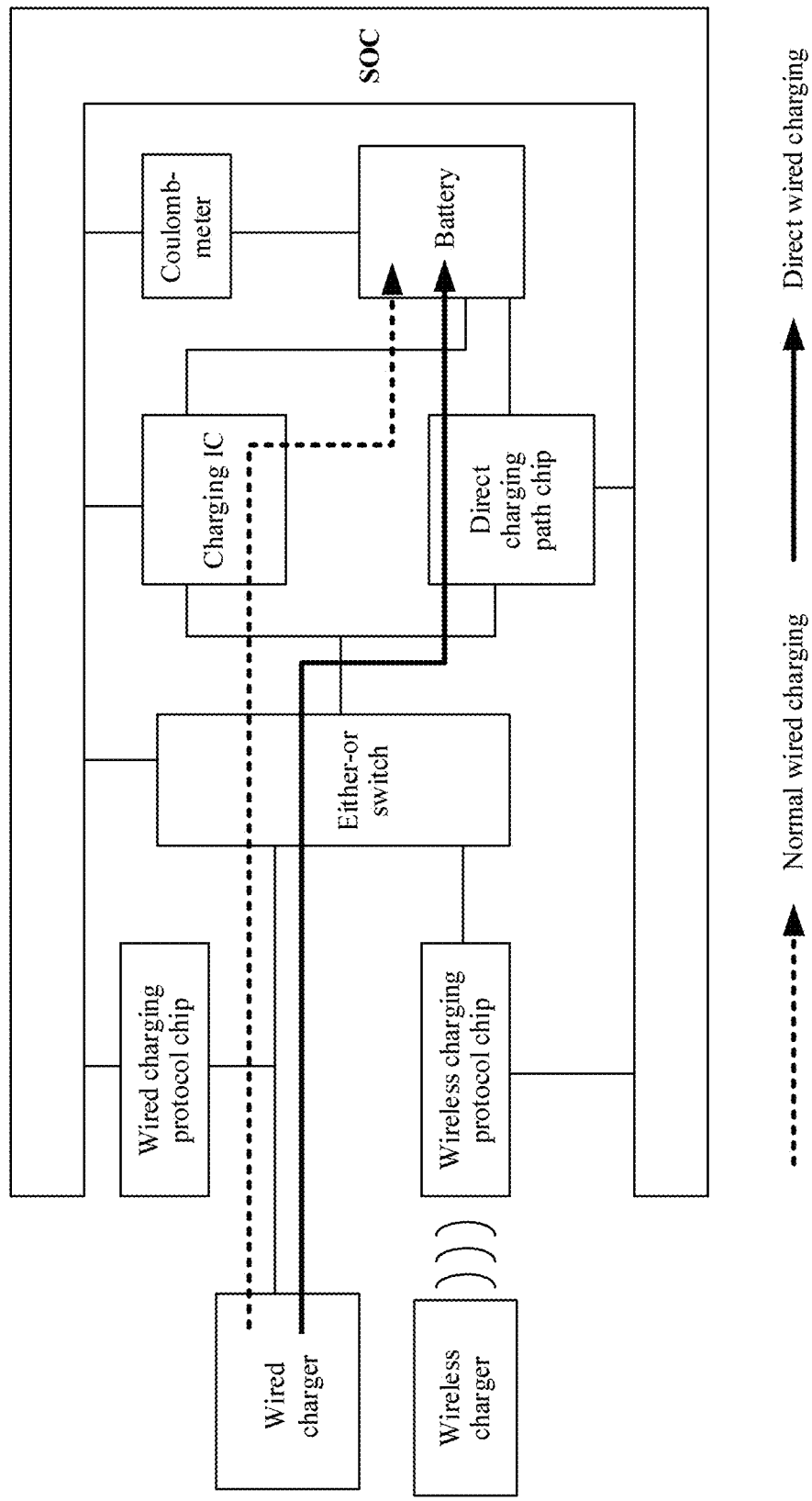
FIG. 9 is a schematic diagram of a control principle of an example of a charging process according to this application.
Figure 10:
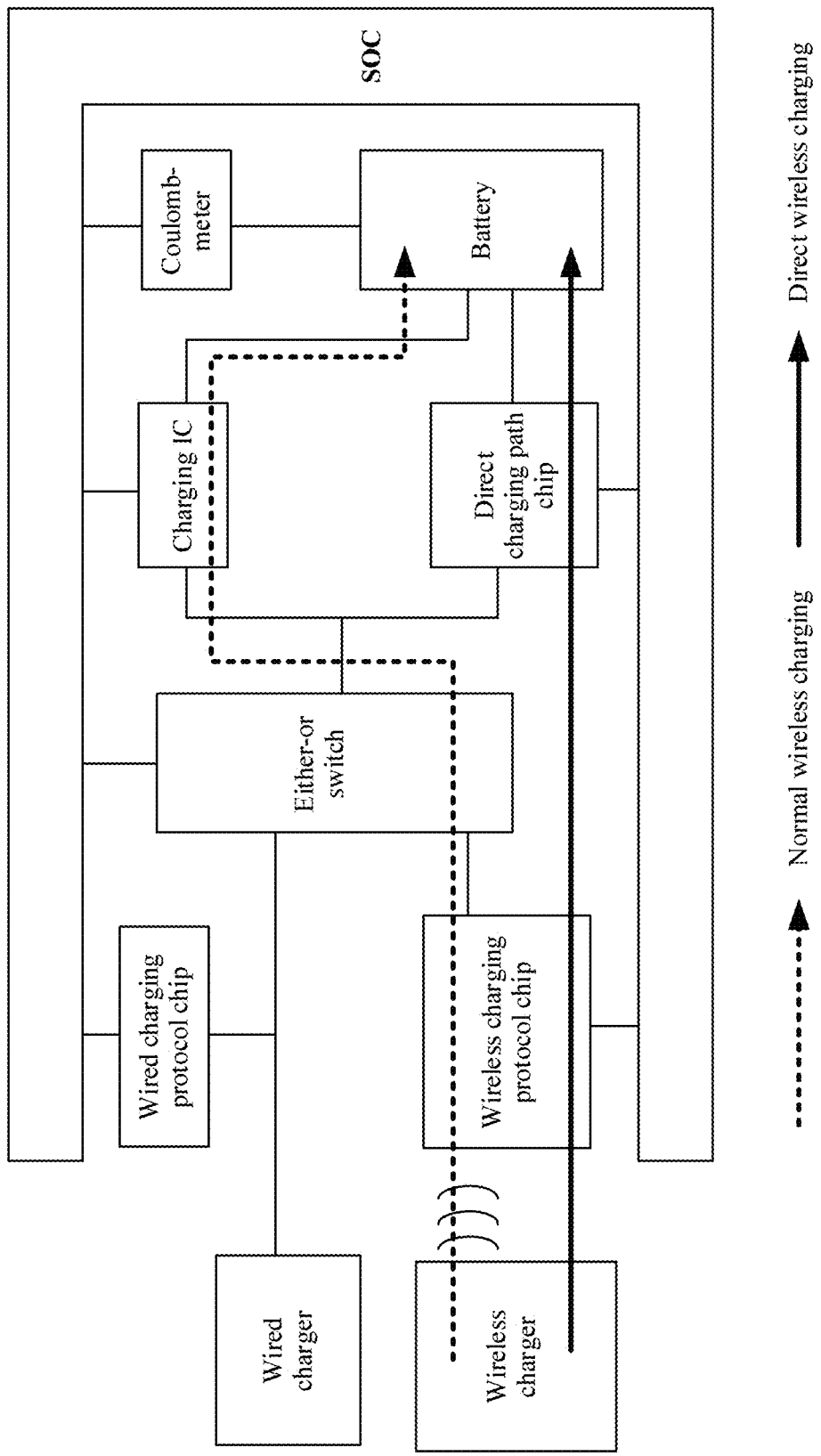
FIG. 10 is a schematic diagram of a control principle of another example of a charging process according to this application.

FIG. 9 and FIG. 10 each are a schematic diagram of a control principle of a charging process according to an embodiment this application. It should be understood that a mobile phone charging system shown in each of FIG. 9 and FIG. 10 may correspond to a part including the charging management module 140, the power management module 141, the battery 142, and the processor 110 shown in FIG. 1. Specifically, in FIG. 9 and FIG. 10, the mobile phone charging system includes elements such as a system on chip (system on chip, SOC), a wired charging protocol chip, a wireless charging protocol chip, an either-or switch, a charging IC, a direct charging path chip, a coulomb-meter, and a battery. The chips or components cooperate with each other to jointly control the charging process of the mobile phone. The SOC is chip integration of an information system core of the mobile phone, namely, the central processing unit 110 (central processing unit, CPU) of the mobile phone. The SOC may control the charging process of the mobile phone together with another chip or element of the mobile phone charging system. For example, the SOC may control the power management module 141, a power consumption management module, and the like. The wired charging protocol chip is applied to a case in which the mobile phone is connected to a wired charger, for example, participating in a charging process of normal wired charging and a charging process of direct wired charging. The wireless charging protocol chip is correspondingly applied to a case in which the mobile phone is wirelessly connected to a power supply, for example, participating in a charging process of normal wireless charging and a charging process of direct wireless charging. The charging IC may manage the charging process of the mobile phone to ensure that a suitable current is used to charge the battery of the mobile phone. The coulomb-meter is configured to detect battery power of the mobile phone, and feed back the battery power of the mobile phone to the SOC, to facilitate system control.

A dashed line in FIG. 9 is a schematic connection diagram of a charging process in the normal wired charging. As shown in the figure, after the mobile phone is connected to the wired charger, in the normal wired charging, the wired charging protocol chip, the SOC, the charging IC, the coulomb-meter, the switch, and the like are connected to form a charging circuit, to charge the mobile phone. A black solid line in FIG. 9 is a schematic connection diagram of a charging process in the direct wired charging. As shown in the figure, after the mobile phone is connected to the wired charger, in the direct wired charging, the wired charging protocol chip, the SOC, the direct charging path chip, the coulomb-meter, the switch, and the like are connected to form a charging circuit, to charge the mobile phone.

A dashed line in FIG. 10 is a schematic connection diagram of a charging process in the normal wireless charging. As shown in the figure, after the mobile phone is wirelessly connected to the power supply, in the normal wireless charging, the wireless charging protocol chip, the SOC, the charging IC, the coulomb-meter, the switch, and the like are connected to form a charging circuit, to charge the mobile phone. A black solid line in FIG. 10 is a schematic connection diagram of a charging process in the direct wireless charging. As shown in the figure, after the mobile phone is wirelessly connected to the power supply, in the direct wireless charging, the wireless charging protocol chip, the SOC, the direct charging path chip, the coulomb-meter, the switch, and the like are connected to form a charging circuit, to charge the mobile phone.

In conclusion, in the normal wired charging and the normal wireless charging, the SOC may configure a charging voltage and a charging current for the mobile phone, and convert, by using the charging IC, an output that is of the charger and that is received through a charging interface into a suitable charging voltage and charging current that are acceptable to the battery of the mobile phone, to perform charging.

Specifically, with reference to an implementation process of this application, the charging protocol chips (for example, the wired charging protocol chip and the wireless charging protocol chip) in FIG. 9 and FIG. 10 may implement a function of a charging detection module, for example, detecting a charging mode supported by a charger. A charging parameter instruction module and a voltage-current adjustment module may be implemented by controlling the charging IC by using software code on the SOCs in FIG. 9 and FIG. 10. A charging module may correspond to the charging IC in each of FIG. 9 and FIG. 10. After the charging IC receives the charging parameter configured by the charging parameter instruction module, the charging protocol chip transfers a physical signal to the charger to adjust a voltage, so as to implement charging based on a charging parameter corresponding to a charging mode. In subsequent descriptions of an implementation process, for each module, refer to the descriptions herein, and details of the modules are not described one by one.

It should be understood that in a process in which the user changes a charging mode, for example, the user changes a fast charging mode to a slow charging mode, inside the mobile phone, the change may be implemented by adjusting a charging parameter of the charging module on the mobile phone side, or may be implemented by adjusting a charging parameter on the charger side, or may be implemented by adjusting both a charging parameter on the mobile phone side and a charging parameter on the charger side. Then, charging is performed by using a charging parameter associated with an adjusted charging mode. This is not limited in this application.

For example, in the process of changing the charging mode by adjusting the charging parameter of the charging module on the mobile phone side, an example in which a normal mode is changed to the slow charging mode is used for description. When the mobile phone is charged in the normal mode, for example, constant current and constant voltage charging, by using the charging IC a constant current value is 2 A. When the user switches from the normal mode to the slow charging mode, the slow charging mode may correspond to constant current and constant voltage charging, and a constant current value is 0.5 A. In this case, a UI interface of the mobile phone receives a selection of the user. After obtaining the charging mode selected by the user, the charging parameter instruction module of the mobile phone transfers the new constant current value to a charging implementation module. The charging implementation module sends, to the charging IC through an I2C bus, a configured current value of the constant current phase, so that a current in the constant current phase changes from 2 A to 0.5 A. In this way, the adjustment process on the mobile phone side starts after the configured current value is directly sent to the charging IC through the I2C bus of the SOC.

For another example, in the process of changing the charging mode by adjusting the charging parameter of the charging module on the charger side, an example in which a super charging mode is changed to the fast charging mode is used for description. When the mobile phone is charged in the super charging mode, and the user switches the super charging mode to the fast charging mode, the UI interface of the mobile phone receives a selection of the user. After obtaining the charging mode selected by the user, the charging parameter instruction module transfers a new charging current-voltage instruction table to the charging implementation module. In a new charging voltage adjustment period, the charging implementation module stats to change, based on a battery voltage and a current value corresponding to the voltage in the new instruction table and by using an output voltage setting command in a charging protocol (such as SCP), an output voltage of the charger to obtain a current value close to an expected charging current value. In the whole process, the I2C bus is controlled by using the code on the SOC, and a data command is sent to a USB physical controller of the charger. Then, the USB physical controller converts the data command into an SCP signal and sends the SCP signal to the charger, so as to change the output voltage value of the charger.

For another example, in the process of changing the charging mode by adjusting both the charging parameter of the charging module on the mobile phone side and the charging parameter of the charging module on the charger side, an example in which the super charging mode is changed to a normal charging mode is used for description. When the mobile phone is charged in the super charging mode, and the user switches the super charging mode to the normal charging mode, the UI interface of the mobile phone receives a selection of the user. After obtaining the charging mode selected by the user, the charging parameter instruction module instructs the charging implementation module to disconnect a direct charging link, set a charger voltage to 5 V by using the output voltage setting command in the charging protocol (such as SCP), and then set, through the I2C bus, an input voltage of the charging IC to 5 V, a current in the constant current phase to 2 A, and a voltage in the constant voltage phase to 4.4 V, and finally open a common charging circuit and enable the charging IC.

It should be understood that, for a command type and the like inside the mobile phone in a specific implementation process, refer to the existing battery charging specific implementation specification (battery charging specification revision 1.2). For a download address of specific content, refer to composter.com.ua/documents/BC1.2_FINAL.pdf. Details are not described herein.

Figure 11:
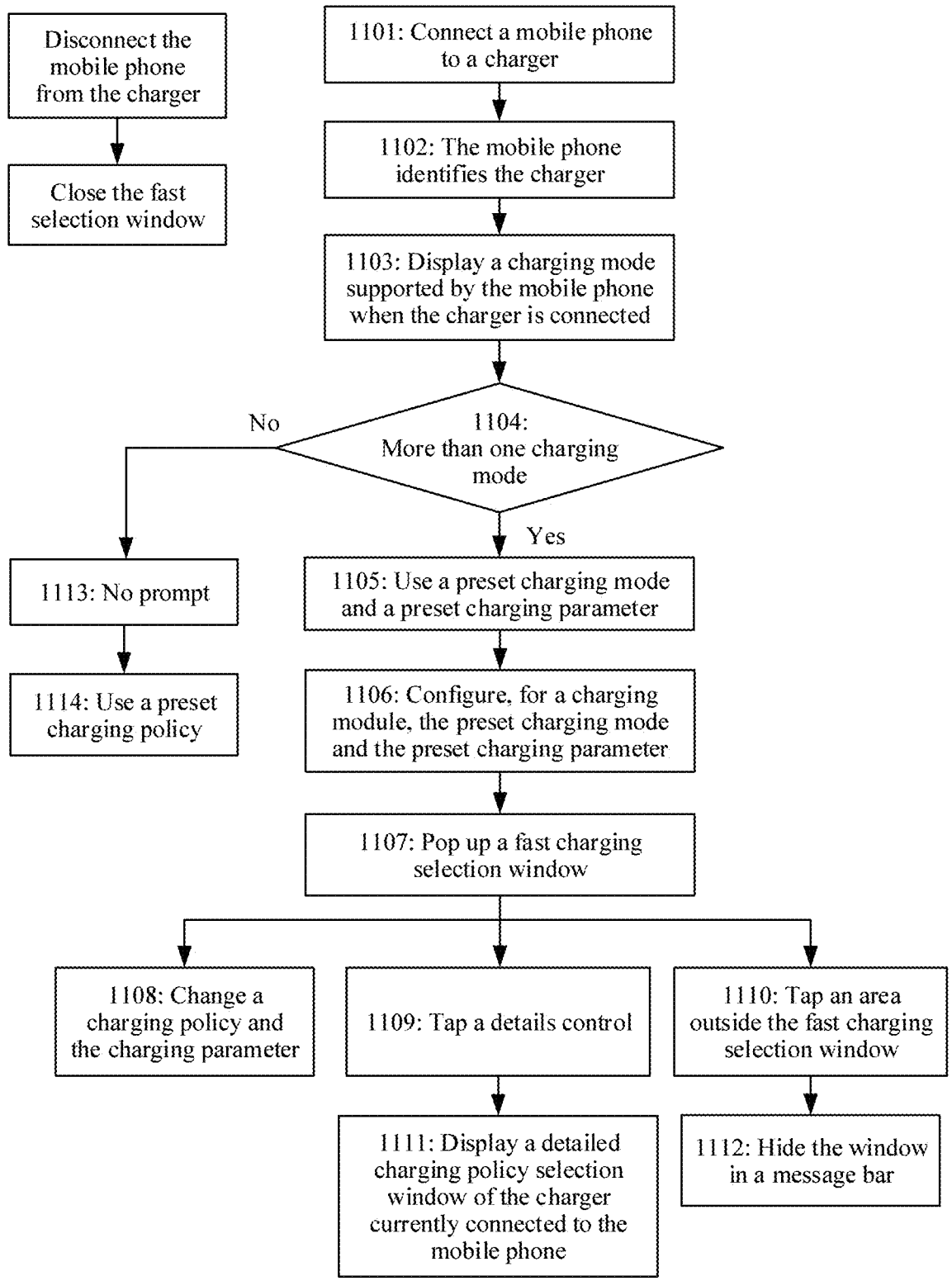
FIG. 11 is a flowchart of an implementation process of an example of an optional charging method for a user according to an embodiment of this application.

The foregoing lists charging mode selection windows that may be displayed after the mobile phone is connected to the charger in various different scenarios and charging modes that may be corresponding to the different scenarios. After the mobile phone is connected to the charger, whether to open a charging mode selection window is determined based on a current application scenario. FIG. 11 is a flowchart of an implementation process of an optional charging method for a user when a charging mode selection window is opened according to an embodiment of this application.

For example, the process shown in FIG. 11 includes the following steps. 1101: Connect a mobile phone to a charger. 1102: The mobile phone identifies the charger, for example, identifies a charging mode supported by the charger. 1103: Display a charging mode supported by the mobile phone when the charger is connected, for example, a fast charging mode or a sleep mode supported by the mobile phone when the charger is connected. 1104: Determine whether there is more than one charging mode corresponding to the charger. 1105: When the charger supports a plurality of charging modes, use a preset charging mode and a preset charging parameter that are corresponding to the charger. 1106: Configure, for a charging module, the preset charging mode and the preset charging parameter that are corresponding to the charger. 1107: Pop up a charging mode selection window, for example, the foregoing listed charging mode selection windows. 1108: Select, in the pop-up charging mode selection window, a desire charging policy of the user, and correspondingly change the charging parameter to enter a corresponding charging mode. Alternatively, 1109: After the charging mode selection window is popped up in 1107, tap a details widget. Alternatively, 1110: After the charging mode selection window is popped up in 1107, the user may tap an area outside the charging mode selection window to close the charging mode selection window. 1111: Display a detailed selection window for various charging modes supported by the mobile phone when the current charger is connected, and the user selects a charging policy in the detailed selection window. 1112: Hide the charging mode selection window in a message bar, and perform charging in the preset charging mode. In addition, in a whole process in which the charging mode selection window is popped up and displayed, if the charger is disconnected from the mobile phone, the charging mode selection window is closed quickly.

Figure 12:
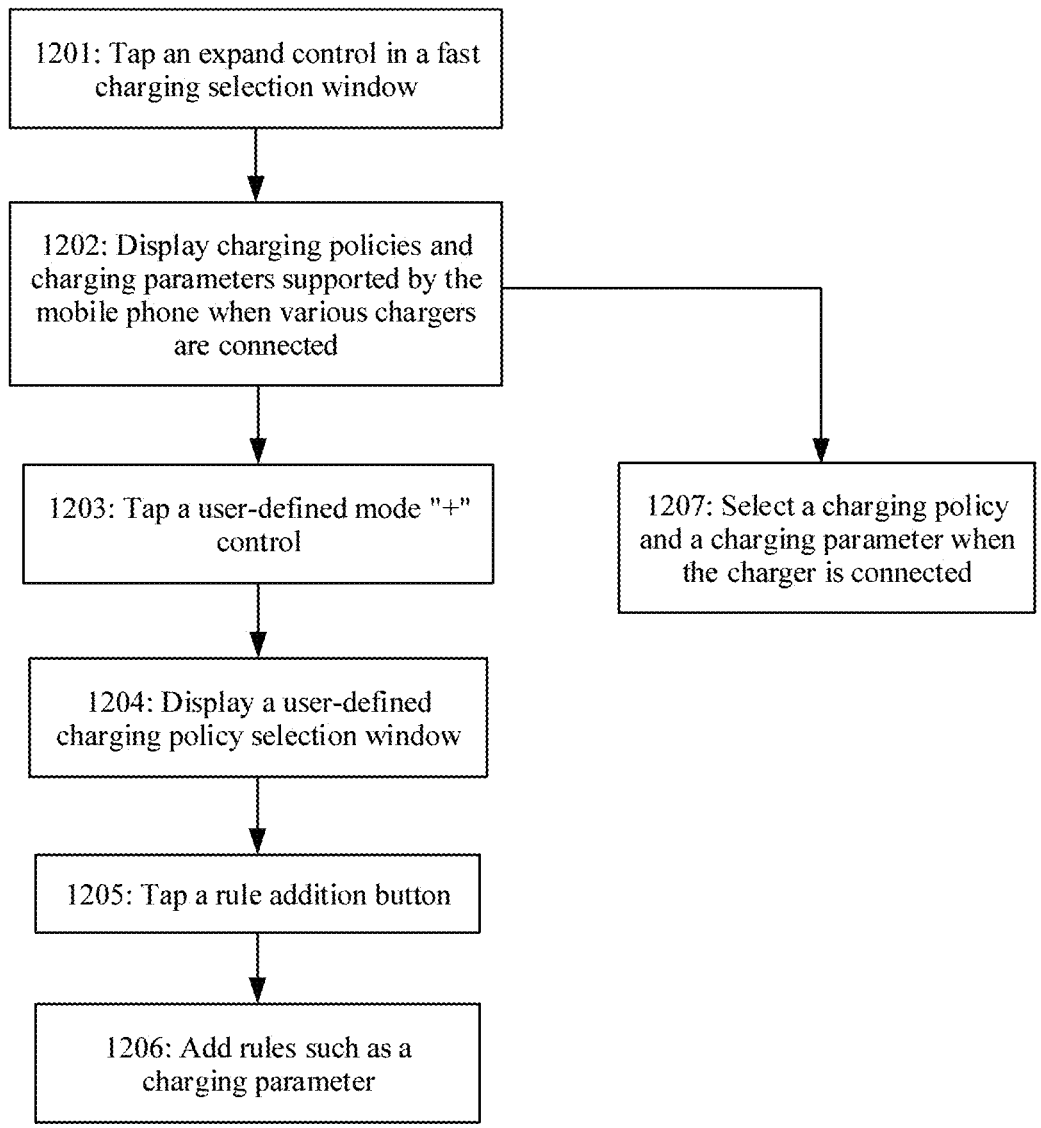
FIG. 12 is a flowchart of an implementation process of another example of an optional charging method for a user according to an embodiment of this application.

In a possible implementation, a flowchart that is of an implementation process of another example of an optional charging method for a user and that is shown in FIG. 12 is performed. After a mobile phone is connected to a charger, charging policies and charging parameters supported by the mobile phone when various chargers are connected are displayed, and the user may select a preset charging policy and charging parameter when the charger is connected. The method specifically includes the following steps. 1201: Tap an expand widget in a charging mode selection window. 1202: Display charging policies and charging parameters supported by the mobile phone when the various chargers are connected. 1203: In the pop-up charging mode selection window, tap a user-defined mode widget "+". 1204: Display a user-defined charging policy selection window. 1205: Tap a rule addition button. 1206: Add rules such as a charging parameter. Alternatively, the user may not perform any change and setting, and charging is performed by using a charging policy and a charging parameter that are automatically selected through matching. That is, 1207: Select the charging policy and charging parameter when the charger is connected. Similarly, in a whole process in which the charging mode selection window is popped up and displayed, if the charger is disconnected from the mobile phone, the charging mode selection window is closed quickly.

Figure 13:
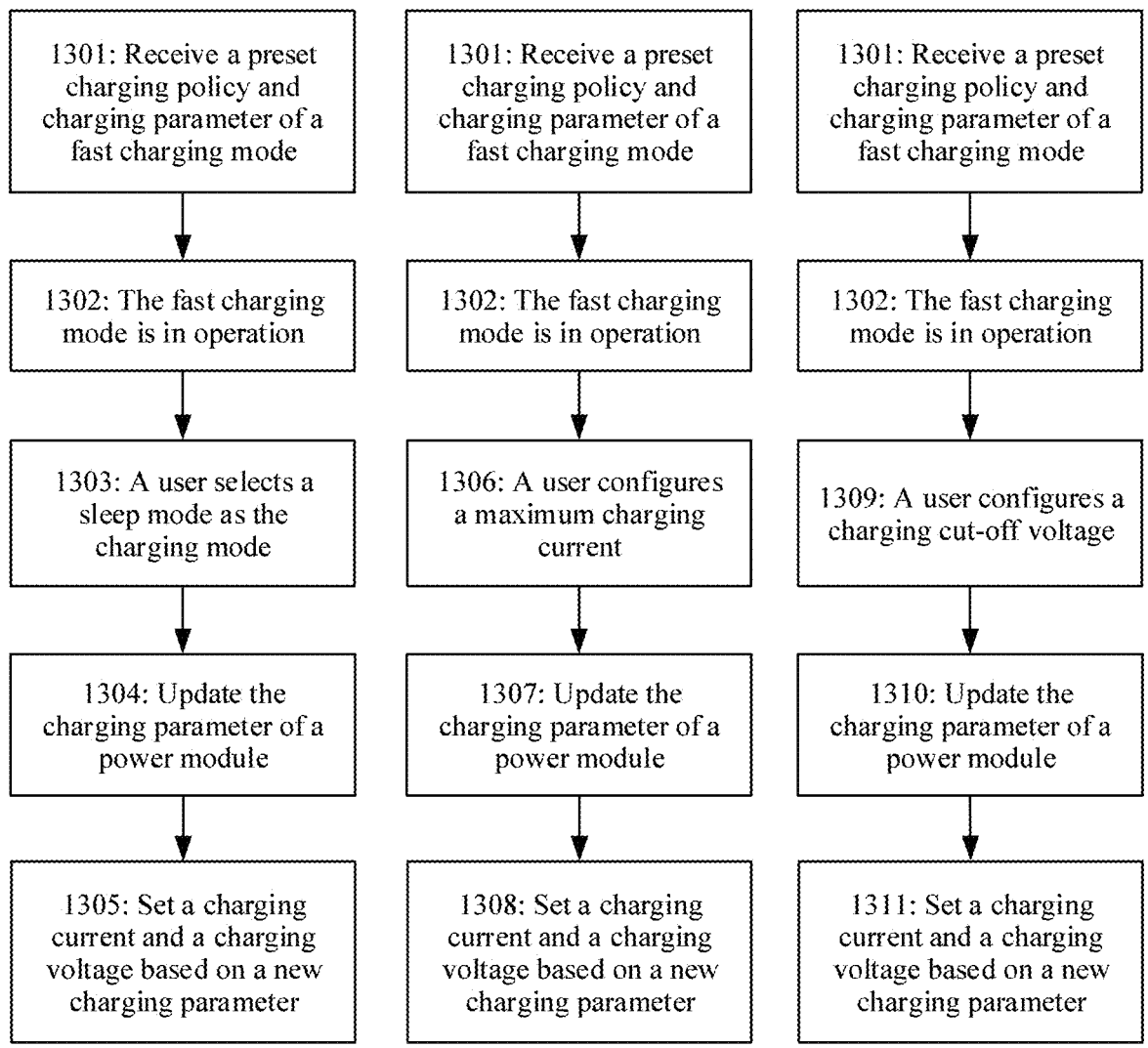
FIG. 13 is a flowchart of an implementation process of still another example of an optional charging method for a user according to an embodiment of this application.

In a possible implementation, when a charging detection module of a mobile phone detects that a connected charger supports a plurality of charging modes, the mobile phone intelligently selects a fast charging mode through matching based on a current application scenario. FIG. 13 is a flowchart of an implementation process of still another example of an optional charging method for a user according to an embodiment of this application. As shown in FIG. 13, after a mobile phone is connected to a charger, in 1301, the mobile phone receives a preset charging policy and charging parameter of a fast charging mode. 1302: The fast charging mode is in operation. To be specific, before the user changes the charging parameter, the mobile phone is charged in the fast charging mode. 1303: The user changes the charging mode to a sleep mode in a charging mode selection window. 1304: After receiving an instruction of changing the charging mode, the mobile phone updates the charging parameter of a power module. 1305: Set a charging current and a charging voltage based on a new charging parameter.

Alternatively, after a mobile phone is connected to a charger, in 1301, the mobile phone receives a preset charging policy and charging parameter of a fast charging mode. 1302: The fast charging mode is in operation, and the mobile phone is charged in the fast charging mode. 1306: The user changes a maximum charging current in a charging mode selection window. 1307: After receiving an instruction of changing the maximum charging current, the mobile phone updates the charging parameter of a power module, for example, the maximum charging current. 1308: Set a charging current and a charging voltage based on a new charging parameter. It should be understood that the maximum charging current in the charging process affects charging duration of the mobile phone. Appropriately increasing the maximum charging current can shorten the charging duration of the mobile phone in full charging, and meet a requirement of the user.

Alternatively, after a mobile phone is connected to a charger, in 1301, the mobile phone receives a preset charging policy and charging parameter of a fast charging mode. 1302: The fast charging mode is in operation, and the mobile phone is charged in the fast charging mode. 1309: The user changes a charging cut-off voltage in a charging mode selection window. 1310: After receiving an instruction of changing the charging cut-off voltage, the mobile phone updates the charging parameter of a power module, for example, the charging cut-off voltage. 1308: Set a charging current and a charging voltage based on a new charging parameter. It should be understood that the charging cut-off voltage is a voltage when a storage battery is a fully charged within a specified constant current charging period. If the battery of the mobile phone continues to be charged after reaching the charging cut-off voltage, overcharging occurs. This usually affects the performance and life of the battery. In the foregoing embodiment, the user may change the charging cut-off voltage in the charging mode selection window, for example, reduce the charging cut-off voltage after a specific period of time, to reduce damage caused by overcharging to the battery.

It should be further understood that the foregoing listed change of the charging mode or change of the charging parameter is a possible example. In an actual charging process, the user may alternatively change another charging mode or another charging parameter. This is not limited in this application.

In addition, for the foregoing listed change of the charging mode or change of the charging parameter, refer to the schematic diagrams of the charging principles of the mobile phone that are shown in FIG. 9 and FIG. 10. After the mobile phone is connected to the charger, the charging detection module of the mobile phone detects that the charger may correspond to charging modes, and actively pops up, in a UI interface of the mobile phone, a window providing optional charging solutions, so that the user quickly selects charging policies or charging parameters in different charging modes. After the user selects a desired charging policy based on a status of the mobile phone and a current application scenario, the mobile phone controls, by using a chip, a charging parameter instruction module to update the charging parameter of the power module, determine a suitable charging current, and transfer the current to a charging voltage-current adjustment module. The voltage-current adjustment module configures a charging current of a charging IC based on the obtained charging current, and sets a battery charging current to a target current, to control a charging process of the mobile phone. According to the method, the user may autonomously select a charging policy. Through autonomous selection of a charging parameter, battery performance and charger performance are fully utilized, so as to achieve a desired charging effect for the user, and improve user experience.

Figure 14:
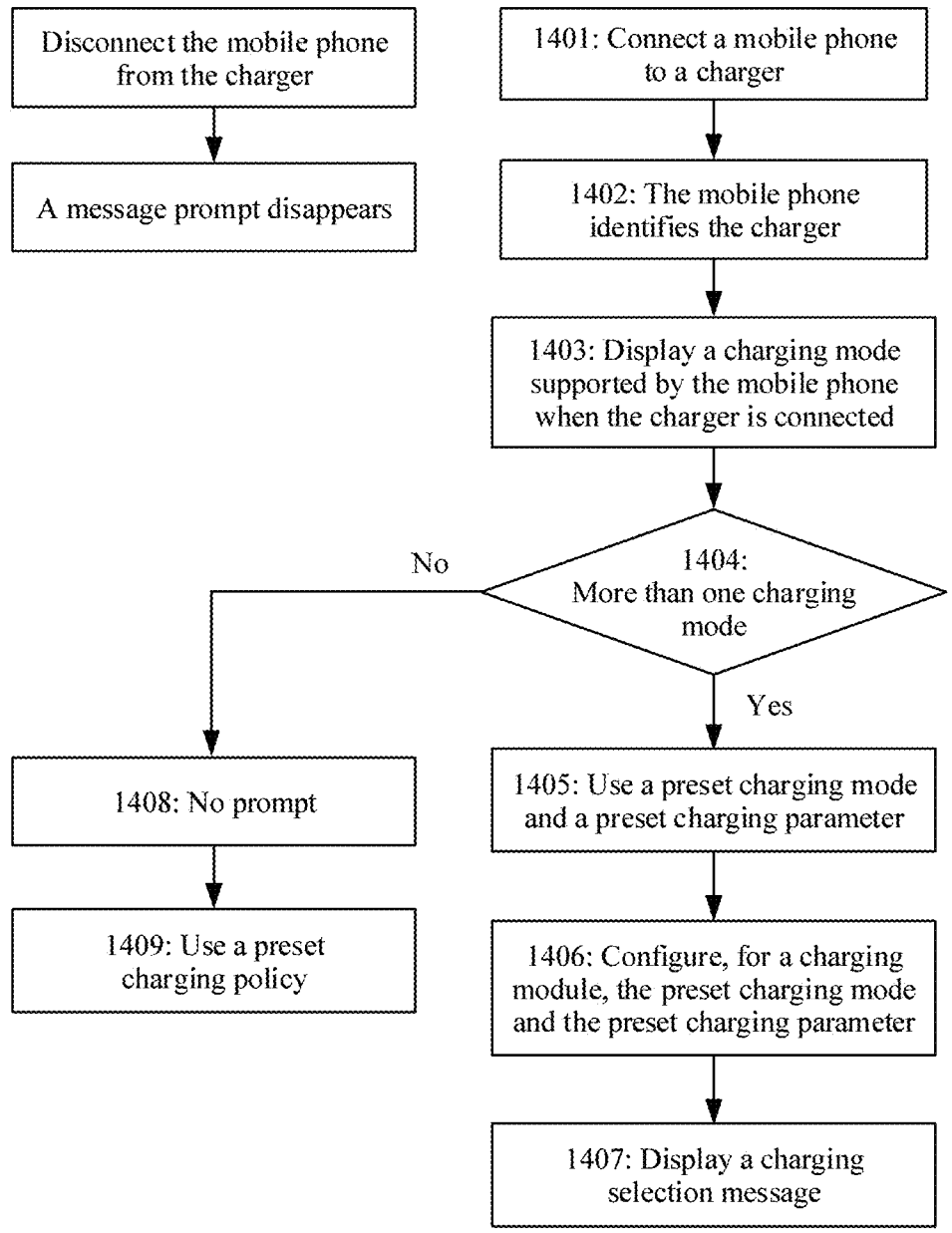
FIG. 14 is a flowchart of an implementation process of yet another example of an optional charging method for a user according to an embodiment of this application.

In another possible implementation, in some scenarios, for example, the foregoing listed scenarios such as the game mode, the video mode, the navigation mode, and the camera mode, a mobile phone does not pop up a charging mode selection window after the mobile phone is connected to a charger. Specifically, after the mobile phone is connected to the charger, the mobile phone determines, based on a current application scenario, to open the charging mode selection window. FIG. 14 is a flowchart of a process of selecting a charging method by a user by tapping a charging selection message when a charging mode selection window is not opened according to an embodiment of this application.

For example, the process shown in FIG. 14 includes the following steps. 1401: Connect a mobile phone to a charger. 1402: The mobile phone identifies the charger, for example, identifies a charging policy supported by the charger. 1403: Display a charging mode supported by the mobile phone when the charger is connected, for example, a fast charging mode or a sleep mode supported by the mobile phone when the charger is connected. 1404: Determine whether there is more than one charging mode corresponding to the charger. 1405: When the charger supports a plurality of charging modes, use a preset charging mode and a preset charging parameter that are corresponding to the charger. 1406: Configure, for a charging module, the preset charging mode and the preset charging parameter that are corresponding to the charger. 1407: Instead of popping up the charging mode selection window, the mobile phone displays the charging selection message, for example, the charging selection messages that are shown in FIG. 6(*a*), FIG. 6(*b*), FIG. 6(*c*), and FIG. 6(*d*) and that are displayed in the notification bars. In addition, in a whole process in which the charging mode selection window is popped up and displayed, if the charger is disconnected from the mobile phone, the charging selection message disappears.

Figure 15:
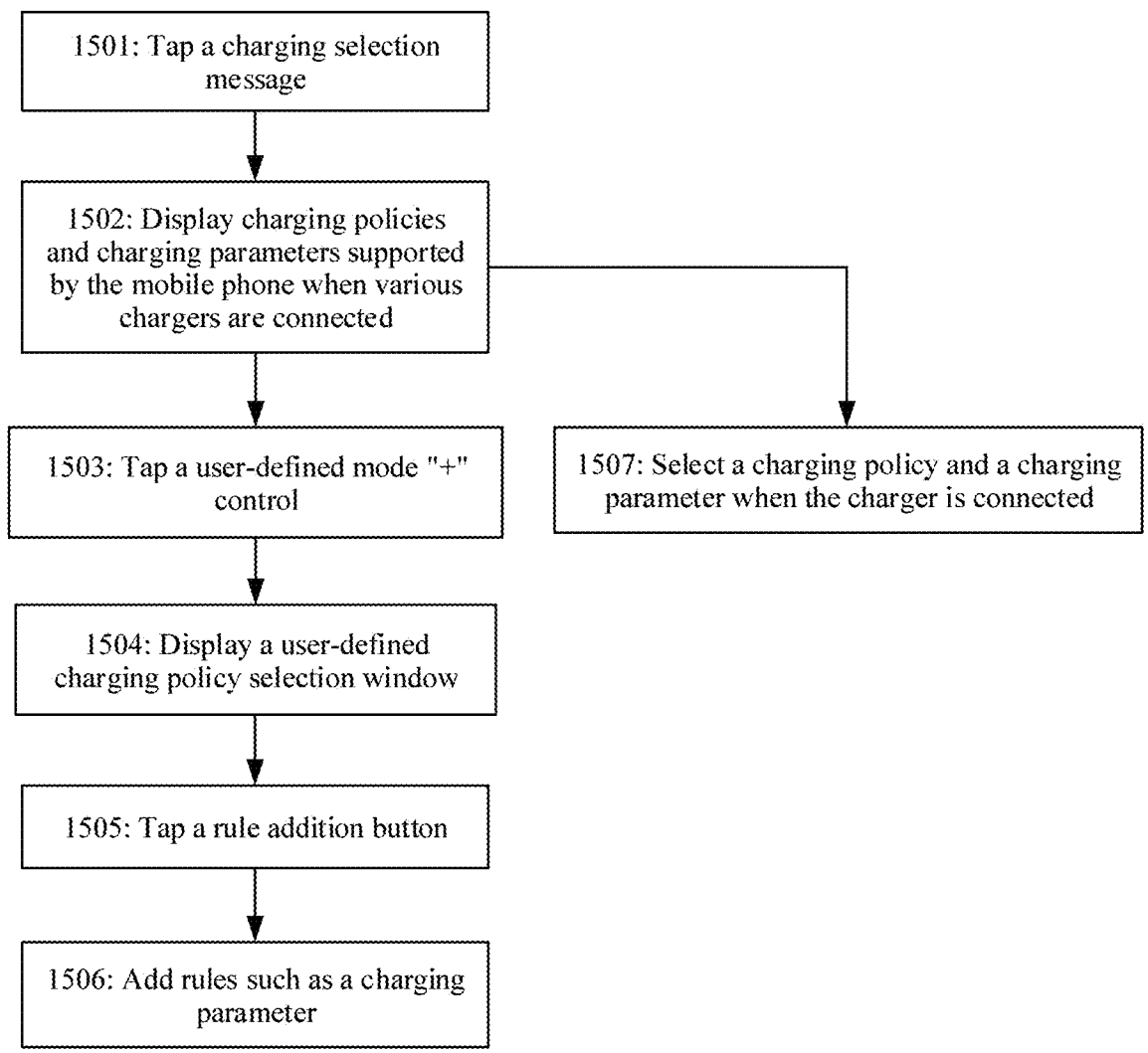
FIG. 15 is a flowchart of an example in which a user selects and sets a user-defined charging mode according to an embodiment of this application.

In a possible implementation, the user may tap the charging selection message, to access the charging mode selection window to configure charging. A specific execution flowchart is shown in FIG. 15, and includes the following steps. 1501: Tap a charging selection message. 1502: Display charging policies and charging parameters supported by the mobile phone when various chargers are connected. 1503: In the pop-up charging mode selection window, tap a user-defined mode widget "+". 1504: Display a user-defined charging policy selection window. 1505: Tap a rule addition button. 1506: Add rules such as the charging parameter. Alternatively, the user may not perform any change and setting, and charging is performed by using a charging policy and a charging parameter that are automatically selected through matching. That is, 1507: Select the charging policy and charging parameter when the charger is connected. Similarly, in a whole process in which the charging mode selection window is popped up and displayed, if the charger is disconnected from the mobile phone, the charging selection message disappears. If the charging mode selection window is expanded, the charging mode selection window is closed immediately if the charger is disconnected from the mobile phone.

Figure 16:
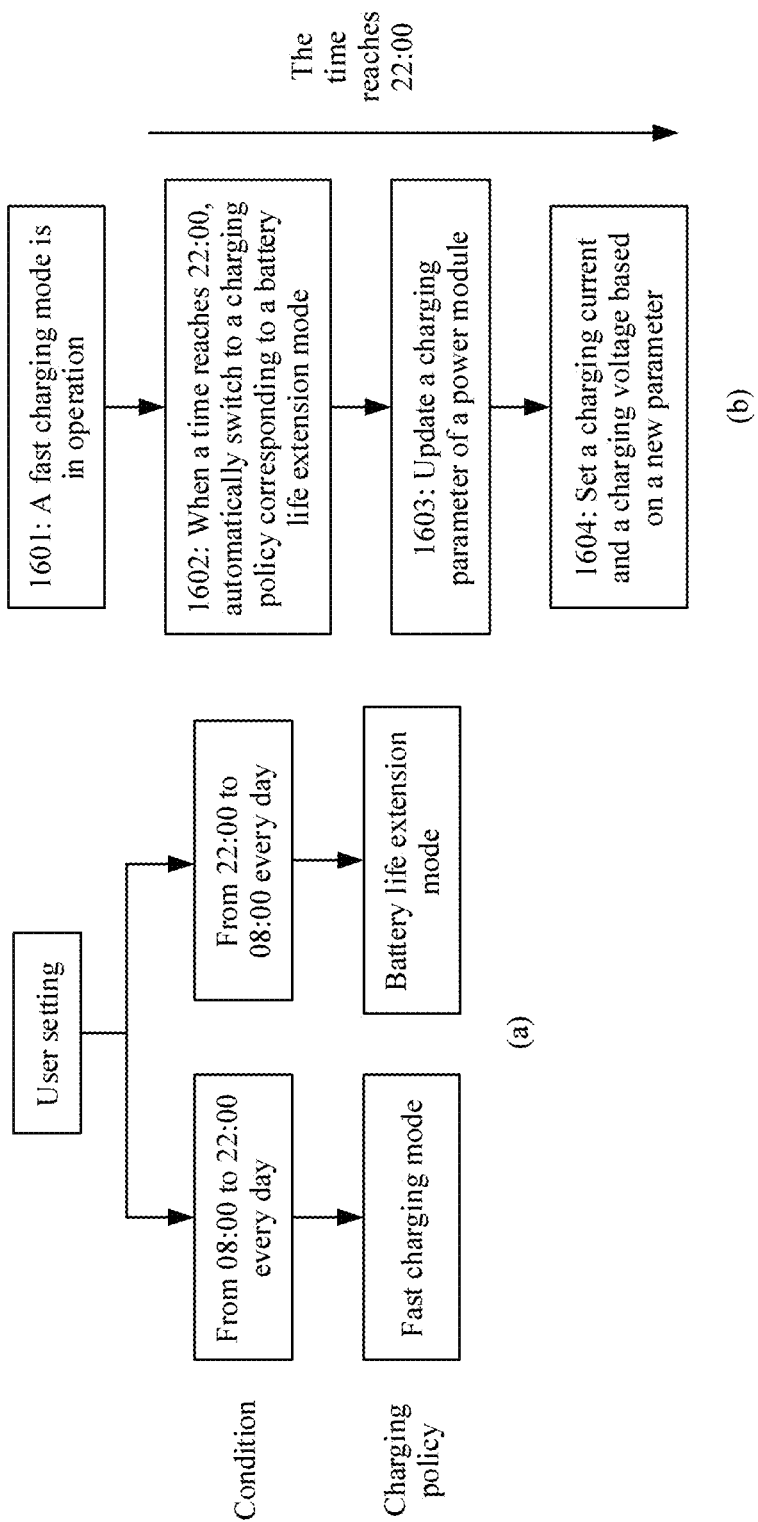
FIG. 16 is a flowchart of an example in which a user autonomously sets a charging policy through automatically matching based on a time according to an embodiment of this application.

For example, the user-defined mode added by the user may include a specific condition. The user sets the specific condition, and the mobile phone selects a charging policy through matching based on the input condition. FIG. 16 is a flowchart of an example in which the user automatically selects a charging policy through automatically matching based on a time according to an embodiment of this application. FIG. (a) in FIG. 16 shows conditions set by the user and charging policies corresponding to the conditions. The user may automatically set a charging mode from 08:00 to 22:00 every day to a fast charging mode, and set a charging mode from 22:00 to 08:00 every day to a battery life extension mode or a sleep mode. FIG. (b) is a flowchart in which the mobile phone switches the charging mode according to the user-defined policy set by the user. The following steps are specifically included. 1601: The fast charging mode is in operation. 1602: When the time reaches 22:00, automatically switch the charging policy corresponding to the fast charging mode to the charging policy corresponding to the battery life extension mode. 1603: Update a charging parameter of a power module. 1604: Set a charging current and a charging voltage based on a new parameter to charge the mobile phone.

For the foregoing listed change of the charging mode or change of the charging parameter, refer to the schematic diagrams of the charging principles of the mobile phone that are shown in FIG. 9 and FIG. 10. After the mobile phone is connected to the charger, a charging detection module of the mobile phone detects a charging policy that can be supported by the charger, or a user-defined policy that was previously set by the user in the charging mode selection window and that is selected as a preset charging mode. Alternatively, if needing to change a current charging policy automatically selected through matching, the user may tap the charging selection message, to access a charging setting interface or the charging mode selection window for modification. After a charging parameter instruction module obtains a desired charging policy of the user, the mobile phone controls, by using a chip, the charging parameter instruction module to update the charging parameter of the power module, determine a suitable charging current, and transfer the current to a charging voltage-current adjustment module. The voltage-current adjustment module configures a charging current of a charging IC based on the obtained charging current, and sets a battery charging current to a target current, to control a charging process of the mobile phone. According to the method, the user may autonomously select a charging policy. Through autonomous selection of a charging parameter, battery performance and charger performance are fully utilized, so as to achieve a desired charging effect for the user, and improve user experience.

The foregoing describes the charging modes in different application scenarios, the processes of switching the charging modes by the mobile phone, and the like. The following describes specific implementation processes of different charging policies with reference to different scenarios provided in the embodiments of this application.

Scenario 1: Thermal Optimization Mode

A user connects a mobile phone to a normal charger with an output capability of 5 V-4 A, and a charging detection module of the mobile phone may detect that the charger may correspond to a thermal optimization charging policy. The user selects a thermal sensing optimization charging policy in a charging mode selection window, and sets an upper limit of a thermal sensing temperature to 36° C. A charging parameter instruction module switches a current calculation method of the charging policy to a proportional-integral-derivative (proportion-integral-derivative, PID) algorithm, and a target is 36° C. In the algorithm, a difference between 36° C. and a current battery temperature obtained through collection is used as an input of the PID algorithm to obtain a currently suitable charging current, and the current is transferred to a charging voltage-current adjustment module as an instruction current. The voltage-current adjustment module configures, by sending a command through an I2C bus, a charging current of a charging IC based on the obtained instruction current, and sets a battery charging current to a target current, to control heat generation during charging of the mobile phone, so that thermal experience of charging of the mobile phone is better.

Scenario 2: User-Defined Mode

A user inserts a Huawei direct charger (supporting a Huawei direct charging protocol) with an output capability of 5 V-4 A. A charging detection module detects that, on an electronic device, the electronic device and a charger cooperate with each other to support a preset user-defined policy 1 that was previously set by the user in a charging mode selection window. A charging parameter instruction module parses the user-defined policy 1, and finds that the user distinguishes between different types of preset policies based on a time. In this policy, the user uses a native segment-based fast charging policy from 8:00 to 22:00 every day, and uses a constant current and constant voltage charging policy from 22:00 and 8:00. In the constant current and constant voltage charging policy, a current in a constant current phase is 2 A, and a cut-off voltage is 4.3 V. Because a time segment falls within the range of the constant current and constant voltage charging policy, the charging parameter instruction module collects voltages and currents at both ends of a battery and an output voltage of the current charger, and performs calculation to obtain a charging voltage (or a charging current) that needs to be configured for the charger and that is required by the constant current and constant voltage charging. A charging current-voltage adjustment module communicates with the charger by using the Huawei direct charging protocol, and changes the output voltage (or current) of the charger, so that the charging current in a constant current area is 2 A, and the cut-off voltage in a constant voltage area is 4.3 V.

Scenario 3: Smart Charging Mode

A user configures a policy to a smart charging mode in a charging mode selection window. When the user uses the smart charging mode for charging, a charging parameter instruction module performs smart scenario identification when the charger is inserted and after the charger is inserted. For example, when identifying that the user is in a sleep state, the charging parameter instruction module switches a charging parameter to a charging parameter corresponding to the sleep mode. In a charging policy in the sleep mode, by reducing a charging speed, less heat is generated during charging, so that damage to a battery life is further reduced. Alternatively, when identifying that the user is in a game state, the charging parameter instruction module switches the charging policy to a thermal optimization policy. A charging parameter is a charging parameter corresponding to the thermal optimization policy. In the thermal optimization policy, heat generated in a charging process of the mobile phone may be controlled, to prevent charging of the mobile phone from being stopped due to overheating and avoid poor thermal sensing of the user when the user holds the mobile phone. This improves user experience.

In conclusion, according to the optional charging method for a user that is provided in this application, the user can autonomously select a charging mode, and different charging effects are implemented based on different application scenarios. The mobile phone detects a current application scenario, determines, based on the current application scenario, whether to pop up the charging mode selection window, and automatically selects charging policies through matching in different scenarios for the user. According to the method, an operation can be simplified, to meet various requirements of the user and improve user experience.

Figure 17:
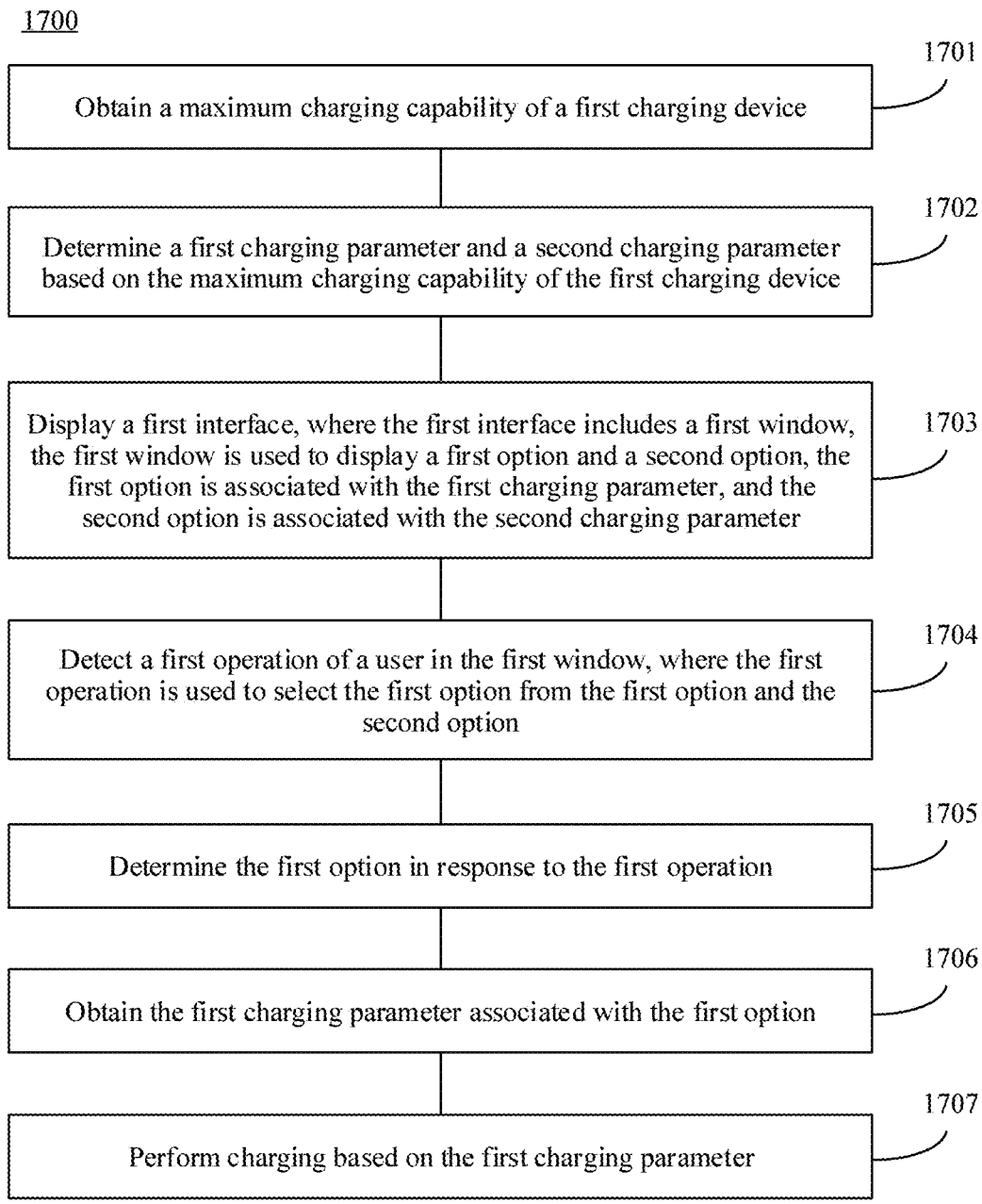
FIG. 17 is a flowchart of an implementation process of still yet another example of an optional charging method for a user according to an embodiment of this application.

The optional charging method for a user that is provided in the embodiments of this application may be implemented in the electronic devices (for example, a mobile phone or a tablet computer) shown in FIG. 1 and FIG. 2. FIG. 17 is a schematic flowchart of an optional charging method for a user according to an embodiment of this application. The method is applied to an electronic device, and the electronic device is connected to a first charging device. As shown in FIG. 17, the method may include the following steps.

S1701: Obtain a maximum charging capability of the first charging device.

Optionally, the electronic device may automatically obtain the maximum charging capability of the first charging device.

For example, after the electronic device is connected to a charging device, the mobile phone may identify a type of the charger by using a charging detection module, to obtain a maximum charging capability of the charger. As shown in FIG. 3(b), after the electronic device is connected to the charging device, the electronic device may automatically display a charger type 1. To be specific, a maximum charging capability corresponding to the charger type 1 is "12 V-4 A".

Optionally, the electronic device may obtain a charging capability of the first charging device based on a charger type selected by a user. This specifically includes: displaying a third interface, where the third interface includes a third window, and the third window is used to display a plurality of groups of parameters used to indicate maximum charging capabilities of a plurality of charging devices; detecting a third operation of the user in the third window, where the third operation is used to select a first group of parameters from the plurality of groups of parameters, and the first group of parameters correspond to the first charging device; in response to a first operation, determining a charging parameter corresponding to the first group of parameters; and determining the charging parameter corresponding to the first group of parameters as the maximum charging capability of the first charging device.

Figure 3D:
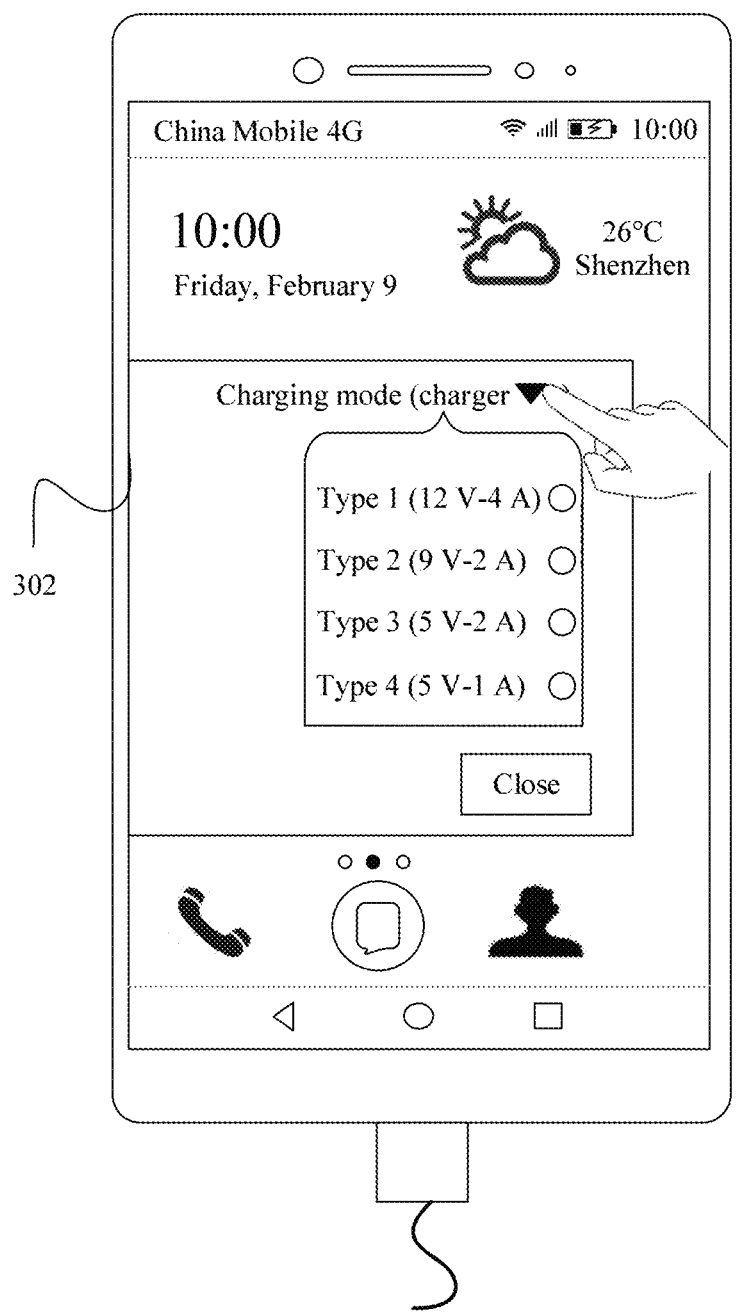
Figure 3E:
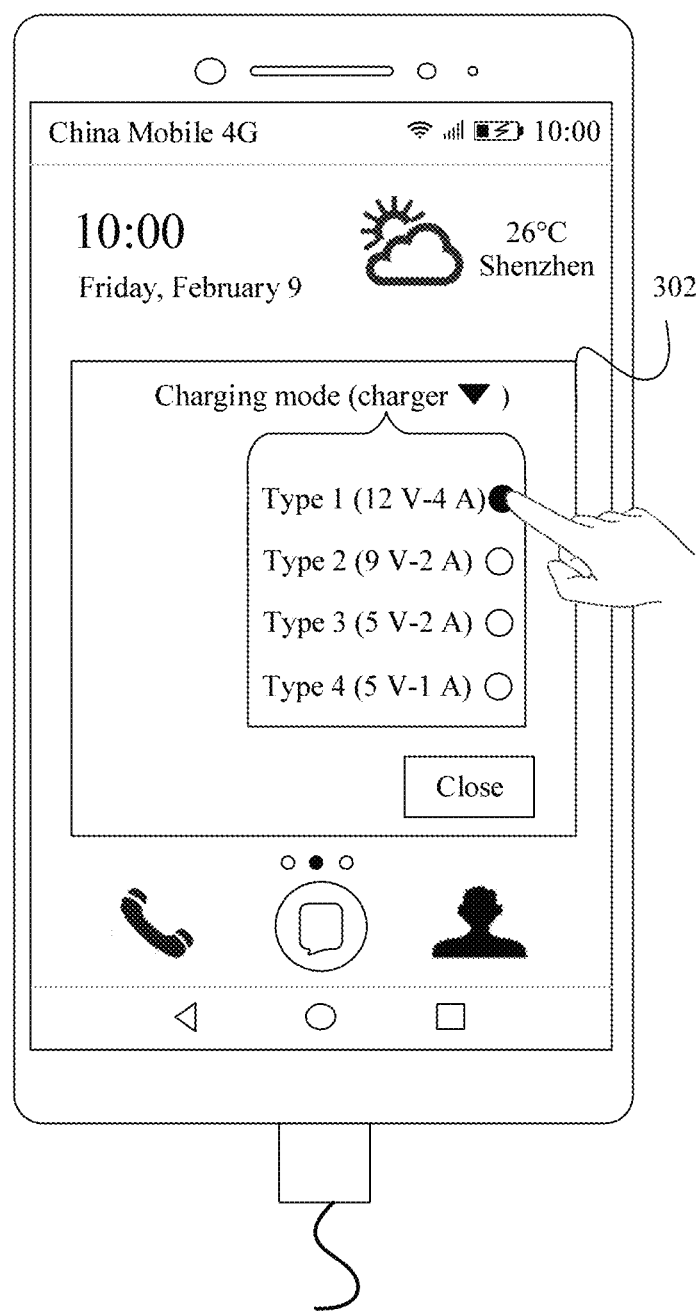

For example, the user performs the operation shown in FIG. 3(d). The user taps, in the charging mode selection window 302, the charger selection widget (for example, "charger type X") shown by the black inverted triangle to select the charger type. Then, the user performs the operation shown in FIG. 3(e). The user selects "charger type 1 (12 V-4 A)", so that the electronic device may obtain a maximum charging capability of the charger. To be specific, a maximum charging voltage that can be supported by the charger of type 1 is 12 V, and a maximum charging current that can be supported by the charger is 4 A.

Optionally, the charger selection widget may alternatively be set to another widget that supports user input. For example, the user may manually enter the maximum charging capability of the connected charger. After the user enters the maximum charging capability of the charger, the mobile phone may determine, based on a parameter corresponding to the obtained maximum charging capability, charging parameters corresponding to different charging modes. This is not limited in this application.

S1702: Determine a first charging parameter and a second charging parameter based on the maximum charging capability of the first charging device.

Optionally, a charging parameter includes a maximum charging voltage, a maximum charging current, charging duration, and a maximum temperature in a battery charging process.

It should be understood that the first charging parameter and the second charging parameter herein are merely examples, and a third charging parameter, a fourth charging parameter, and the like may further be included. Each charging parameter corresponds to one charging mode, and one charging mode may include at least one charging parameter.

Optionally, charging parameters associated with a charging mode displayed in the charging mode selection window 302 are determined based on charging parameters corresponding to the obtained maximum charging capability. For example, after the user performs the operation shown in FIG. 3(e), the electronic device may determine that, for the charger of type 1, the maximum charging voltage is 12 V, and the maximum charging current is 4 A. A charging parameter associated with the displayed fast charging mode may be a parameter corresponding to the maximum charging capability, a charging parameter associated with the slow charging mode may be 50%, 80%, or the like of a value of the parameter corresponding to the maximum charging capability, and a charging current associated with the low heat mode may be 25% or the like of the maximum charging current. The foregoing lists possible manners of determining the charging parameters associated with the charging modes. This is not limited in this application.

S1703: Display a first interface, where the first interface includes a first window, the first window is used to display a first option and a second option, the first option is associated with the first charging parameter, and the second option is associated with the second charging parameter.

It should be understood that the first option and the second option each correspond to a charging mode, and each charging mode is associated with a charging parameter.

Optionally, the first option is determined based on a preset condition. Alternatively, the first option is determined based on a current time period.

For example, the preset condition may include setting different charging modes for different application scenarios. For different scenarios shown in FIG. 6(a), FIG. 6(b), FIG. 6(c), and FIG. 6(d), the electronic device selects different charging modes through matching based on the different scenarios. Details are not described herein again.

For example, the electronic device may further automatically select a charging mode through matching based on a current time. For example, in a time period from 08:00 to 22:00 in a day, after the electronic device is connected to the charger, the electronic device preferably automatically selects the fast charging mode through matching. In a time period from 22:00 to 08:00, after the electronic device is connected to the charger, the electronic device preferably automatically selects the sleep mode or the slow charging mode through matching.

Optionally, the first option includes any one of the fast charging mode option, the sleep mode option, or the thermal optimization mode option.

Optionally, the first option is a user-defined option determined by the user by setting a charging parameter.

For example, the process shown in FIG. 5(a) to FIG. 5(h) is an operation process of the user-defined mode. The user may perform operations such as addition, modification, and deletion. For details, refer to related descriptions in FIG. 5(a) to FIG. 5(h). Details are not described herein again.

Optionally, the method further includes: displaying a second interface before the displaying a first interface, where the second interface includes a second window used to access the first window; detecting a second operation of the user in the second window; and displaying the first interface in response to the second operation.

Optionally, the first option is a charging option automatically selected through matching; before the displaying a first interface, the method further includes: displaying a fourth interface, where the fourth interface includes a fourth window, and the fourth window is used to display the first option; detecting a fourth operation of the user in the fourth window; and displaying the first interface in response to the fourth operation.

For example, as shown in FIG. 7(a), the user may tap the "Details" widget in the charging prompt box to access a charging mode selection interface.

Alternatively, as shown in FIG. 7(b), the user may tap the "Charging Settings" widget in the power setting box to access a charging mode selection interface.

Alternatively, in the application scenario shown in FIG. 7(c) or FIG. 7(d), different application scenarios may correspond to pop-up windows in different forms. The user may tap a pop-up window in any form to access a charging mode selection interface.

S1704: Detect a first operation of a user in the first window, where the first operation is used to select the first option from the first option and the second option.

For example, as shown in FIG. 3(b), the user may tap any charging mode widget displayed in the charging mode selection window to perform charging.

S1705: Determine the first option in response to the first operation.

S1706: Obtain the first charging parameter associated with the first option.

The electronic device receives a tap selection of the user, determines a charging mode, obtains a charging parameter corresponding to the charging mode, and performs charging based on the charging parameter corresponding to the mode.

S1707: Perform charging based on the first charging parameter.

According to the foregoing optional mobile phone charging method for a user, the user may manually select different charging modes and charging policies based on different application scenarios, to implement different charging effects. After the mobile phone is connected to a charger, the mobile phone may present, in an active charging adaptation interface, a charging mode that matches the connected charger. The user may autonomously select a currently required charging mode, or the user may autonomously change a charging performance and a charging effect of the charger based on a current application scenario. In this way, the user can select a desired charging policy as required to achieve an expected result by fully using battery performance and charger performance. This meets various requirements of the user and improves user experience. For example, when the user goes out or uses the mobile phone in an emergency, the user may select a fast charging policy; before the user goes to bed, the user may select a charging policy supporting a long battery life, to improve a battery health status, extend the battery life, reduce battery charging heat, and the like.

It may be understood that, to implement the foregoing functions, the electronic device includes corresponding hardware and/or software modules for performing the functions. With reference to the algorithms and steps in the examples described in the embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, function modules of the electronic device may be obtained through division based on the foregoing method examples. For example, the function modules may be obtained through division corresponding to various functions, or two or more functions may be integrated into one processing module. The integrated module may be implemented in a form of hardware. It should be noted that, in the embodiments, the module division is an example, and is merely logical function division. During actual implementation, another division manner may be used.

An embodiment further provides a computer storage medium. The computer storage medium stores a computer instruction; when the computer instruction is run on an electronic device, the electronic device is enabled to perform the foregoing related method steps, to implement the charging methods in the foregoing embodiments.

An embodiment further provides a computer program product. When the computer program product runs on a computer, the computer is enabled to perform the foregoing related steps, to implement the charging methods in the foregoing embodiments.

In addition, an embodiment of this application further provides an apparatus. The apparatus may be specifically a chip, a component, or a module. The apparatus may include a processor and a memory that are connected. The memory is configured to store a computer execution instruction. When the apparatus runs, the processor may execute the computer execution instruction stored in the memory, to enable the chip to perform the charging methods in the foregoing method embodiments.

The electronic device, the computer storage medium, the computer program product, or the chip provided in the embodiments may be configured to perform the corresponding methods provided above. Therefore, for beneficial effects that can be achieved, refer to the beneficial effects of the corresponding methods provided above. Details are not described herein again.

The foregoing descriptions about the implementations allow a person skilled in the art to understand that, for the purpose of convenient and brief description, division into the foregoing function modules is taken as an example for illustration. In actual application, the foregoing functions can be allocated to different modules and implemented based on a requirement. In other words, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of different positions. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

If the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for enabling a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device comprising:
   a battery; and
   one or more processors coupled to the battery and configured to:
   obtain a current time;
   charge, in response to the current time being in a first time period and based on a type of charger connected to the electronic device, the battery in a first mode, wherein when charging the battery in the first mode, the one or more processors are further configured to:
   charge, using a first maximum charging current, the battery in a constant-current charging manner; and
   charge, using a first charging cut-off voltage, the battery in a constant-voltage charging manner after a charging voltage of the battery reaches the first charging cut-off voltage; and
   in response to the current time being in a second time period:
   charge the battery in the first mode when a battery level is less than a preset threshold; and
   charge, based on the type of the charger connected to the electronic device, the battery in a second mode when the battery level is greater than or equal to the preset threshold, wherein the second time period is after the first time period in a whole day, wherein a first charging speed in the first mode is greater than a second charging speed in the second mode, and wherein when charging the battery in the second mode, the one or more processors are further configured to:
   charge, using a second maximum charging current, the battery in the constant-current charging manner; and
   charge, using a second charging cut-off voltage, the battery in the constant-voltage charging manner after the charging voltage of the battery reaches the second charging cut-off voltage, wherein the first charging cut-off voltage corresponding to the first mode is greater than the second charging cut-off voltage corresponding to the second mode, and wherein the first maximum charging current corresponding to the first mode is greater than the second maximum charging current corresponding to the second mode.

2. The electronic device of claim 1, wherein the one or more processors are further configured to charge, in response to the current time returning to the first time period, the battery in the first mode.

3. The electronic device of claim 1, wherein the one or more processors are further configured to display a notification message indicating an estimated time for fully charging the battery.

4. The electronic device of claim 1, wherein the second time period is a night sleep time period of a user of the electronic device.

5. The electronic device of claim 4, wherein the first time period is from a wake-up time of the user to a night sleep time of the user.

6. The electronic device of claim 5, wherein the first time period is from 8:00 ante-meridiem (a.m.) to 10:00 post-meridiem (p.m.), and wherein the second time period is from 10:00 p.m. to 8:00 a.m.

7. The electronic device of claim 6, wherein the electronic device is configured to wirelessly couple to a charging device.

8. A method, comprising:
   obtaining a current time;
   charging, in response to the current time being in a first time period and based on a type of charger connected to an electronic device, a battery of the electronic device in a first mode, wherein charging the battery in the first mode comprises:
   charging, using a first maximum charging current, the battery in a constant-current charging manner; and
   charging, using a first charging cut-off voltage, the battery in a constant-voltage charging manner after a charging voltage of the battery reaches the first charging cut-off voltage; and
   in response to the current time being in a second time period:
   charging the battery in the first mode when a battery level is less than a preset threshold; and
   charging, based on the type of the charger connected to the electronic device, the battery in a second mode when the battery level is greater than or equal to the preset threshold, wherein the second time period is beyond the first time period in a whole day, wherein the preset threshold is less than 100% of a fully-charged battery level, wherein a first charging speed in the first mode is greater than a second charging speed in the second mode, and wherein charging the battery in the second mode comprises:
charging, using a second maximum charging current, the battery in the constant-current charging manner; and
charging, using a second charging cut-off voltage, the battery in the constant-voltage charging manner after the charging voltage of the battery reaches the second charging cut-off voltage, wherein the first charging cut-off voltage corresponding to the first mode is greater than the second charging cut-off voltage corresponding to the second mode, and wherein the first maximum charging current corresponding to the first mode is greater than the second maximum charging current corresponding to the second mode.

9. The method of claim 8, further comprising charging, in response to the current time returning to the first time period, the battery in the first mode.

10. The method of claim 8, further comprising displaying a notification message indicating an estimated time for fully charging the battery.

11. The method of claim 8, wherein the second time period is a night sleep time period of a user of the electronic device, and wherein the first time period is from a wake-up time of the user to a night sleep time of the user.

12. The method of claim 11, wherein the first time period is from 8:00 ante-meridiem (a.m.) to 10:00 post-meridiem (p.m.), and wherein the second time period is from 10:00 p.m. to 8:00 a.m.

13. The method of claim 12, wherein the preset threshold is 80% of the fully-charged battery level.

14. A computer program product comprising computer-executable instructions stored on a non-transitory computer-readable medium that, when executed by one or more processors, cause an electronic device to:
obtain a current time;
charge, in response to the current time is in a first time period and based on a type of charger connected to the electronic device, a battery of the electronic device in a first mode, wherein charging the battery in the first mode comprises:
charging, using a first maximum charging current, the battery in a constant-current charging manner; and
charging, using a first charging cut-off voltage, the battery in a constant-voltage charging manner after a charging voltage of the battery reaches the first charging cut-off voltage; and
in response to the current time is in a second time period:
charge the battery in the first mode when a battery level is less than a preset threshold; and
charge, based on the type of the charger connected to the electronic device, the battery in a second mode when the battery level is greater than or equal to the preset threshold, wherein the second time period is beyond the first time period in a whole day, wherein the preset threshold is less than 100% of a fully-charged battery level, wherein a first charging speed in the first mode is greater than a second charging speed in the second mode, and wherein charging the battery in the second mode comprises:
charging, using a second maximum charging current, the battery in the constant-current charging manner; and
charging, using a second charging cut-off voltage, the battery in the constant-voltage charging manner after the charging voltage of the battery reaches the second charging cut-off voltage, wherein the first charging cut-off voltage corresponding to the first mode is greater than the second charging cut-off voltage corresponding to the second mode, and wherein the first maximum charging current corresponding to the first mode is greater than the second maximum charging current corresponding to the second mode.

15. The computer program product of claim 14, wherein the one or more processors are further configured to cause the electronic device to charge, in response to the current time returning to the first time period, the battery in the first mode.

16. The computer program product of claim 14, wherein the one or more processors are further configured to cause the electronic device to display a notification message indicating an estimated time for fully charging the battery.

17. The computer program product of claim 14, wherein the second time period is a night sleep time period of a user of the electronic device.

18. The computer program product of claim 17, wherein the first time period is from a wake-up time of the user to a night sleep time of the user.

19. The computer program product of claim 18, wherein the first time period is from 8:00 ante-meridiem (a.m.) to 10:00 post-meridiem (p.m.), and wherein the second time period is from 10:00 p.m. to 8:00 a.m.

20. The computer program product of claim 19, wherein the one or more processors are further configured to cause the electronic device to wirelessly couple to a charging device.

* * * * *